(12) United States Patent
Lee et al.

(10) Patent No.: US 12,700,373 B2
(45) Date of Patent: Aug. 4, 2026

(54) DISPLAY DEVICE AND ELECTRONIC DEVICE INCLUDING THE SAME

(71) Applicant: Samsung Display Co., Ltd., Yongin-si (KR)

(72) Inventors: Jiyoung Lee, Yongin-si (KR); Hyunyoung Choi, Yongin-si (KR); Sang-Gu Lee, Yongin-si (KR); Yongwoo Lee, Yongin-si (KR); Hyung Uk Cho, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 19/247,035

(22) Filed: Jun. 24, 2025

(65) Prior Publication Data

US 2026/0004742 A1 Jan. 1, 2026

(30) Foreign Application Priority Data

Jun. 27, 2024 (KR) ........................ 10-2024-0084335

(51) Int. Cl.
*G09G 3/3266* (2016.01)
*G09G 3/3241* (2016.01)

(52) U.S. Cl.
CPC ......... *G09G 3/3266* (2013.01); *G09G 3/3241* (2013.01); *G09G 2300/0426* (2013.01); *G09G 2300/0819* (2013.01); *G09G 2300/0852* (2013.01); *G09G 2300/0861* (2013.01); *G09G 2310/08* (2013.01); *G09G 2320/043* (2013.01)

(58) Field of Classification Search
CPC ............... G09G 3/3266; G09G 3/3241; G09G 2300/0426; G09G 2300/0819; G09G 2300/0852; G09G 2300/0861; G09G 2310/08; G09G 2320/043
See application file for complete search history.

(56) References Cited

U.S. PATENT DOCUMENTS

| | | | |
|---|---|---|---|
| 8,049,684 | B2 | 11/2011 | Kim |
| 2010/0259531 | A1 | 10/2010 | Ono |
| 2015/0138181 | A1 | 5/2015 | Hwang |

(Continued)

FOREIGN PATENT DOCUMENTS

| | | | |
|---|---|---|---|
| KR | 10-0666640 | B1 | 1/2007 |
| KR | 2024/0070460 | A | 5/2024 |

*Primary Examiner* — Robert J Michaud
(74) *Attorney, Agent, or Firm* — Womble Bond Dickinson (US) LLP

(57) ABSTRACT

A display device includes a display panel including a pixel, the pixel including a light-emitting element including an anode connected to a first power line, and a cathode, a first transistor between the cathode and a second node, and configured to operate according to a potential of a first node, a first capacitor between the first node and a third node, a second transistor between the third node and a data line, and for receiving a first scan signal, a third transistor between the first node and a reference voltage line, and for receiving a second scan signal, a fourth transistor between the second and third nodes, and for receiving a third scan signal, a first emission control transistor between the second node and a second power line, and for receiving a first emission control signal through a fourth node, and a second capacitor between the second and fourth nodes.

20 Claims, 27 Drawing Sheets

(56) References Cited

U.S. PATENT DOCUMENTS

| | | | | |
|---|---|---|---|---|
| 2021/0125557 | A1 | 4/2021 | Na | |
| 2021/0256908 | A1* | 8/2021 | Park | G09G 3/3266 |
| 2023/0116832 | A1* | 4/2023 | Jang | H10D 86/60<br>345/206 |
| 2024/0112633 | A1 | 4/2024 | Hong et al. | |
| 2024/0138200 | A1 | 4/2024 | Hong et al. | |
| 2025/0087154 | A1 | 3/2025 | Wang et al. | |

* cited by examiner

DISPLAY DEVICE AND ELECTRONIC DEVICE INCLUDING THE SAME

CROSS-REFERENCE TO RELATED APPLICATION

The present application claims priority to, and the benefit of, Korean Patent Application No. 10-2024-0084335, filed on Jun. 27, 2024, in the Korean Intellectual Property Office, the entire disclosure of which is incorporated herein by reference.

BACKGROUND

Embodiments of the present disclosure described herein relate to a display device with improved display quality, and an electronic device including the same.

Among display devices, a light-emitting display device displays an image by using a light-emitting diode that generates light through the recombination of electrons and holes. The light-emitting display device is driven with low power while providing a fast response speed.

The light-emitting display device includes pixels connected to data lines and scan lines. Each of the pixels generally includes a light-emitting diode, and a circuit unit for controlling the amount of current flowing to the light-emitting diode. In response to a data signal, the circuit unit may control the amount of current that flows from a terminal, to which a first driving voltage is applied, to a terminal, to which a second driving voltage is applied, via the light-emitting diode. In this case, light of predetermined luminance is generated to correspond to the amount of current flowing through the light-emitting diode.

SUMMARY

Embodiments of the present disclosure provide a display device having improved display quality and a simplified circuit configuration of a display panel and an electronic device including the same.

According to one or more embodiments, a display device includes a display panel including a pixel, the pixel including a light-emitting element including an anode connected to a first power line, and a cathode, a first transistor connected between the cathode and a second node, and configured to operate according to a potential of a first node, a first capacitor connected between the first node and a third node, a second transistor connected between the third node and a data line, and configured to receive a first scan signal, a third transistor connected between the first node and a reference voltage line, and configured to receive a second scan signal, a fourth transistor connected between the second node and the third node, and configured to receive a third scan signal, a first emission control transistor connected between the second node and a second power line, and configured to receive a first emission control signal through a fourth node, and a second capacitor connected between the second node and the fourth node.

The display device may further include a third capacitor connected between the third node and the second power line.

The display device may further include a third capacitor connected between the third node and the reference voltage line.

The pixel may further include a fifth transistor connected between the first transistor and the first power line, or between the first transistor and an initialization voltage line, and configured to receive a fourth scan signal, wherein, during an initialization period, the second scan signal, the third scan signal, the fourth scan signal, and the first emission control signal have active levels, and the first scan signal has an inactive level, wherein, during a compensation period following the initialization period, the second scan signal, the third scan signal, and the fourth scan signal have active levels, and the first scan signal and the first emission control signal have inactive levels, wherein, during a data write period following the compensation period, the first scan signal and the fourth scan signal have active levels, and the second scan signal, the third scan signal, and the first emission control signal have inactive levels, and wherein, during an interval period between the compensation period and the data write period, the first scan signal, the second scan signal, the third scan signal and the first emission control signal have inactive levels, and the fourth scan signal has an active level.

The pixel may further include a fifth transistor connected between the first transistor and the first power line, or between the first transistor and an initialization voltage line, and configured to receive a fourth scan signal, and a third emission control transistor connected between the first transistor and the cathode, connected to the fourth node, and is configured to receive the first emission control signal, wherein, during an initialization period, the second scan signal, the third scan signal, the fourth scan signal, and the first emission control signal have active levels, and the first scan signal has an inactive level, wherein, during a compensation period following the initialization period, the second scan signal, the third scan signal and the fourth scan signal have active levels, and the first scan signal and the first emission control signal have inactive levels, wherein, during a data write period following the compensation period, the first scan signal and the fourth scan signal have active levels, and the second scan signal, the third scan signal, and the first emission control signal have inactive levels.

The pixel may further include a second emission control transistor connected between the first emission control transistor and the second power line, and configured to receive a second emission control signal, wherein, during an initialization period, the second scan signal, the third scan signal, the first emission control signal, and the second emission control signal have active levels, and the first scan signal has an inactive level, wherein, during a compensation period following the initialization period, the second scan signal and the third scan signal have active levels, and the first scan signal, the first emission control signal, and the second emission control signal have inactive levels, wherein, during a data write period following the compensation period, the first scan signal has an active level, and the second scan signal, the third scan signal, the first emission control signal and the second emission control signal have inactive levels, wherein a start time point of an inactive period of the second emission control signal precedes a start time point of an inactive period of the first emission control signal, and wherein an end time point of the inactive period of the second emission control signal precedes an end time point of the inactive period of the first emission control signal.

The pixel may further include a second emission control transistor connected between the first transistor and the first emission control transistor and configured to receive a second emission control signal, wherein, during an initialization period, the second scan signal, the third scan signal, the first emission control signal, and the second emission control signal have active levels, and the first scan signal has an inactive level, wherein, during a compensation period following the initialization period, the second scan signal and the third scan signal have active levels, and the first scan signal, the first emission control signal, and the second emission control signal have inactive levels, wherein, during a data write period following the compensation period, the first scan signal has an active level, and the second scan signal, the third scan signal, the first emission control signal and the second emission control signal have inactive levels, wherein a start time point of an inactive period of the second emission control signal precedes a start time point of an inactive period of the first emission control signal, wherein an end time point of the inactive period of the second emission control signal precedes an end time point of the inactive period of the first emission control signal.

The first transistor, the second transistor, the third transistor, and the first emission control transistor may include N-type transistors.

A first driving voltage received by the first power line may be higher than a second driving voltage received by the second power line, wherein a reference voltage received by the reference voltage line is lower than the second driving voltage.

The light-emitting element may further include an intermediate layer above the anode, below the cathode, and including at least one light-emitting layer.

The display panel may further include a separator having an obtuse taper angle, wherein the pixel is provided in plurality, the pixels including a first light-emitting element configured to emit light of a first color, and a second light-emitting element configured to emit light of a second color that is different from the first color, and wherein the separator separates a cathode of the first light-emitting element and a cathode of the second light-emitting element from each other.

The display panel may further include a connection wire between the first transistor and the cathode of the light-emitting element.

The connection wire may include a first layer, a second layer above the first layer, and a third layer above the second layer, wherein a side surface of the third layer protrudes further outwardly from a side surface of the second layer in plan view, and wherein the cathode of the light-emitting element is in contact with the side surface of the second layer.

According to one or more embodiments, a display device includes a display panel including a pixel, a first scan line, a second scan line, an emission control line, a first power line, a second power line, a reference voltage line, and a data line, a first scan-driving circuit connected to the first scan line, a second scan-driving circuit connected to the second scan line, and an emission control circuit connected to the emission control line, wherein the pixel includes a light-emitting element including an anode connected to the first power line, and a cathode, a first transistor connected between the cathode and a second node, and configured to operate according to a potential of a first node, a first capacitor connected between the first node and a third node, a second transistor connected to the third node, the data line, and the first scan line, a third transistor connected to the first node, the reference voltage line, and the second scan line, a fourth transistor connected to the second node, the third node, and the second scan line, a first emission control transistor connected to the second node, the second power line, and the emission control line, and a second capacitor connected between the second node and the emission control line.

The display panel may further include a third scan line, wherein the pixel further includes a fifth transistor connected between the first transistor and the first power line, or between the first transistor and an initialization voltage line, and connected to the third scan line.

The display device may further include a third scan-driving circuit connected to the third scan line.

The display device may further include a third capacitor connected between the third node and the second power line.

The display device may further include a third capacitor connected between the third node and the reference voltage line.

According to one or more embodiments, an electronic device includes a display panel including a pixel, a panel driver for driving the display panel, a driving controller for controlling a driving of the panel driver, and a main processor for providing an image signal to the driving controller, wherein the pixel includes a light-emitting element including an anode connected to a first power line, and a cathode, a first transistor connected between the cathode and a second node, and configured to operate according to a potential of a first node, a first capacitor connected between the first node and a third node, a second transistor connected between the third node and a data line, and configured to receive a first scan signal, a third transistor connected between the first node and a reference voltage line, and configured to receive a second scan signal, a fourth transistor connected between the second node and the third node, and configured to receive a third scan signal, a first emission control transistor connected between the second node and a second power line, and configured to receive a first emission control signal through a fourth node, and a second capacitor connected between the second node and the fourth node.

The electronic device may include a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, a head-mounted display (HMD), a virtual reality (VR) device, an augmented reality (AR) device, a dashboard of a vehicle, a center information display (CID), or a mirror display.

BRIEF DESCRIPTION OF THE DRAWINGS

The above and other aspects of the present disclosure will become apparent by describing in detail embodiments thereof with reference to the accompanying drawings.

DETAILED DESCRIPTION

Figure 1:
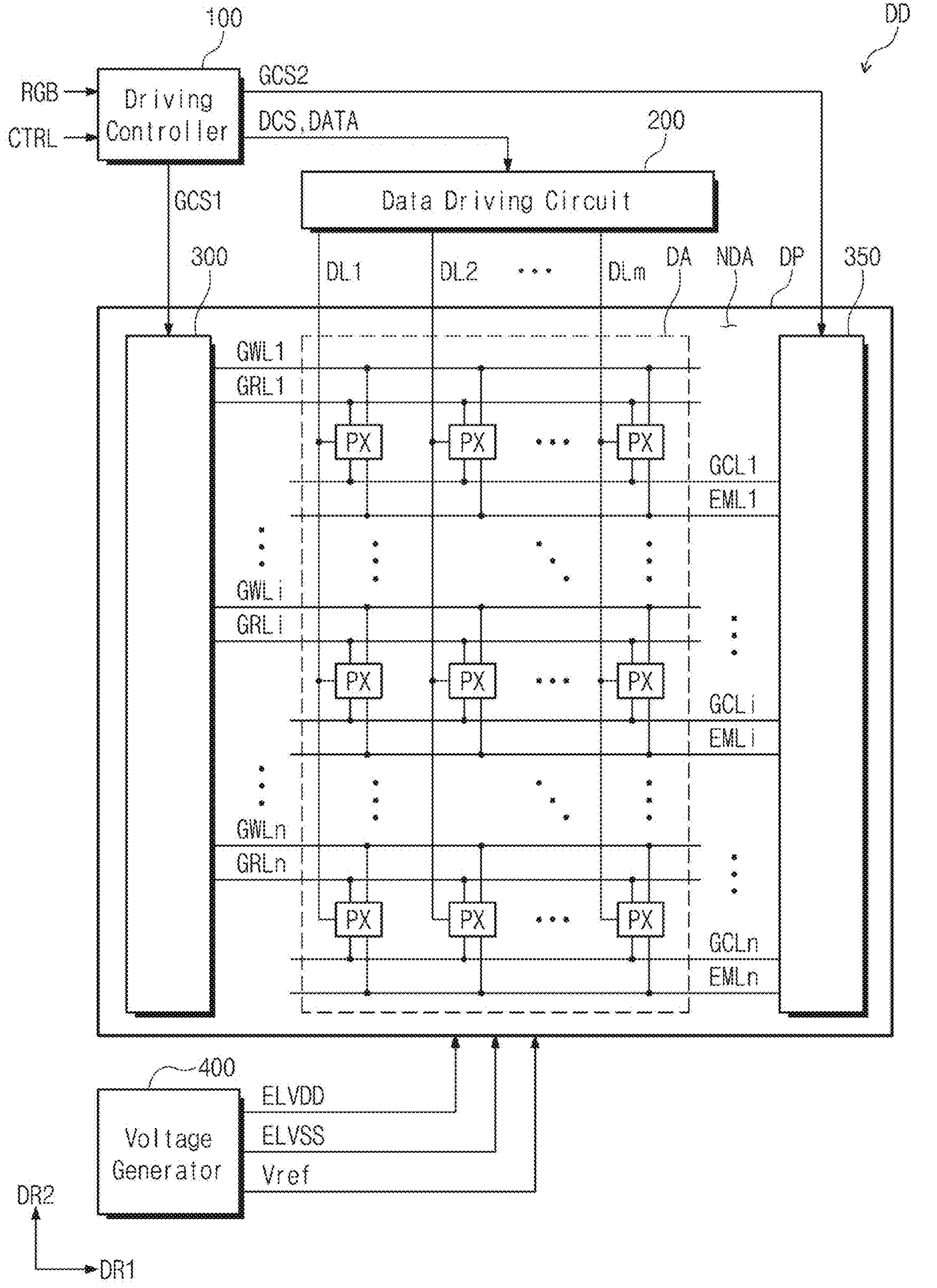
FIG. 1 is a block diagram of a display device, according to one or more embodiments of the present disclosure.

Aspects of some embodiments of the present disclosure and methods of accomplishing the same may be understood more readily by reference to the detailed description of embodiments and the accompanying drawings. The described embodiments are provided as examples so that this disclosure will be thorough and complete, and will fully convey the aspects of the present disclosure to those skilled in the art. Accordingly, processes, elements, and techniques that are redundant, that are unrelated or irrelevant to the description of the embodiments, or that are not necessary to those having ordinary skill in the art for a complete understanding of the aspects of the present disclosure may be omitted. Unless otherwise noted, like reference numerals, characters, or combinations thereof denote like elements throughout the attached drawings and the written description, and thus, repeated descriptions thereof may be omitted.

The described embodiments may have various modifications and may be embodied in different forms, and should not be construed as being limited to only the illustrated embodiments herein. The use of "can," "may," or "may not" in describing an embodiment corresponds to one or more embodiments of the present disclosure.

A person of ordinary skill in the art would appreciate, in view of the present disclosure in its entirety, that each suitable feature of the various embodiments of the present disclosure may be combined or combined with each other, partially or entirely, and may be technically interlocked and operated in various suitable ways, and each embodiment may be implemented independently of each other or in conjunction with each other in any suitable manner unless otherwise stated or implied.

In the drawings, the relative sizes of elements, layers, and regions may be exaggerated for clarity and/or descriptive purposes. In other words, because the sizes and thicknesses of elements in the drawings are arbitrarily illustrated for convenience of description, the disclosure is not limited thereto. Additionally, the use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified.

Various embodiments are described herein with reference to sectional illustrations that are schematic illustrations of embodiments and/or intermediate structures. As such, variations from the shapes of the illustrations as a result of, for example, manufacturing techniques and/or tolerances, are to be expected. Further, specific structural or functional descriptions disclosed herein are merely illustrative for the purpose of describing embodiments according to the concept of the present disclosure. Thus, embodiments disclosed herein should not be construed as limited to the illustrated shapes of elements, layers, or regions, but are to include deviations in shapes that result from, for instance, manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place.

Spatially relative terms, such as "beneath," "below," "lower," "lower side," "under," "above," "upper," "over," "higher," "upper side," "side" (e.g., as in "sidewall"), and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below," "beneath," "or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. Similarly, when a first part is described as being arranged "on" a second part, this indicates that the first part is arranged at an upper side or a lower side of the second part without the limitation to the upper side thereof on the basis of the gravity direction.

Further, the phrase "in a plan view" means when an object portion is viewed from above, and the phrase "in a schematic cross-sectional view" means when a schematic cross-section taken by vertically cutting an object portion is viewed from the side. The terms "overlap" or "overlapped" mean that a first object may be above or below or to a side of a second object, and vice versa. Additionally, the term "overlap" may include stack, face or facing, extending over, covering, or partly covering or any other suitable term as would be appreciated and understood by those of ordinary skill in the art. The expression "not overlap" may include meaning, such as "apart from" or "set aside from" or "offset from" and any other suitable equivalents as would be appreciated and understood by those of ordinary skill in the art. The terms "face" and "facing" may mean that a first object may directly or indirectly oppose a second object. In a case in which a third object intervenes between a first and second object, the first and second objects may be understood as being indirectly opposed to one another, although still facing each other.

It will be understood that when an element, layer, region, or component (e.g., an apparatus, a device, a circuit, a wire, an electrode, a terminal, a conductive film, etc.) is referred to as being "formed on," "on," "connected to," or "(operatively, functionally, or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or one or more intervening layers, regions, or components may be present. The one or more intervening components may include a switch, a transistor, a resistor, an inductor, a capacitor, a diode and/or the like. Accordingly, a connection is not limited to the connections illustrated in the drawings or the detailed description and may also include other types of connections. In describing embodiments, an expression of connection indicates electrical connection unless explicitly described to be direct connection, and "directly connected/directly coupled," or "directly on," refers to one component directly connecting or coupling another component, or being on another component, without an intermediate component.

In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components, such as "between," "immediately between" or "adjacent to" and "directly adjacent to," may be construed similarly. It will be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," or "one or more of" when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XY, YZ, and XZ, or any variation thereof. Similarly, the expressions "at least one of A and B" and "at least one of A or B" may include A, B, or A and B. As used herein, "or" generally means "and/or," and the term "and/or" includes any and all combinations of one or more of the associated listed items. For example, the expression "A and/or B" may include A, B, or A and B. Similarly, expressions such as "at least one of," "a plurality of," "one of," and other prepositional phrases, when preceding a list of elements, modify the entire list of elements and do not modify the individual elements of the list. When "C to D" is stated, it means C or more and D or less, unless otherwise specified.

It will be understood that, although the terms "first," "second," "third," etc., may be used herein to describe various elements, components, regions, layers and/or sections, these elements, components, regions, layers and/or sections should not be limited by these terms. These terms do not correspond to a particular order, position, or superiority, and are only used to distinguish one element, member, component, region, area, layer, section, or portion from another element, member, component, region, area, layer, section, or portion. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

In the examples, the x-axis, the y-axis, and/or the z-axis are not limited to three axes of a rectangular coordinate system, and may be interpreted in a broader sense. For example, the x-axis, the y-axis, and the z-axis may be perpendicular to one another, or may represent different directions that are not perpendicular to one another. The same applies for first, second, and/or third directions.

The terminology used herein is for the purpose of describing embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

As used herein, the terms "substantially," "about," "approximately," and similar terms are used as terms of approximation and not as terms of degree, and are intended to account for the inherent deviations in measured or calculated values that would be recognized by those of ordinary skill in the art. For example, "substantially" may include a range of +/−5% of a corresponding value. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." Furthermore, the expression "being the same" may mean "being substantially the same." In other words, the expression "being the same" may include a range that can be tolerated by those of ordinary skill in the art. The other expressions may also be expressions from which "substantially" has been omitted.

In some embodiments well-known structures and devices may be described in the accompanying drawings in relation to one or more functional blocks (e.g., block diagrams), units, and/or modules to avoid unnecessarily obscuring various embodiments. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
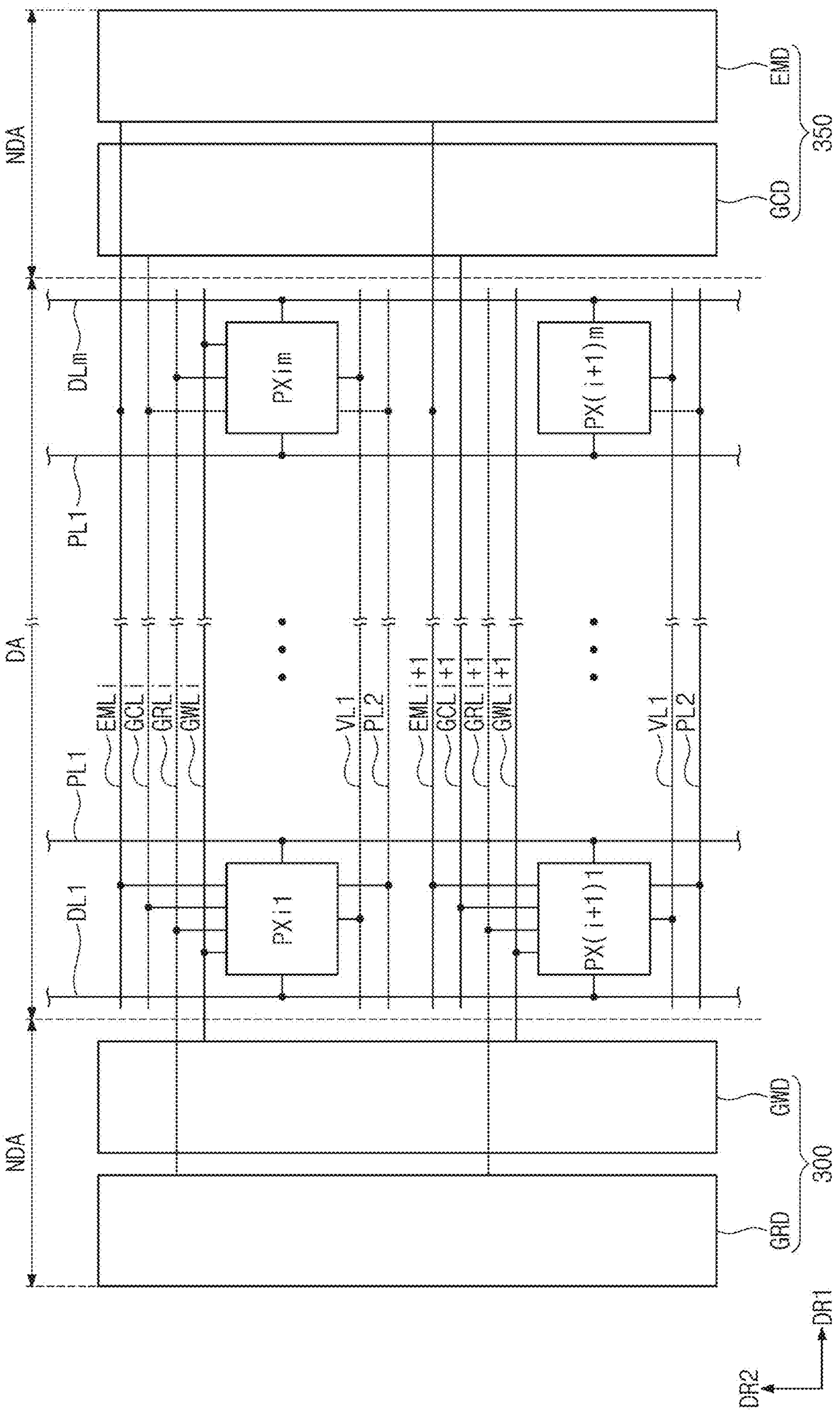
FIG. 2 is a block diagram of first and second gate-driving circuits shown in FIG. 1.

FIG. 1 is a block diagram of a display device DD, according to one or more embodiments of the present disclosure. FIG. 2 is a block diagram of first and second gate-driving circuits 300 and 350 shown in FIG. 1.

Referring to FIG. 1, the display device DD may include a display panel DP, a driving controller 100, and a panel driver. According to one or more embodiments of the present disclosure, the panel driver may include a data-driving circuit 200 (or a data driver), a first gate-driving circuit 300, a second gate-driving circuit 350, and a voltage generator 400.

The display panel DP may include a display area DA, and a non-display area NDA surrounding at least part of the display area DA (e.g., in plan view). The display panel DP may include a plurality of pixels PX placed in the display area DA. The display panel DP may include write scan lines GWL1 to GWLn, reference scan lines GRL1 to GRLn, compensation scan lines GCL1 to GCLn, and emission control lines EML1 to EMLn. The write scan lines GWL1 to GWLn may be referred to as "first scan lines," and the reference scan lines GRL1 to GRLn may be referred to as "second scan lines or third scan lines." The compensation scan lines GCL1 to GCLn may be referred to as "fourth scan lines," and the emission control lines EML1 to EMLn may be referred to as "first emission control lines."

The driving controller 100 receives an image signal RGB and a control signal CTRL. The driving controller 100 generates an image data signal DATA by converting a data format of the image signal RGB so as to be suitable for the interface specification of the data-driving circuit 200. The driving controller 100 outputs a first gate control signal GCS1, a data control signal DCS, and a second gate control signal GCS2.

The data-driving circuit 200 (or a data driver) receives the data control signal DCS and the image data signal DATA from the driving controller 100. The data-driving circuit 200 converts the image data signal DATA into data signals, and then outputs the data signals to data lines DL1 to DLm. The data signals refer to analog voltages corresponding to grayscale values of the image data signal DATA. The data lines DL1 to DLm may be arranged in a first direction DR1, and each of the data lines DL1 to DLm may extend in a second direction DR2.

The first and second gate-driving circuits 300 and 350 may be placed in the non-display area NDA of the display panel DP. As an example of the present disclosure, the first gate-driving circuit 300 may be positioned adjacent to a first side (e.g., left side) of the display area DA, and the second gate-driving circuit 350 may be positioned adjacent to a second side (e.g., right side) of the display area DA, which is different from the first side. As an example of the present disclosure, the second side may be opposite to the first side. In the example shown in FIG. 1, the first and second gate-driving circuits 300 and 350 are respectively positioned on opposite sides of the display area DA, but the present disclosure is not limited thereto. For example, the first and second gate-driving circuits 300 and 350 may be positioned adjacent to one of the first side and the second side of the display panel DP. In one or more embodiments, the first and second gate-driving circuits 300 and 350 may be integrated into one circuit.

Figure 3A:
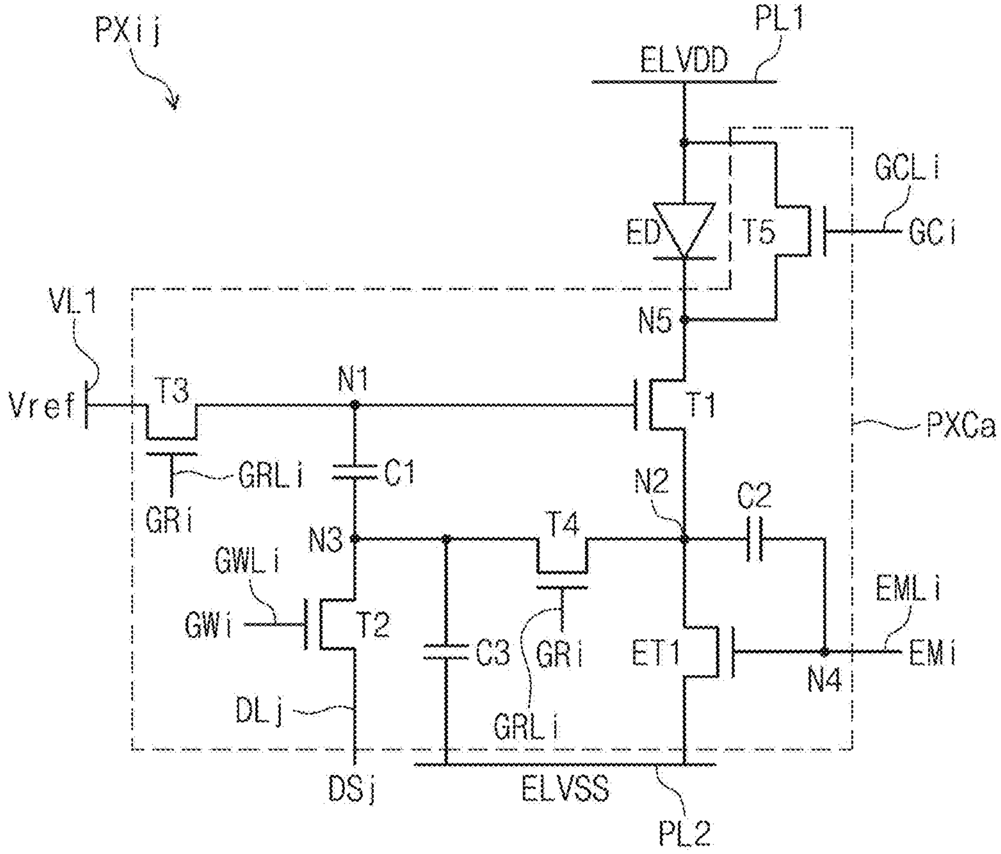
FIGS. 3A and 3B are circuit diagrams of a pixel, according to one or more embodiments of the present disclosure.

Each of a plurality of pixels PX according to one or more embodiments of the present disclosure includes a light-emitting element ED (see FIG. 3A) and a pixel circuit PXCa (see FIG. 3A) that controls light emission of the light-emitting element ED (see FIG. 3A).

The pixel circuit PXCa may include at least one or more transistors and at least one or more capacitors. The first and second gate-driving circuits 300 and 350 may include transistors formed through the same process as the pixel circuit PXCa. The pixel circuit PXCa may be referred to as a "pixel driver."

As an example of the present disclosure, the first gate-driving circuit 300 may be connected to the write scan lines GWL1 to GWLn and the reference scan lines GRL1 to GRLn. The first gate-driving circuit 300 receives the first gate control signal GCS1 from the driving controller 100. The first gate-driving circuit 300 may respectively output write scan signals and reference scan signals to the write scan lines GWL1 to GWLn and the reference scan lines GRL1 to GRLn in response to the first gate control signal GCS1. The write scan signals may be referred to as "first scan signals," and the reference scan signals may be referred to as "second scan signals or third scan signals."

As an example of the present disclosure, the second gate-driving circuit 350 may be connected to the compensation scan lines GCL1 to GCLn and the emission control lines EML1 to EMLn. In response to the second gate control signal GCS2 from the driving controller 100, the second gate-driving circuit 350 may output emission control signals to the emission control lines EML1 to EMLn, and may output compensation scan signals to the compensation scan lines GCL1 to GCLn.

The write scan lines GWL1 to GWLn, the reference scan lines GRL1 to GRLn, the compensation scan lines GCL1 to GCLn, and the emission control lines EML1 to EMLn may be extended in the first direction DR1. The write scan lines GWL1 to GWLn, the reference scan lines GRL1 to GRLn, the compensation scan lines GCL1 to GCLn, and the emission control lines EML1 to EMLn may be spaced from each other in the second direction DR2.

The display device DD according to one or more embodiments is a device for displaying a video or still image, and may be used as a display screen for various products, such as television, laptops, monitors, billboards, Internet of Things (IoTs), as well as portable electronic devices, such as mobile phone, smart phone, smart pad, tablet personal computer (PC), mobile communication terminal, electronic notebook, electronic book, portable multimedia player PMP, personal digital assistant PDA, MP3 player, navigation system, and ultra mobile PC UMPC. In addition, the display device DD according to one or more embodiments may be used in wearable devices, such as smart watches, watch phones, glasses-type displays, head-mounted displays HMDs, virtual reality (VR) devices, or augmented reality (AR) devices. In addition, the display device DD according to one or more embodiments may be used as a dashboard of a vehicle, a center information display (CID) located in a center fascia or a dashboard of the vehicle, a room mirror display replacing a side mirror of the vehicle, an entertainment element for a rear seat of the vehicle, and a display located on a rear surface of the front seat.

Referring to FIG. 2, the first gate-driving circuit 300 may include a first scan-driving circuit GWD, and a second scan-driving circuit GRD. The second gate-driving circuit 350 may include a third scan-driving circuit GCD and an emission control circuit EMD. The placement order of the first and second scan-driving circuits GWD and GRD in the first direction DR1, which is illustrated in FIG. 2, is only an example and is not particularly limited thereto. Also, in FIG. 2, a structure in which the first and second scan-driving circuits GWD and GRD are placed on a first side of the display area DA is illustrated. However, the first and third scan-driving circuits GWD and GCD may be placed on the first side of the display area DA, and the second scan-driving circuit GRD and the emission control circuit EMD may be placed on the second side of the display area DA.

In FIG. 2, the first scan-driving circuit GWD is connected to an i-th write scan line GWLi and an (i+1)-th write scan line GWLi+1. The second scan-driving circuit GRD is connected to an i-th reference scan line GRLi and an (i+1)-th reference scan line GRLi+1. The third scan-driving circuit GCD is connected to the i-th compensation scan line GCLi and the (i+1)-th compensation scan line GCLi+1. The emission control circuit EMD is connected to an i-th emission control line EMLi and an (i+1)-th emission control line EMLi+1. Moreover, pixels PXi1, PX(i+1)1, PXim, and PX(i+1)m connected to a first data line DL1 and a m-th data line DLm are illustrated in FIG. 2.

Each of the pixels PXi1, PX(i+1)1, PXim, and PX(i+1)m may be each electrically connected to three scan lines, one emission control line, and one data line. For example, an i-th row of pixels may be connected to the i-th write, reference, and compensation scan lines GWLi, GRLi, and GCLi and the i-th emission control line EMLi. A first column of pixels may be connected to the first data line DL1. However, one or more embodiments is not limited thereto. Each of the pixels PXi1, PX(i+1)1, PXim, and PX(i+1)m may be connected to scan lines of which the number is greater than three.

Referring to FIGS. 1 and 2, the voltage generator 400 (or a power supply unit) generates voltages suitable to operate the display panel DP. In one or more embodiments, the voltage generator 400 may generate a first driving voltage ELVDD, a second driving voltage ELVSS, and a reference voltage Vref. Alternatively, the voltage generator 400 may further generate an initialization voltage Vint (see FIG. 16).

Each of the pixels PXi1, PX(i+1)1, PXim, and PX(i+1)m may be connected to a first power line PL1, a second power line PL2, and a reference voltage line VL1. The first power line PL1 receives the first driving voltage ELVDD from the voltage generator 400. The second power line PL2 receives the second driving voltage ELVSS from the voltage generator 400. The reference voltage line VL1 receives the reference voltage Vref from the voltage generator 400. Alternatively, each of the pixels PXi1, PX(i+1)1, PXim, and PX(i+1)m may be further connected to an initialization voltage line VL2 (see FIG. 16). In this case, the initialization voltage line VL2 may receive an initialization voltage Vint from the voltage generator 400.

Figure 3B:
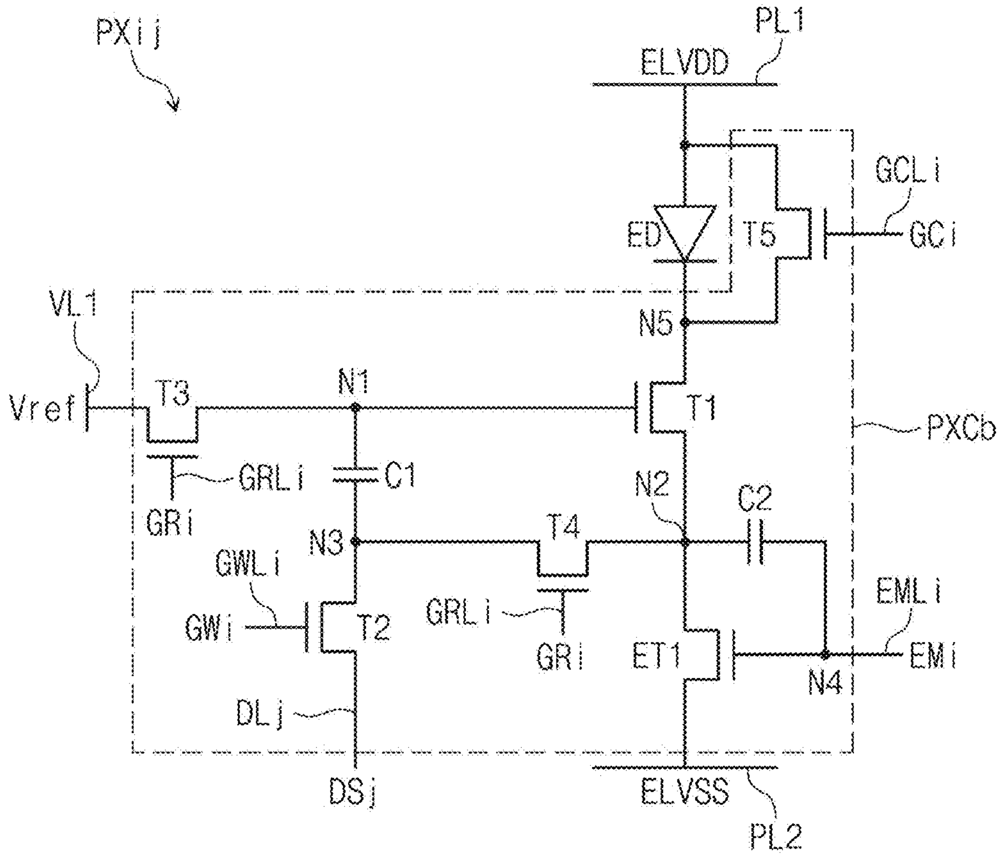
Figure 4:
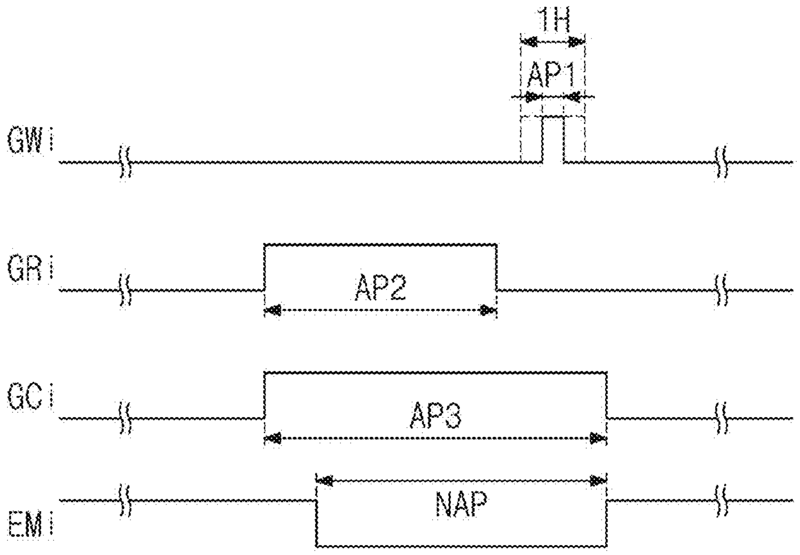
FIG. 4 is a waveform diagram illustrating signals applied to a pixel shown in FIGS. 3A and 3B.

FIGS. 3A and 3B are circuit diagrams of a pixel PXij, according to one or more embodiments of the present disclosure. FIG. 4 is a waveform diagram of signals applied to the pixel PXij shown in FIGS. 3A and 3B.

FIG. 3A representatively shows the pixel PXij connected to the i-th write scan line GWLi among the write scan lines GWL1 to GWLn (see FIG. 1) and a j-th data line DLj among the plurality of data lines DL1 to DLm (see FIG. 1). The pixel PXij is connected to the i-th reference scan line GRLi among the reference scan lines GRL1 to GRLn (see FIG. 1), and is connected to the i-th compensation scan line GCLi among the compensation scan lines GCL1 to GCLn (see FIG. 1). The pixel PXij is further connected to the i-th emission control line EMLi (see FIG. 1) among the emission control lines EML1 to EMLn.

The pixel PXij may include the pixel circuit PXCa (or a pixel-driving circuit), and the light-emitting element ED electrically connected to the pixel circuit PXCa. In one or more embodiments, the pixel circuit PXCa may include six transistors (referred to as "first to fifth transistors T1 to T5 and a first emission control transistor ET1"), and three capacitors (referred to as "a first capacitor C1, a second capacitor C2, a third capacitor C3"). In one or more embodiments of the present disclosure, one of the six transistors of the pixel circuit PXCa may be omitted, or an additional transistor may be further included in the pixel circuit PXCa.

The i-th write scan line GWLi may provide an i-th write scan signal GWi to the pixel PXij. The i-th reference scan line GRLi may provide an i-th reference scan signal GRi to the pixel PXij. The i-th compensation scan line GCLi may transmit an i-th compensation scan signal GCi to the pixel PXij. The i-th emission control line EMLi may provide the i-th emission control signal EMi to the pixel PXij. The j-th data line DLj may deliver the j-th data signal DSj to the pixel PXij. The j-th data signal DSj may have a voltage level corresponding to a grayscale value of the image data signal DATA (see FIG. 1) output from the driving controller 100 (see FIG. 1).

Furthermore, the pixel PXij may be connected to the first power line PL1 receiving the first driving voltage ELVDD, the second power line PL2 receiving the second driving voltage ELVSS, and the reference voltage line VL1 receiving the reference voltage Vref. The first driving voltage ELVDD may have a higher voltage level than the second driving voltage ELVSS. The reference voltage Vref may have a lower voltage level than the second driving voltage ELVSS. As an example of the present disclosure, the first driving voltage ELVDD may be about 8.4 V, the second driving voltage ELVSS may be about 0 V, and the reference voltage Vref may be about −1.0 V. Alternatively, the reference voltage Vref may have a voltage level lower than the first driving voltage ELVDD and higher than the second driving voltage ELVSS.

In one or more embodiments, each of the first to fifth transistors T1 to T5 and the first emission control transistor ET1 may be an N-type transistor. Each of the first to fifth transistors T1 to T5 and the first emission control transistor ET1 may include an oxide semiconductor as a semiconductor layer.

The light-emitting element ED may include an anode and a cathode. When the light-emitting element ED is an organic light-emitting element, the light-emitting element ED may further include an organic layer located between an anode and a cathode. The anode of the light-emitting element ED may be connected to the first power line PL1. In one or more embodiments, the anode of the light-emitting element ED may be directly connected to the first power line PL1. The cathode of the light-emitting element ED may be connected to the pixel circuit PXCa. The light-emitting element ED may emit light so as to correspond to the amount of current flowing in the first transistor T1 of the pixel circuit PXCa.

The first transistor T1 is connected between the cathode of the light-emitting element ED and the second power line PL2 receiving the second driving voltage ELVSS. The first transistor T1 may be referred to as a "driving transistor." The first transistor T1 may include a first electrode, a second electrode, and a gate electrode. The first electrode of the first transistor T1 may be connected to the cathode of the light-emitting element ED (or a fifth node N5), the second electrode of the first transistor T1 may be connected to a second node N2, and the gate electrode of the first transistor T1 may be connected to a first node N1. The first electrode of the first transistor T1 may be referred to as a drain of the first transistor T1, and the second electrode of the first transistor T1 may be referred to as a source of the first transistor T1. The first transistor T1 may operate depending on a potential of the first node N1. In one or more embodiments, the first transistor T1 may further include a back gate electrode. The back gate electrode may be connected to the second electrode of the first transistor T1.

The first capacitor C1 is connected between the first node N1 and a third node N3. The first capacitor C1 may include a first electrode connected to the first node N1 and a second electrode connected to the third node N3. The first capacitor C1 may store a difference voltage between the first node N1 and the third node N3.

The second transistor T2 is connected between the j-th data line DLj and the third node N3 to receive the i-th write scan signal GWi. The second transistor T2 may be referred to as a "switching transistor." The second transistor T2 may include a first electrode connected to the j-th data line DLj, a second electrode connected to the third node N3, and a gate electrode connected to the i-th write scan line GWLi. The second transistor T2 may apply the j-th data signal DSj received through the j-th data line DLj to the third node N3 in response to the i-th write scan signal GWi received through the i-th write scan line GWLi.

The third transistor T3 is connected between the reference voltage line VL1 and the first node N1 to receive the i-th reference scan signal GRi. The third transistor T3 may include a first electrode connected to the reference voltage line VL1, a second electrode connected to the first node N1, and a gate electrode connected to the i-th reference scan line GRLi. The third transistor T3 may be turned on in response to the i-th reference scan signal GRi received through the i-th reference scan line GRLi to deliver the reference voltage Vref to the first node N1. The first node N1 may be defined as a node to which the gate electrode of the first transistor T1, the first electrode of the first capacitor C1, and the second electrode of the third transistor T3 are connected.

The fourth transistor T4 is connected between the second and third nodes N2 and N3 to receive the i-th reference scan signal GRi. The fourth transistor T4 may include a first electrode connected to the second node N2, a second electrode connected to the third node N3, and a gate electrode connected to the i-th reference scan line GRLi. The fourth transistor T4 may be turned on in response to the i-th reference scan signal GRi received through the i-th reference scan line GRLi so as to electrically connect the second node N2 to the third node N3.

The third capacitor C3 is connected between the third node N3 and the second power line PL2. The third capacitor C3 may include a first electrode connected to the third node N3 and a second electrode connected to the second power line PL2. The third capacitor C3 may store a difference voltage between the third node N3 and the second power line PL2. The third node N3 may be defined as a node to which the second electrode of the first capacitor C1, the second electrode of the second transistor T2, the first electrode of the third capacitor C3, and the second electrode of the fourth transistor T4 are connected.

The first emission control transistor ET1 may be connected between the first transistor T1 and the second power line PL2 to receive the i-th emission control signal EMi. The first emission control transistor ET1 may include a first electrode connected to the second electrode of the first transistor T1, a second electrode connected to the second power line PL2, and a gate electrode connected to the i-th emission control line EMLi. The first emission control transistor ET1 may be turned on in response to the i-th emission control signal EMi received through the i-th emission control line EMLi so as to electrically connect the second power line PL2 to the second electrode of the first transistor T1. The gate electrode of the first emission control transistor ET1 may be connected to the i-th emission control line EMLi through the fourth node N4.

The second capacitor C2 may be connected between the second node N2 and the fourth node N4. The second capacitor C2 may include a first electrode connected to the second node N2 and a second electrode connected to the fourth node N4. The i-th emission control signal EMi may be applied to the fourth node N4. The second capacitor C2 may store a difference voltage between the second node N2 and the fourth node N4. As an example of the present disclosure, the capacitance of the second capacitor C2 may be equal to the capacitance of the first capacitor C1. However, the present disclosure is not limited thereto. The relationship between the capacitance of the first capacitor C1, the capacitance of the second capacitor C2, and the capacitance of the third capacitor C3 may be variously modified.

The second node N2 may be defined as a node to which the second electrode of the first transistor T1, the first electrode of the fourth transistor T4, the first electrode of the first emission control transistor ET1, and the first electrode of the second capacitor C2 are connected. The fourth node N4 may be defined as the node to which the gate electrode of the first emission control transistor ET1, the second electrode of the second capacitor C2, and the i-th emission control line EMLi are connected.

The fifth transistor T5 is connected between the first power line PL1 and the cathode (or the fifth node N5) of the light-emitting element ED to receive the i-th compensation scan signal GCi. The fifth transistor T5 may include a first electrode connected to the first power line PL1, a second electrode connected to the first electrode of the first transistor T1 (e.g., the fifth node N5), and a gate electrode connected to the i-th compensation scan line GCLi. The fifth transistor T5 may be turned on in response to the i-th compensation scan signal GCi received through the i-th compensation scan line GCLi to deliver the first driving voltage ELVDD to the fifth node N5.

The fifth node N5 may be defined as a node to which the first electrode of the first transistor T1, the second electrode of the fifth transistor T5, and the cathode of the light-emitting element ED are connected.

In one or more embodiments, the third and fourth transistors T3 and T4 may receive the same scan signal (e.g., the i-th reference scan signal GRi). Accordingly, the number of scan signals suitable to drive the pixel PXij may be reduced to 3, and thus the number of the scan-driving circuits suitable to drive the pixel PXij may be reduced to 3. When the number of the scan-driving circuits is reduced, the width of the non-display area NDA (see FIG. 1) of the display panel DP (see FIG. 1) may be reduced, and thus the dead space of the display panel DP may be reduced.

FIG. 3A illustrates the pixel circuit PXCa including the third capacitor C3 to stabilize the third node N3, but the present disclosure is not limited thereto. For example, as shown in FIG. 3B, the third capacitor C3 may be omitted in a pixel circuit PXCb. In this case, the third node N3 may be defined as a node to which the second electrode of the first capacitor C1, the second electrode of the second transistor T2, and the second electrode of the fourth transistor T4 are connected.

Referring to FIG. 4, each of the i-th write scan signal GWi, the i-th reference scan signal GRi, the i-th compensation scan signal GCi, and the i-th emission control signal EMi may respectively have an active level (or a high level) during some respective periods (e.g., an active period), and may respectively have an inactive level (or a low level) during other respective periods (e.g., an inactive period). When the above-described six transistors T1 to T5 and ET1 are N-type transistors, the active level of each of the i-th write scan signal GWi, the i-th reference scan signal GRi, the i-th compensation scan signal GCi, and the i-th emission control signal EMi may be a high level. Alternatively, when the above-described six transistors T1 to T5 and ET1 are P-type transistors, the active level of each of the i-th write scan signal GWi, the i-th reference scan signal GRi, the i-th compensation scan signal GCi, and the i-th emission control signal EMi may be a low level.

The inactive period NAP of the i-th emission control signal EMi may overlap the active period AP1 (or a first active period) of the i-th write scan signal GWi, an active period AP2 (or a second active period) of the i-th reference scan signal GRi, and an active period AP3 (or a third active period) of the i-th compensation scan signal GCi. The first active period AP1 does not overlap the second active period AP2, but may overlap the third active period AP3. The second active period AP2 may overlap the third active period AP3. The start time point of the inactive period NAP may be later than the start time point of the second active period AP2 and the start time point of the third active period AP3.

As an example of the present disclosure, the first active period AP1 may have duration that is less than or equal to the duration of a horizontal scan period 1H, and the second active period AP2 may have duration that is greater than the duration of the horizontal scan period 1H. For example, the duration of the first active period AP1 may correspond to about ⅓ of the duration of the horizontal scan period of 1 H, and the duration of the second active period AP2 may correspond to about 3 times the duration of the horizontal scan period 1H. The third active period AP3 may have duration that is greater than the duration of the second active period AP2.

Figure 5A:
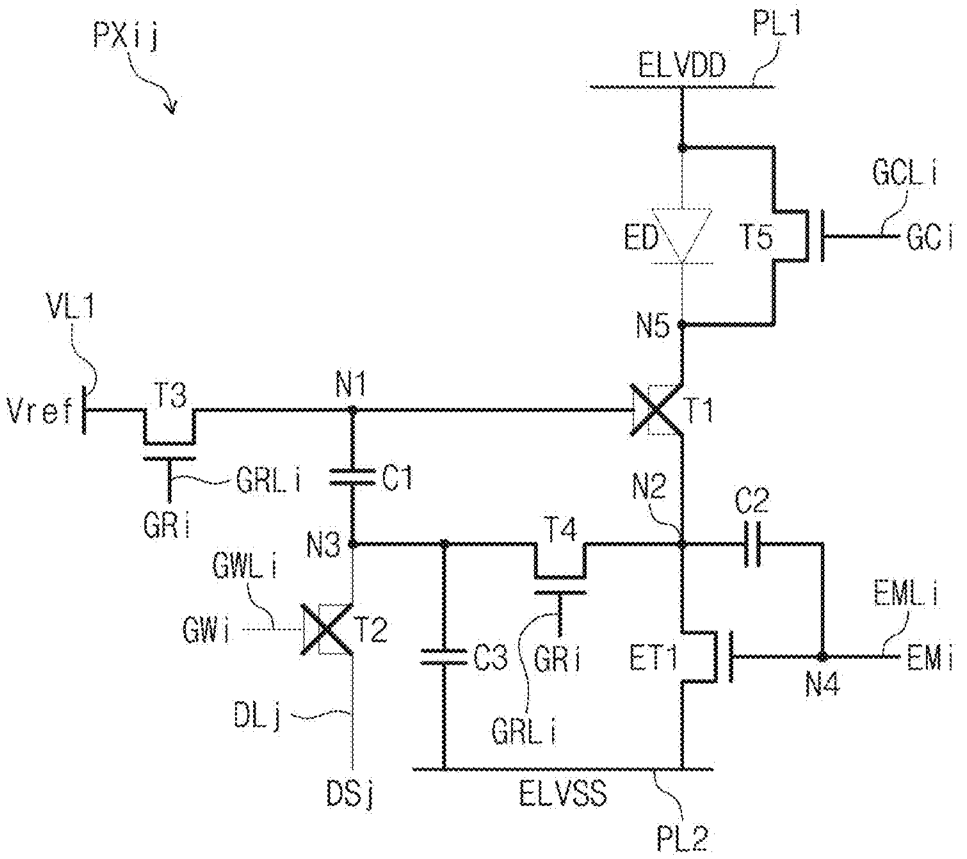
FIGS. 5A and 5B are drawings for describing an operation of a pixel during an initialization period, according to one or more embodiments of the present disclosure.
Figure 5B:
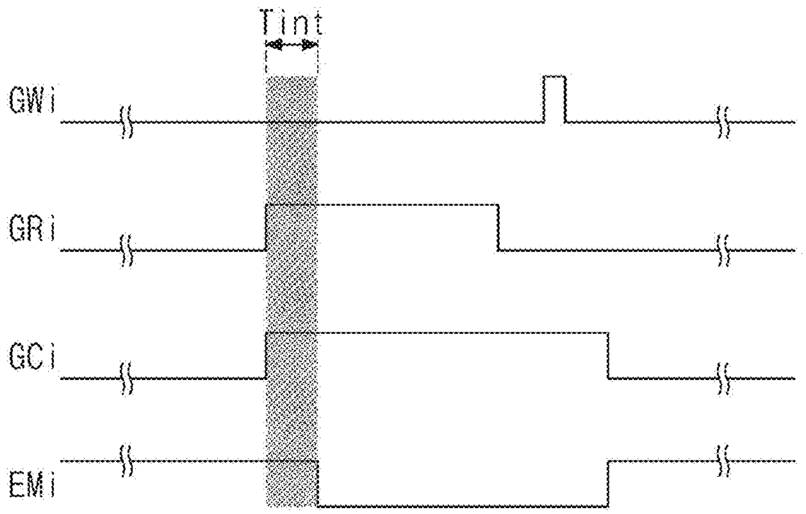

FIGS. 5A and 5B are drawings for describing an operation of the pixel PXij during an initialization period Tint, according to one or more embodiments of the present disclosure.

Referring to FIGS. 5A and 5B, during the initialization period Tint, each of the i-th reference scan signal GRi, the i-th compensation scan signal GCi, and the i-th emission control signal EMi may have an active level (e.g., a high level), and the i-th write scan signal GWi may have an inactive level (e.g., a low level).

During the initialization period Tint, the third transistor T3 and the fourth transistor T4 are turned on in response to the i-th reference scan signal GRi, and the first emission control transistor ET1 is turned on in response to the i-th emission control signal EMi. Accordingly, during the initialization period Tint, the first node N1 is initialized to the reference voltage Vref, and the second and third nodes N2 and N3 are initialized to the second driving voltage ELVSS.

During the initialization period Tint, the fifth transistor T5 is turned on in response to the i-th compensation scan signal GCi. Accordingly, the cathode of the light-emitting element ED (or the fifth node N5) is initialized to the first driving voltage ELVDD.

As the first node N1 and the third node N3 are initialized concurrently or substantially simultaneously during the initialization period Tint, the first capacitor C1 may be initialized to a difference value between the reference voltage Vref and the second driving voltage ELVSS. The second capacitor C2 may be initialized to a difference value between the second driving voltage ELVSS and a high level voltage (e.g., about 14 V) of the i-th emission control signal EMi. The initialization period Tint may be defined as a period during which the first electrode, the second electrode, and the gate electrode of the first transistor T1 are initialized, and may be defined as a period during which the cathode of the light-emitting element ED is initialized.

Because a potential difference (e.g., a gate-source voltage Vgs of the first transistor T1) between the first and second nodes N1 and N2 is less than a threshold voltage Vth of the first transistor T1 during the initialization period Tint, the first transistor T1 may be turned off.

The initialization period Tint may be terminated at a time point at which the i-th emission control signal EMi is inactivated.

Figure 6A:
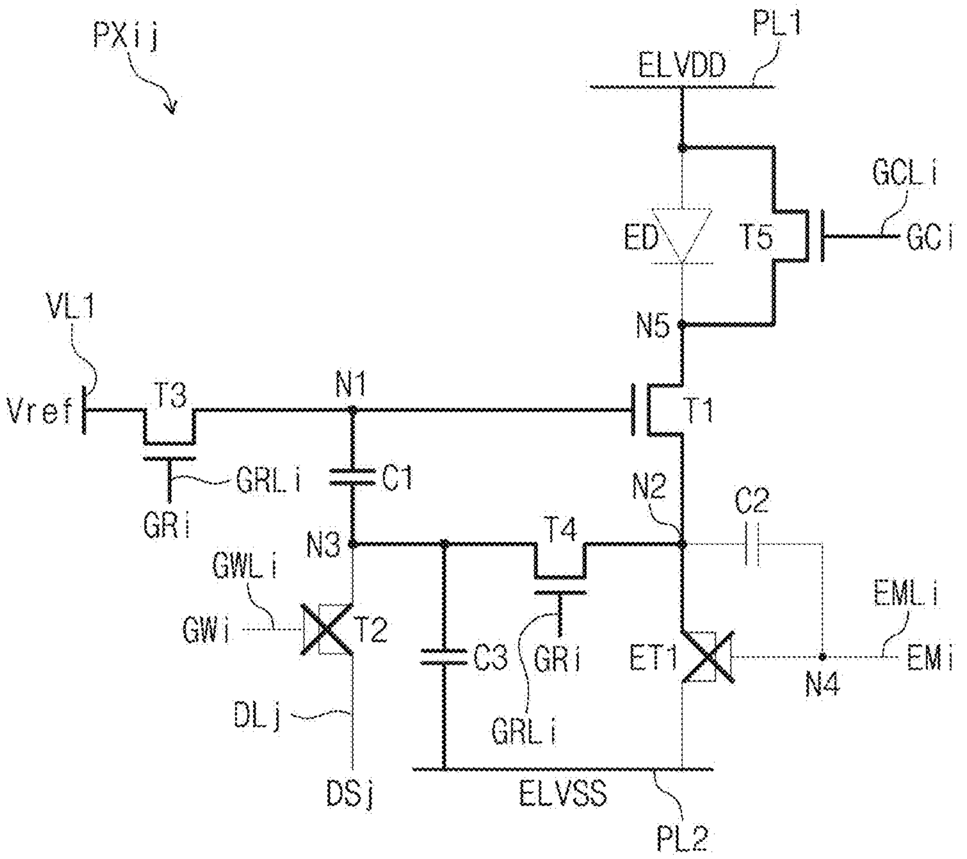
FIGS. 6A and 6B are drawings for describing an operation of a pixel during a compensation period, according to one or more embodiments of the present disclosure.
Figure 6B:
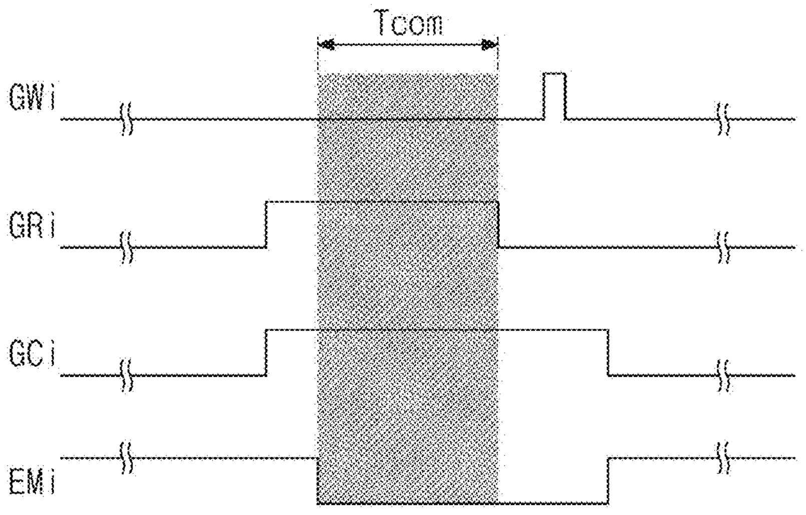

FIGS. 6A and 6B are drawings for describing an operation of the pixel PXij during a compensation period Tcom, according to one or more embodiments of the present disclosure.

Referring to FIGS. 6A and 6B, when the initialization period Tint (see FIG. 5B) is terminated, the compensation period Tcom occurs. In other words, the compensation period Tcom lags behind the initialization period Tint.

During the compensation period Tcom, the i-th reference scan signal GRi and the i-th compensation scan signal GCi may have active levels (e.g., high levels), and the i-th write scan signal GWi and the i-th emission control signal EMi may have inactive levels (e.g., low levels). The compensation period Tcom may start at a time point at which the i-th emission control signal EMi is inactivated.

During the compensation period Tcom, the third transistor T3 and the fourth transistor T4 may be maintained to be turned on in response to the i-th reference scan signal GRi. Accordingly, during the compensation period Tcom, the reference voltage Vref may be applied to the first node N1, and the second node N2 and the third node N3 may remain electrically connected through the fourth transistor T4.

During the compensation period Tcom, the first emission control transistor ET1 may be turned off in response to the i-th emission control signal EMi. Accordingly, at the start time point of the compensation period Tcom, potential "Vs" of the second node N2 may change from the second driving voltage ELVSS to "Vref−Vth." During the compensation period Tcom, a voltage level of the i-th emission control signal EMi is lowered to a low level (e.g., about −4 V). As the voltage level of the i-th emission control signal EMi is lowered to a low level, the potential "Vs" of the second node N2 may be lowered by the second capacitor C2 to be less than "Vref−Vth." When the potential "Vs" of the second node N2 decreases in a situation where potential "Vg" of the first node N1 is maintained at the reference voltage Vref, the gate-source voltage "Vgs" becomes greater than the threshold voltage "Vth."

When the gate-source voltage "Vgs" becomes greater than the threshold voltage "Vth," the first transistor T1 may be turned on, and the threshold voltage "Vth" of the first transistor T1 may be compensated by the coupling of the first capacitor C1.

During the compensation period Tcom, the fifth transistor T5 may be turned on in response to the i-th compensation scan signal GCi. Accordingly, even during the compensation period Tcom, the first driving voltage ELVDD may be applied to the fifth node N5, and thus the cathode of the light-emitting element ED may maintain an initialization state.

The compensation period Tcom may be terminated at a time point at which the i-th reference scan signal GRi is inactivated.

Figure 7A:
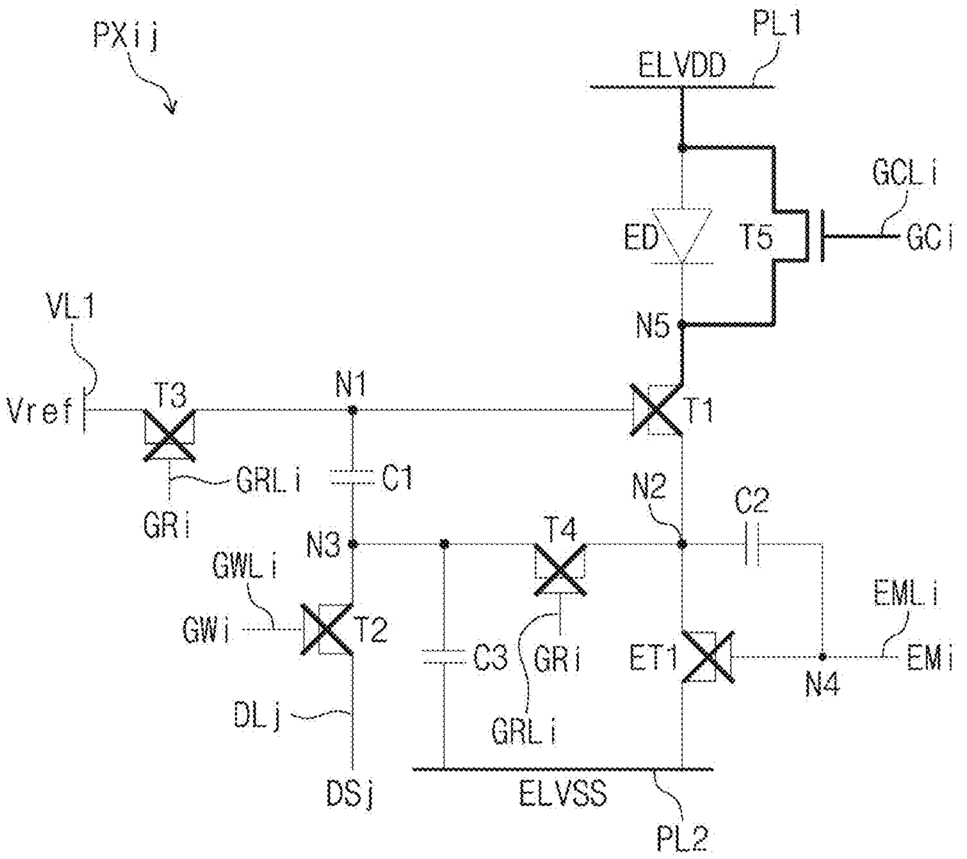
FIGS. 7A and 7B are drawings for describing an operation of a pixel during an interval period, according to one or more embodiments of the present disclosure.
Figure 7B:
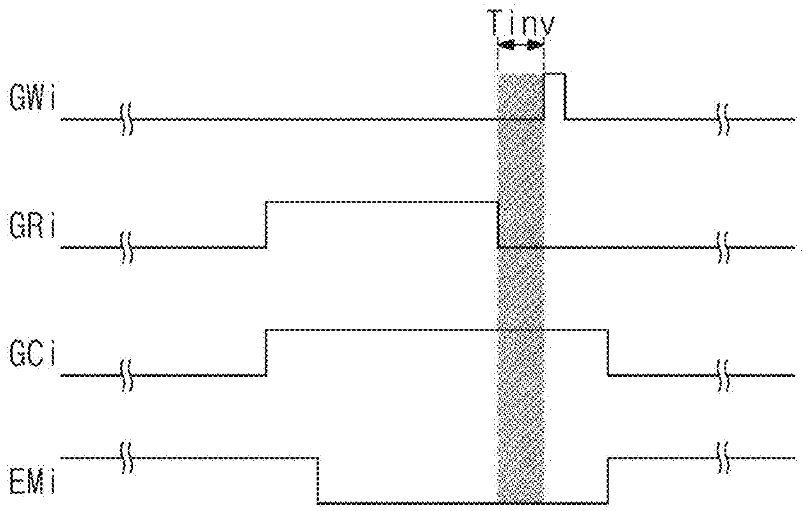

FIGS. 7A and 7B are diagrams for describing an operation of the pixel PXij during an interval period Tinv, according to one or more embodiments of the present disclosure.

Referring to FIGS. 7A and 7B, after the compensation period Tcom (see FIG. 6B), the interval period Tinv may be present.

During the interval period Tinv, the i-th reference scan signal GRi, the i-th write scan signal GWi, and the i-th emission control signal EMi may have an inactive level (e.g., a low level). During the interval period Tinv, the i-th compensation scan signal GCi may have an active level (e.g., a high level). Accordingly, during the interval period Tinv, the first to fourth transistors T1 to T4 and the first emission control transistor ET1 other than the fifth transistor T5 may be turned off.

During the interval period Tinv, the fifth transistor T5 may be turned on in response to the i-th compensation scan signal GCi. Accordingly, even during the interval period Tinv, the first driving voltage ELVDD may be applied to the fifth node N5, and thus the cathode of the light-emitting element ED may maintain an initialization state.

The interval period Tinv may be terminated at a time point at which the i-th write scan signal GWi is activated.

Figure 8A:
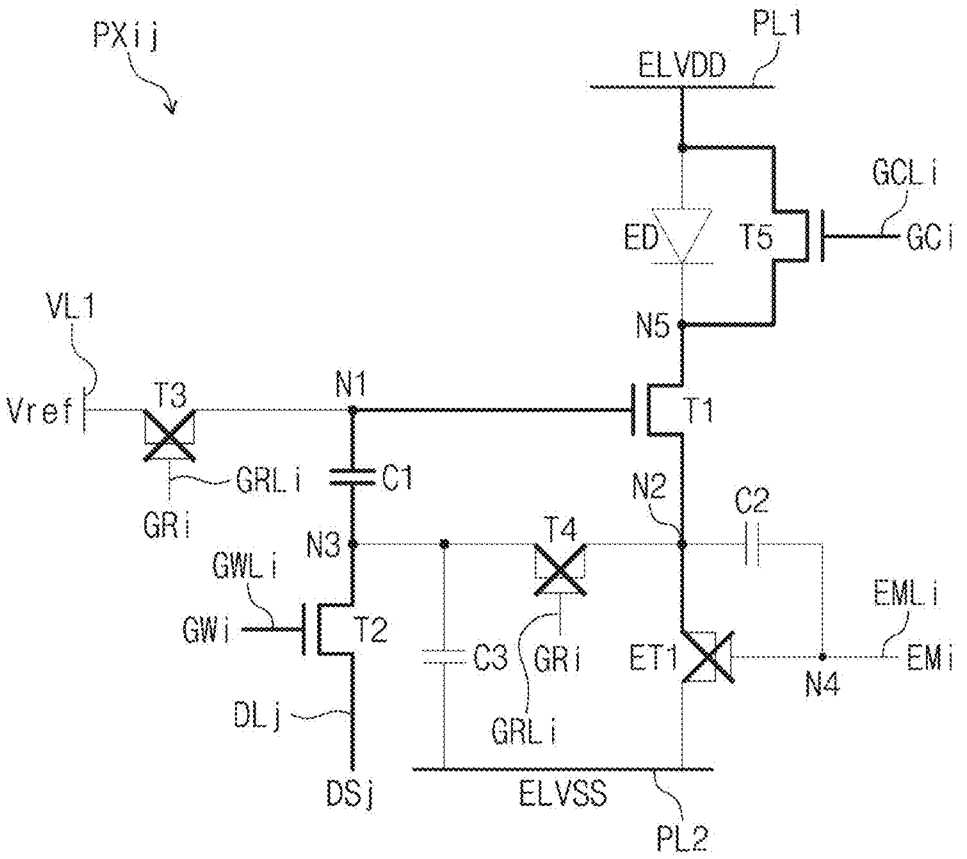
FIGS. 8A and 8B are drawings for describing an operation of a pixel during a data write period, according to one or more embodiments of the present disclosure.
Figure 8B:
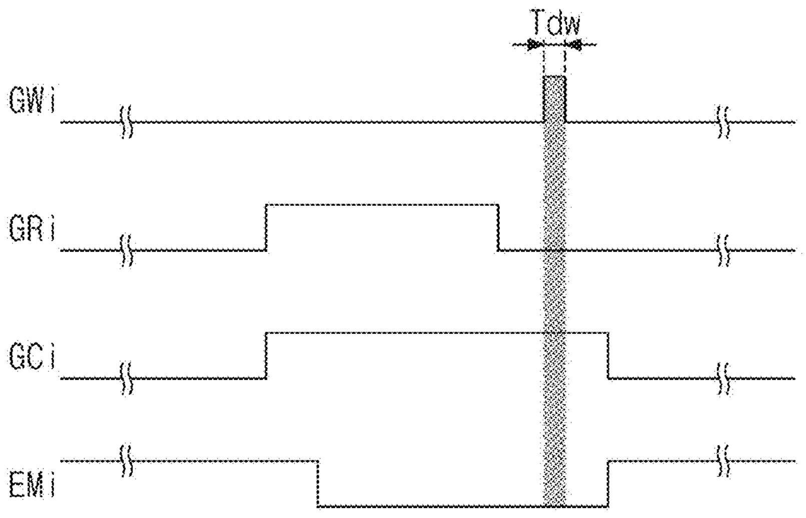

FIGS. 8A and 8B are drawings for describing an operation of a pixel during a data write period, according to one or more embodiments of the present disclosure.

Referring to FIGS. 8A and 8B, when the interval period Tinv (see FIG. 7B) is terminated, a data write period Tdw occurs. In other words, the data write period Tdw lags behind the interval period Tinv.

FIG. 7B illustrates that the interval period Tinv is present between the compensation period Tcom and the data write period Tdw, but the present disclosure is not limited thereto. For example, the interval period Tinv may be omitted from between the compensation period Tcom and the data write period Tdw, and the data write period Tdw may occur immediately after the compensation period Tcom.

During the data write period Tdw, the i-th write scan signal GWi and the i-th compensation scan signal GCi may have active levels (e.g., high levels), and the i-th reference scan signal GRi and the i-th emission control signal EMi may have inactive levels (e.g., low levels). The data write period Tdw may start at a time point at which the i-th write scan signal GWi is activated.

During the data write period Tdw, the second transistor T2 may be turned on in response to the i-th write scan signal GWi. Accordingly, during the data write period Tdw, the j-th data signal DSj may be applied to the third node N3. Accordingly, the potential of the third node N3 is switched from "Vref-Vth" to a data voltage "Vdata." Here, a change (e.g., "Vdata−Vref+Vth") in the third node N3 is reflected in the potential "Vg" of the first node N1 by the coupling of the first capacitor C1. That is, the potential "Vg" of the first node N1 increases by the amount of change in the third node N3 from the reference voltage Vref. The data voltage "Vdata" may be reflected to the potential "Vg" of the first node N1 without loss by coupling the first capacitor C1. As a result, the desired amount of luminescent current may flow in the light-emitting element ED during an emission period Tem (see FIG. 9B).

The threshold voltage "Vth" of the first transistor T1 as well as the data voltage Vdata may be included in the potential "Vg" of the first node N1 by the coupling of the first capacitor C1.

When the potential "Vg" of the first node N1 rises from the reference voltage Vref by the data voltage "Vdata," the potential difference "Vgs" between the first and second nodes N1 and N2 rises to be greater than or equal to the threshold voltage "Vth," and the first transistor T1 is turned on.

During the data write period Tdw, the i-th emission control signal EMi has an inactive level, and thus the first emission control transistor ET1 may be maintained in the turn-off state. The data write period Tdw may be terminated at a time point at which the i-th write scan signal GWi is inactivated.

Figure 9A:
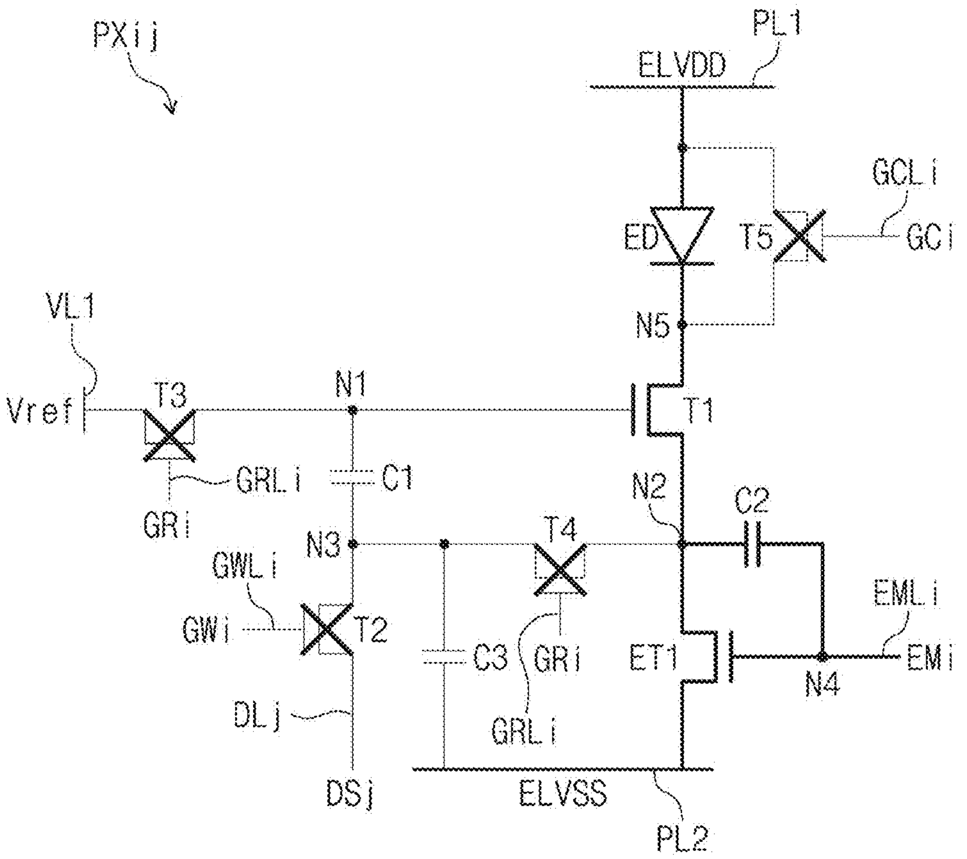
FIGS. 9A and 9B are drawings for describing an operation of a pixel during an emission period, according to one or more embodiments of the present disclosure.
Figure 9B:
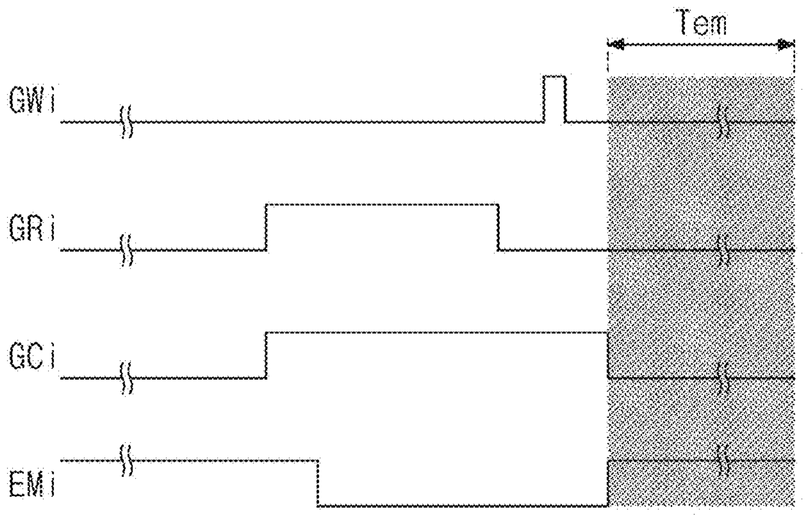

FIGS. 9A and 9B are drawings for describing an operation of a pixel during an emission period, according to one or more embodiments of the present disclosure.

Referring to FIGS. 9A and 9B, when the data write period Tdw (see FIG. 8B) is terminated, an emission period Tem occurs. In other words, the emission period Tem lags behind the data write period Tdw.

During the emission period Tem, the i-th reference scan signal GRi, the i-th compensation scan signal GCi, and the i-th write scan signal GWi may have inactive levels (e.g., low levels), and the i-th emission control signal EMi may have an active level (e.g., a high level). The emission period Tem may start at a time point at which the i-th emission control signal EMi is activated.

During the emission period Tem, the first transistor T1 may be turned on by a difference voltage stored in the first capacitor C1. During the emission period Tem, the first emission control transistor ET1 may be turned on in response to the i-th emission control signal EMi. During the emission period Tem, the first transistor T1 may be electrically connected to the second power line PL2 through the first emission control transistor ET1 turned on. Accordingly, a driving current may flow between the first power line PL1 and the second power line PL2. The amount of luminescent current flowing through the light-emitting element ED may be determined by the data voltage "Vdata."

According to one or more embodiments of the present disclosure, the threshold voltage "Vth" of the first transistor T1 may not affect the luminescent current flowing through the light-emitting element ED. The threshold voltage "Vth" of the first transistor T1 included in each of the pixels PX (see FIG. 1) may be different depending on characteristics of the first transistor T1. However, regardless of the characteristics of the first transistor T1 included in each of the pixels PX (see FIG. 1), the luminescent current flowing through the light-emitting element ED during the subsequent emission period Tem may be constant. Accordingly, the overall display quality of the display device DD (see FIG. 1) may be improved.

Figure 10:
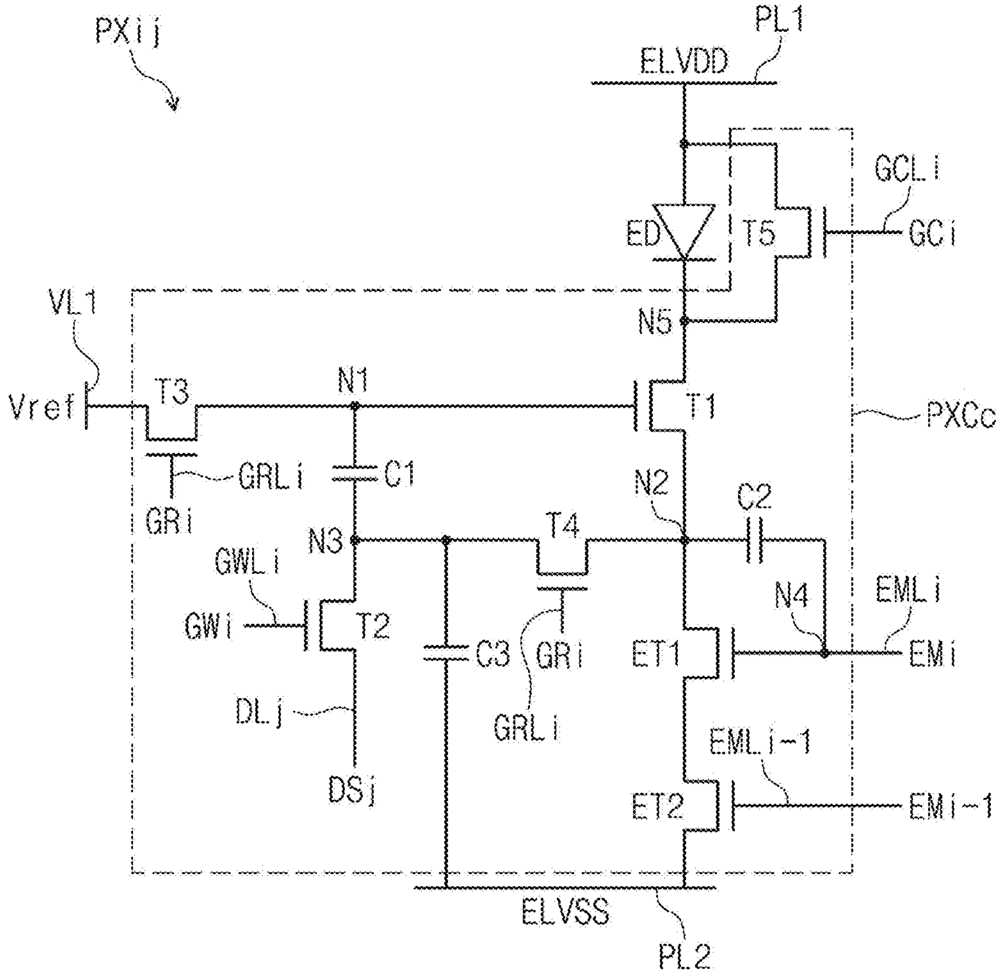
FIG. 10 is a circuit diagram of a pixel, according to one or more embodiments of the present disclosure.
Figure 11:
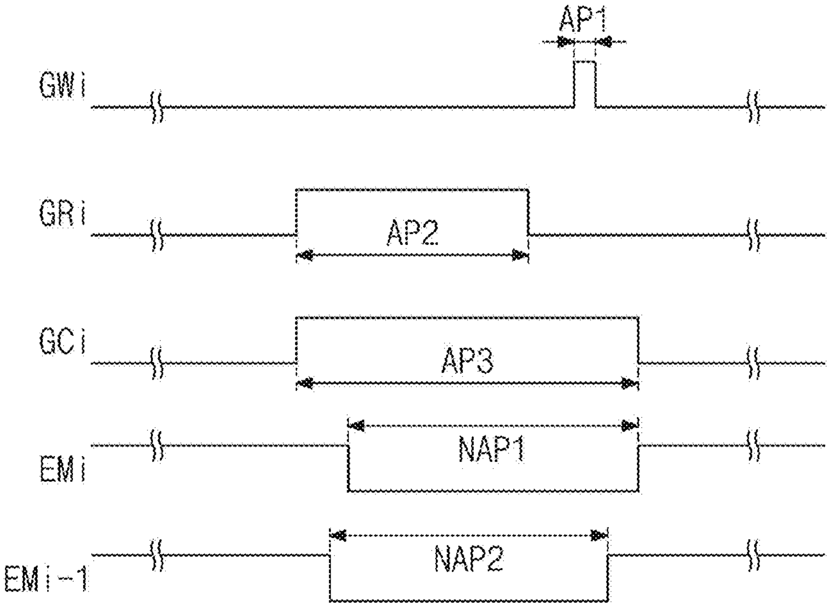
FIG. 11 is a waveform diagram illustrating signals applied to a pixel shown in FIG. 10.

FIG. 10 is a circuit diagram of a pixel PXij, according to one or more embodiments of the present disclosure. FIG. 11 is a waveform diagram illustrating signals applied to the pixel PXij shown in FIG. 10. However, the same reference numerals are given to the same components as those shown in FIG. 3A among the components shown in FIG. 10, and thus a detailed description thereof will be omitted.

Referring to FIG. 10, the pixel PXij may include a pixel circuit PXCc (or a pixel-driving circuit), and the light-emitting element ED electrically connected to the pixel circuit PXCc. In one or more embodiments, the pixel circuit PXCc may include seven transistors (referred to as "first to fifth transistors T1 to T5 and first and second emission control transistors ET1 and ET2"), and three capacitors (referred to as "a first capacitor C1, a second capacitor C2, a third capacitor C3"). In one or more embodiments of the present disclosure, one of the seven transistors of the pixel circuit PXCc may be omitted, or an additional transistor may be further included in the pixel circuit PXCc. For example, the third capacitor C3 may be omitted in the pixel circuit PXCc.

In one or more embodiments, each of the first to fifth transistors T1 to T5, the first and second emission control transistors ET1 and ET2 may be an N-type transistor.

The first emission control transistor ET1 may be connected between the first transistor T1 and the second emission control transistor ET2 to receive the i-th emission control signal EMi. The first emission control transistor ET1 may include a first electrode connected to the second electrode of the first transistor T1, a second electrode connected to the second emission control transistor ET2, and a gate electrode connected to the i-th emission control line EMLi. The first emission control transistor ET1 may be turned on in response to the i-th emission control signal EMi received through the i-th emission control line EMLi so as to electrically connect the second emission control transistor ET2 to the second electrode of the first transistor T1. The gate electrode of the first emission control transistor ET1 may be connected to the i-th emission control line EMLi through the fourth node N4.

The second emission control transistor ET2 may be connected between the first emission control transistor ET1 and the second power line PL2 to receive an (i−1)-th emission control signal EMi−1 (e.g., a "second emission control signal"). The second emission control transistor ET2 may include a first electrode connected to the second electrode of the first emission control transistor ET1, a second electrode connected to the second power line PL2, and a gate electrode connected to the (i−1)-th emission control line EMLi−1. The second emission control transistor ET2 may be turned on in response to the (i−1)-th emission control signal EMi−1 received through the (i−1)-th emission control line EMLi−1 so as to electrically connect the second power line PL2 to the second electrode of the first emission control transistor ET1.

Referring to FIG. 11, each of the i-th write scan signal GWi, the i-th reference scan signal GRi, the i-th compensation scan signal GCi, the i-th emission control signal EMi, and the (i−1)-th emission control signal EMi−1 may respectively have an active level (or a high level) during some respective periods (e.g., active periods), and may respectively have an inactive level (or a low level) during other respective periods (e.g., inactive periods). When the above-described seven transistors T1 to T5, ET1, and ET2 are N-type transistors, the active level of each of the i-th write scan signal GWi, the i-th reference scan signal GRi, the i-th compensation scan signal GCi, the i-th emission control signal EMi, and the (i−1)-th emission control signal EMi−1 may be a high level. Alternatively, when the above-described seven transistors T1 to T5, ET1, and ET2 are P-type transistors, the active level of each of the i-th write scan signal GWi, the i-th reference scan signal GRi, the i-th compensation scan signal GCi, the i-th emission control signal EMi, and the (i−1)-th emission control signal EMi−1 may be a low level.

The (i−1)-th emission control signal EMi−1 may be a signal deactivated before the i-th emission control signal EMi. Accordingly, the start time point of an inactive period NAP2 of the (i−1)-th emission control signal EMi−1 precedes the start time point of the inactive period NAP1 of the i-th emission control signal EMi. The inactive period NAP1 (or a first inactive period) of the i-th emission control signal EMi and the inactive period NAP2 (or a second inactive period) of the (i−1)-th emission control signal EMi−1 may overlap the active period AP1 (or a first active period) of the i-th write scan signal GWi, the active period AP2 (or a second active period) of the i-th reference scan signal GRi, and the active period AP3 (or a third active period) of the i-th compensation scan signal GCi. The start time point of the second inactive period NAP2 may be later than the start time point of the second active period AP2 and the start time point of the third active period AP3.

Figure 12A:
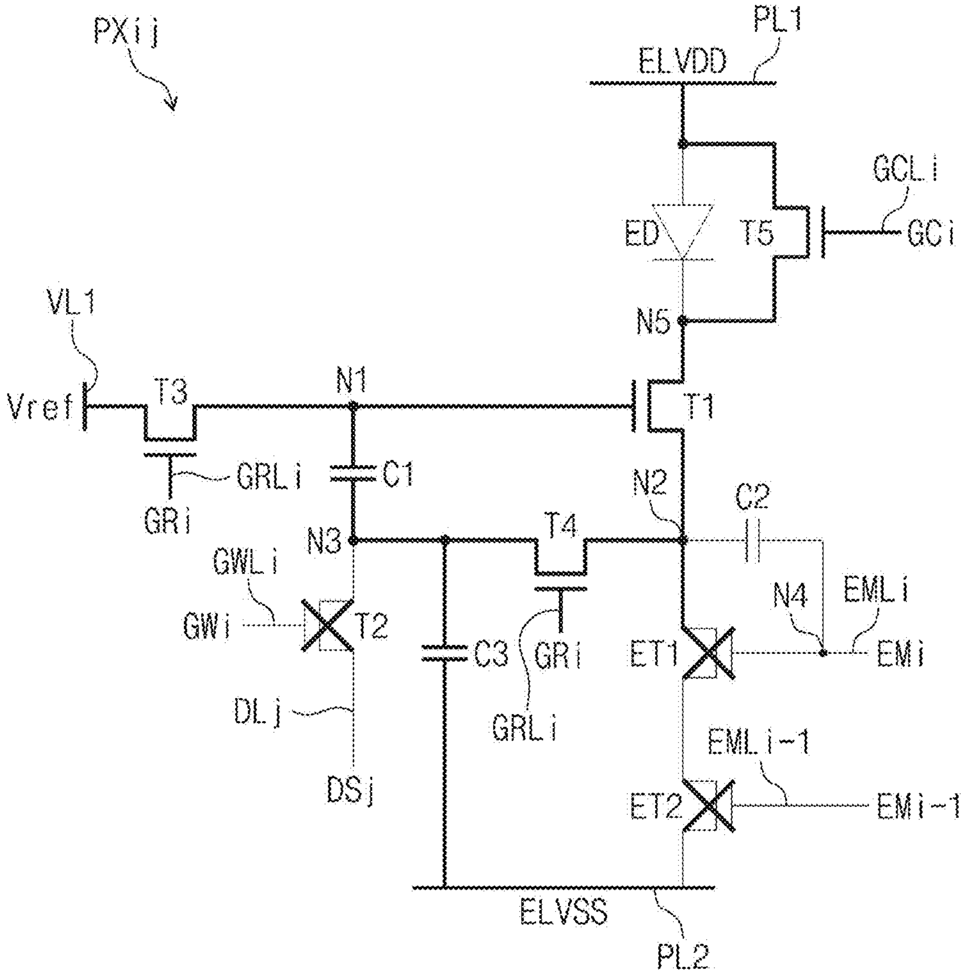
FIGS. 12A and 12B are drawings for describing an operation of a pixel illustrated in FIG. 10.
Figure 12B:
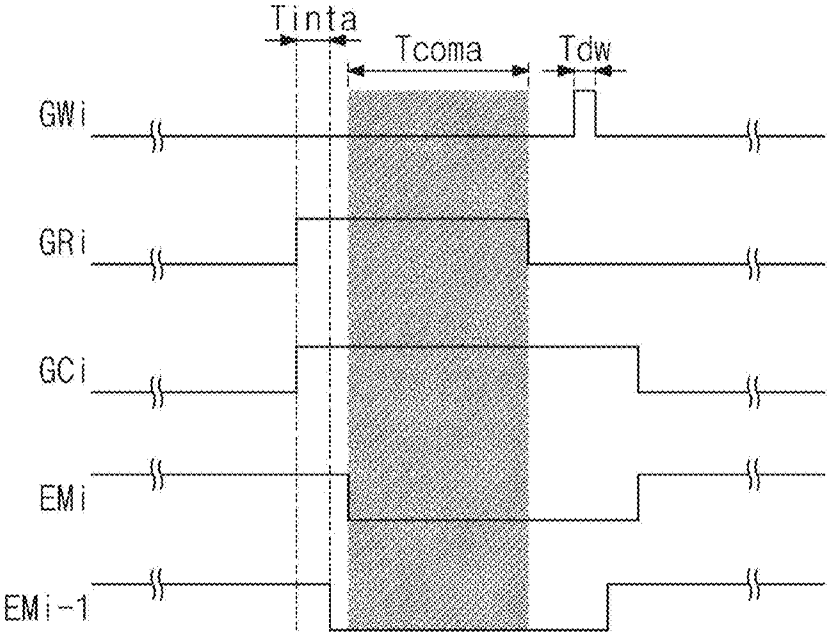

FIGS. 12A and 12B are drawings for describing an operation of the pixel PXij illustrated in FIG. 10.

Referring to FIGS. 12A and 12B, during the initialization period Tinta, each of the i-th reference scan signal GRi, the i-th compensation scan signal GCi, the (i−1)-th emission control signal EMi−1, and the i-th emission control signal EMi may have an active level (e.g., a high level), and the i-th write scan signal GWi may have an inactive level (e.g., a low level).

During the initialization period Tinta, the third transistor T3 and the fourth transistor T4 are turned on in response to the i-th reference scan signal GRi. Accordingly, during the initialization period Tinta, the first node N1 is initialized to the reference voltage Vref.

During the initialization period Tinta, the first and second emission control transistors ET1 and ET2 are turned on in response to the (i−1)-th and i-th emission control signals EMi−1 and EMi, respectively. Accordingly, during the initialization period Tinta, the second and third nodes N2 and N3 are initialized with the second driving voltage ELVSS.

As the first node N1 and the third node N3 are initialized concurrently or substantially simultaneously during the initialization period Tinta, the first capacitor C1 may be initialized to a difference value between the reference voltage Vref and the second driving voltage ELVSS. The second capacitor C2 may be initialized to a difference value between the second driving voltage ELVSS and a high level voltage (e.g., about 14 V) of the i-th emission control signal EMi. The initialization period Tinta is defined as a period, during which the first electrode, the second electrode, and the gate electrode of the first transistor T1 are initialized.

The initialization period Tinta may be terminated at a time point at which the (i−1)-th emission control signal EMi−1 is inactivated.

After the initialization period Tinta is terminated, a compensation period Tcoma occurs. In other words, the compensation period Tcoma lags behind the initialization period Tinta.

During the compensation period Tcoma, the i-th reference scan signal GRi and the i-th compensation scan signal GCi may have an active level (e.g., a high level), and the i-th write scan signal GWi, the (i−1)-th emission control signal EMi−1, and the i-th emission control signal EMi may have inactive levels (e.g., low levels). The compensation period Tcoma may start at a time point at which the i-th emission control signal EMi is inactivated.

During the compensation period Tcoma, the third transistor T3 and the fourth transistor T4 may be maintained to be turned on in response to the i-th reference scan signal GRi. Accordingly, during the compensation period Tcoma, the reference voltage Vref may be applied to the first node N1, and the second node N2 and the third node N3 may remain electrically connected through the fourth transistor T4.

During the compensation period Tcoma, the first and second emission control transistors ET1 and ET2 may be turned off in response to the (i−1)-th and i-th emission control signals EMi−1 and EMi, respectively. Accordingly, at the start time point of the compensation period Tcoma, potential "Vs" of the second node N2 may change from the second driving voltage ELVSS to "Vref-Vth." During the compensation period Tcoma, a voltage level of the i-th emission control signal EMi is lowered to a low level (e.g., about −4 V). As the i-th emission control signal EMi has a low level, the potential "Vs" of the second node N2 may be lowered by the second capacitor C2 to be less than "Vref-Vth." When the potential "Vs" of the second node N2 decreases in a situation where potential "Vg" of the first node N1 is maintained at the reference voltage Vref, the gate-source voltage "Vgs" becomes greater than the threshold voltage "Vth."

When the gate-source voltage "Vgs" becomes greater than the threshold voltage "Vth," the first transistor T1 may be turned on, and the threshold voltage "Vth" of the first transistor T1 may be compensated by the coupling of the first capacitor C1.

The compensation period Tcoma may be terminated at a time point at which the i-th reference scan signal GRi is inactivated.

Figure 13:
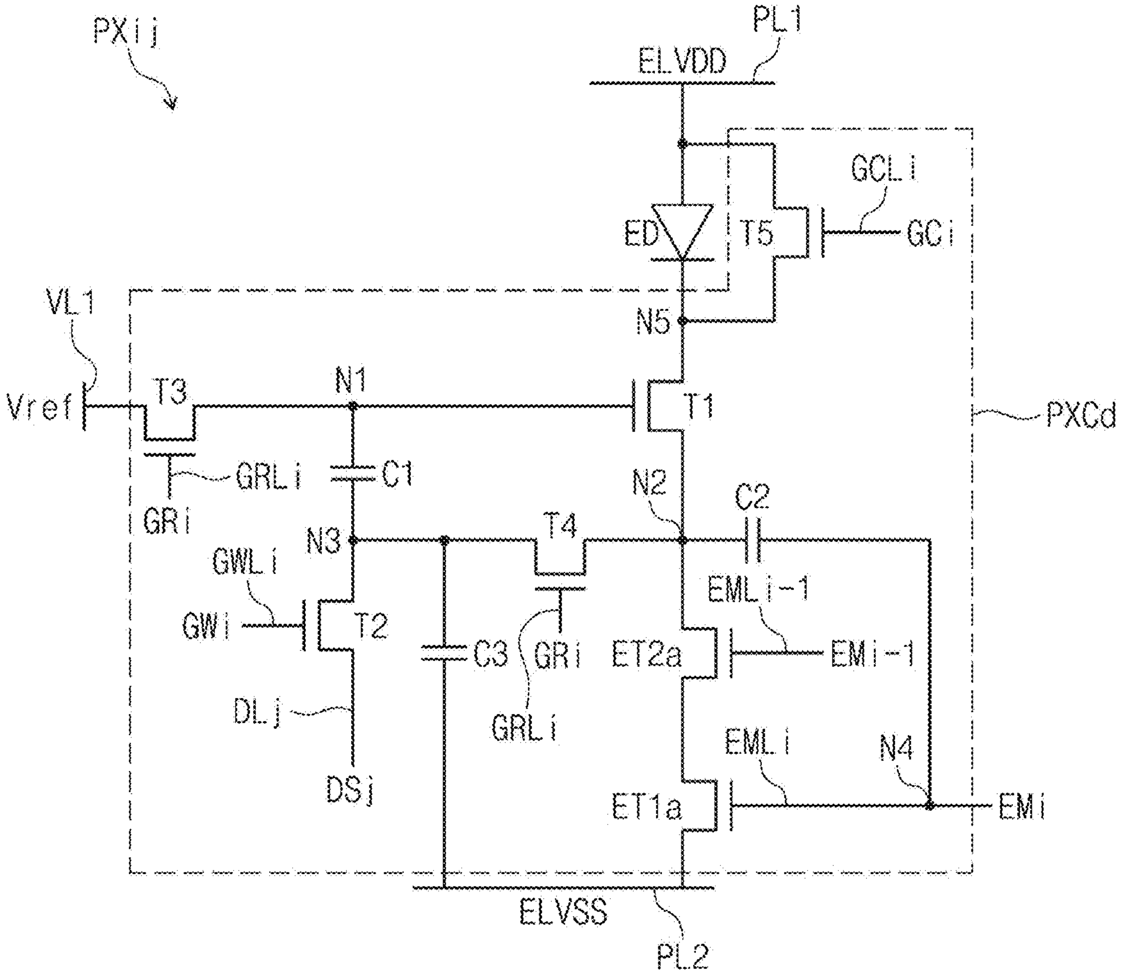
FIG. 13 is a circuit diagram of a pixel, according to one or more embodiments of the present disclosure.
Figure 14:
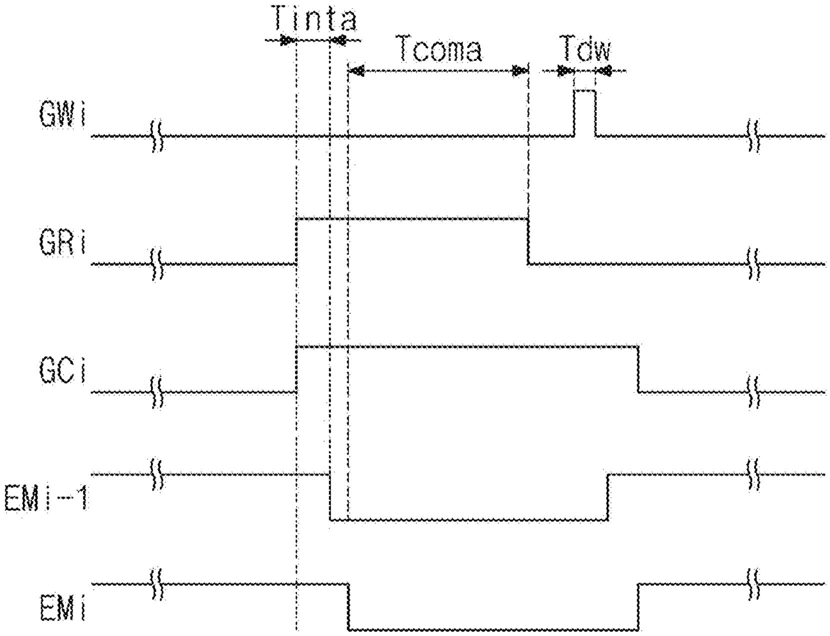
FIG. 14 is a waveform diagram illustrating signals applied to a pixel shown in FIG. 13.

FIG. 13 is a circuit diagram of a pixel PXij, according to one or more embodiments of the present disclosure. FIG. 14 is a waveform diagram illustrating signals applied to the pixel PXij shown in FIG. 13. However, the same reference numerals are given to the same components as those shown in FIG. 10 among the components shown in FIG. 13, and thus a detailed description thereof will be omitted. Referring to FIG. 13, the pixel PXij may include a pixel circuit PXCd (or a pixel-driving circuit), and the light-emitting element ED electrically connected to the pixel circuit PXCd. In one or more embodiments, the pixel circuit PXCd may include seven transistors (referred to as "first to fifth transistors T1 to T5 and first and second emission control transistors ET1*a* and ET2*a*"), and three capacitors (referred to as "a first capacitor C1, a second capacitor C2, a third capacitor C3"). In one or more embodiments of the present disclosure, one of the seven transistors of the pixel circuit PXCd may be omitted, or an additional transistor may be further included in the pixel circuit PXCd. For example, the third capacitor C3 may be omitted in the pixel circuit PXCd.

In one or more embodiments, each of the first to fifth transistors T1 to T5, the first and second emission control transistors ET1*a* and ET2*a* may be an N-type transistor.

The first emission control transistor ET1*a* may be connected between the first transistor T1 and the second power line PL2 to receive the i-th emission control signal EMi (e.g., a "first emission control signal"). The first emission control transistor ET1*a* may include a first electrode connected to the second electrode of the second emission control transistor ET2*a*, a second electrode connected to the second power line PL2, and a gate electrode connected to the i-th emission control line EMLi. The first emission control transistor ET1*a* may be turned on in response to the i-th emission control signal EMi received through the i-th emission control line EMLi so as to electrically connect the second power line PL2 to the second electrode of the second emission control transistor ET2*a*. The gate electrode of the first emission control transistor ET1*a* may be connected to the i-th emission control line EMLi through the fourth node N4.

The second emission control transistor ET2*a* may be connected between the first transistor T1 and the first emission control transistor ET1*a* to receive the (i−1)-th emission control signal EMi−1 (e.g., a "second emission control signal"). The second emission control transistor ET2*a* may include a first electrode connected to the second electrode of the first transistor T1, a second electrode connected to the first electrode of the first emission control transistor ET1*a*, and a gate electrode connected to the (i−1)-th emission control line EMLi−1. The second emission control transistor ET2*a* may be turned on in response to the (i−1)-th emission control signal EMi−1 received through the (i−1)-th emission control line EMLi−1 so as to electrically connect the first transistor T1 to the first emission control transistor ET1*a*.

Referring to FIGS. 13 and 14, during the initialization period Tinta, the first and second emission control transistors ET1a and ET2a are turned on in response to the (i−1)-th and i-th emission control signals EMi−1 and EMi, respectively. Accordingly, during the initialization period Tinta, the second and third nodes N2 and N3 are initialized with the second driving voltage ELVSS.

The initialization period Tinta may be terminated at a time point at which the (i−1)-th emission control signal EMi−1 is inactivated.

After the initialization period Tinta is terminated, a compensation period Tcoma occurs. In other words, the compensation period Tcoma lags behind the initialization period Tinta.

During the compensation period Tcoma, the first and second emission control transistors ET1 and ET2 may be turned off in response to the (i−1)-th and i-th emission control signals EMi−1 and EMi, respectively. Accordingly, at the start time point of the compensation period Tcoma, potential "Vs" of the second node N2 may change from the second driving voltage ELVSS to "Vref−Vth." During the compensation period Tcoma, a voltage level of the i-th emission control signal EMi is lowered to a low level (e.g., about −4 V). As the i-th emission control signal EMi has a low level, the potential Vs of the second node N2 may be lowered by the second capacitor C2 to be less than "Vref-Vth." When the potential "Vs" of the second node N2 decreases in a situation where potential "Vg" of the first node N1 is maintained at the reference voltage Vref, the gate-source voltage "Vgs" becomes greater than the threshold voltage "Vth."

When the gate-source voltage "Vgs" becomes greater than the threshold voltage "Vth," the first transistor T1 may be turned on, and the threshold voltage "Vth" of the first transistor T1 may be compensated by the coupling of the first capacitor C1.

The compensation period Tcoma may be terminated at a time point at which the i-th reference scan signal GRi is inactivated.

Figure 15:
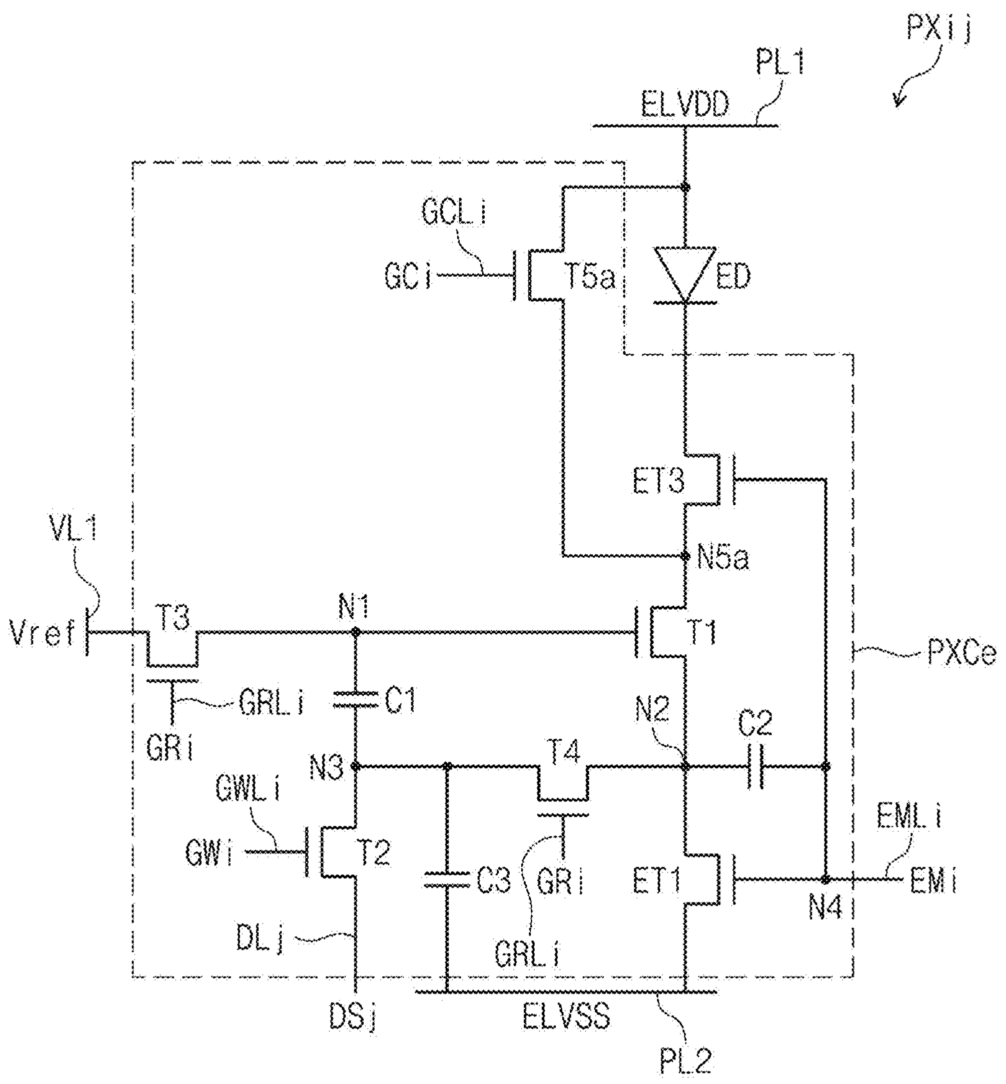
FIG. 15 is a circuit diagram of a pixel, according to one or more embodiments of the present disclosure.

FIG. 15 is a circuit diagram of a pixel PXij, according to one or more embodiments of the present disclosure. However, the same reference numerals are given to the same components as those shown in FIG. 3A among the components shown in FIG. 15, and thus a detailed description thereof will be omitted.

Referring to FIG. 15, the pixel PXij may include a pixel circuit PXCe (or a pixel-driving circuit), and the light-emitting element ED electrically connected to the pixel circuit PXCe. In one or more embodiments, the pixel circuit PXCe may include seven transistors (referred to as "first to fifth transistors T1 to T5a and first and third emission control transistors ET1 and ET3"), and three capacitors (referred to as "a first capacitor C1, a second capacitor C2, a third capacitor C3"). In one or more embodiments of the present disclosure, one of the seven transistors of the pixel circuit PXCe may be omitted, or an additional transistor may be further included in the pixel circuit PXCe. For example, the third capacitor C3 may be omitted in the pixel circuit PXCe.

In one or more embodiments, each of the first to fifth transistors T1 to T5a, the first and third emission control transistors ET1 and ET3 may be an N-type transistor.

The fifth transistor T5a is connected between the first power line PL1 and a fifth node N5a to receive the i-th compensation scan signal GCi. The fifth transistor T5a may include a first electrode connected to the first power line PL1, a second electrode connected to the first electrode of the first transistor T1 (e.g., the fifth node N5a), and a gate electrode connected to the i-th compensation scan line GCLi. The fifth transistor T5a may be turned on in response to the i-th compensation scan signal GCi received through the i-th compensation scan line GCLi to deliver the first driving voltage ELVDD to the fifth node N5a.

The third emission control transistor ET3 is connected between the first transistor T1 and the cathode of the light-emitting element ED to receive the i-th emission control signal EMi as a third emission control signal. The third emission control transistor ET3 may include a first electrode connected to the cathode of the light-emitting element ED, a second electrode connected to the first electrode (e.g., the fifth node N5a) of the first transistor T1, and a gate electrode connected to the i-th emission control line EMLi. The third emission control transistor ET3 may be turned on in response to the i-th emission control signal EMi received through the i-th emission control line EMLi to electrically connect the cathode of the light-emitting element ED to the first electrode (e.g., the fifth node N5a) of the first transistor T1.

The fifth node N5a may be defined as a node to which the first electrode of the first transistor T1, the second electrode of the fifth transistor T5a, and the second electrode of the third emission control transistor ET3 are connected.

Referring to FIGS. 5B and 15, during the initialization period Tint, the fifth transistor T5a is turned on in response to the i-th compensation scan signal GCi. Accordingly, the first electrode (or the fifth node N5a) of the first transistor T1 is initialized to the first driving voltage ELVDD. During the initialization period Tint, the third emission control transistor ET3 is turned on in response to the i-th emission control signal EMi. The cathode of the light-emitting element ED and the first electrode (or the fifth node N5a) of the first transistor T1 are electrically connected through the third emission control transistor ET3 turned on. Accordingly, during the initialization period Tint, the cathode of the light-emitting element ED may be initialized to the first driving voltage ELVDD.

Figure 16:
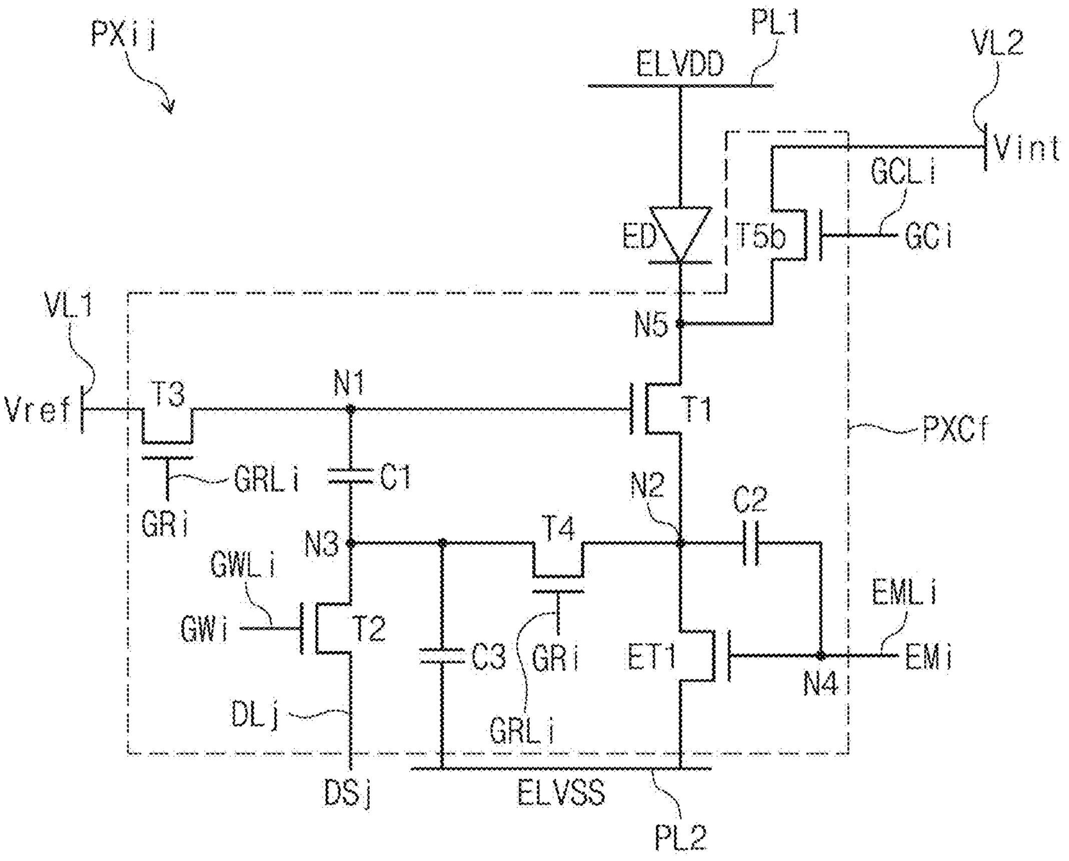
FIG. 16 is a circuit diagram of a pixel, according to one or more embodiments of the present disclosure.

FIG. 16 is a circuit diagram of a pixel PXij, according to one or more embodiments of the present disclosure. However, the same reference numerals are given to the same components as those shown in FIG. 3A among the components shown in FIG. 16, and thus a detailed description thereof will be omitted.

Referring to FIG. 16, the pixel PXij may include a pixel circuit PXCf (or a pixel-driving circuit), and the light-emitting element ED electrically connected to the pixel circuit PXCf. In one or more embodiments, the pixel circuit PXCf may include six transistors (referred to as "first to fifth transistors T1 to T5b and a first emission control transistor ET1"), and three capacitors (referred to as "a first capacitor C1, a second capacitor C2, a third capacitor C3").

The fifth transistor T5b is connected between the initialization voltage line VL2 and the fifth node N5 to receive the i-th compensation scan signal GCi. The fifth transistor T5b may include a first electrode connected to the initialization voltage line VL2, a second electrode connected to the first electrode of the first transistor T1 (e.g., the fifth node N5), and a gate electrode connected to the i-th compensation scan line GCLi. The fifth transistor T5b may be turned on in response to the i-th compensation scan signal GCi received through the i-th compensation scan line GCLi to deliver the initialization voltage Vint applied to the initialization voltage line VL2 to the fifth node N5. As an example of the present disclosure, the initialization voltage Vint may have different voltage levels depending on the color of the pixel PXij. In other words, initialization voltages having different voltage levels may be applied to each red, green, and blue pixel.

Figure 17:
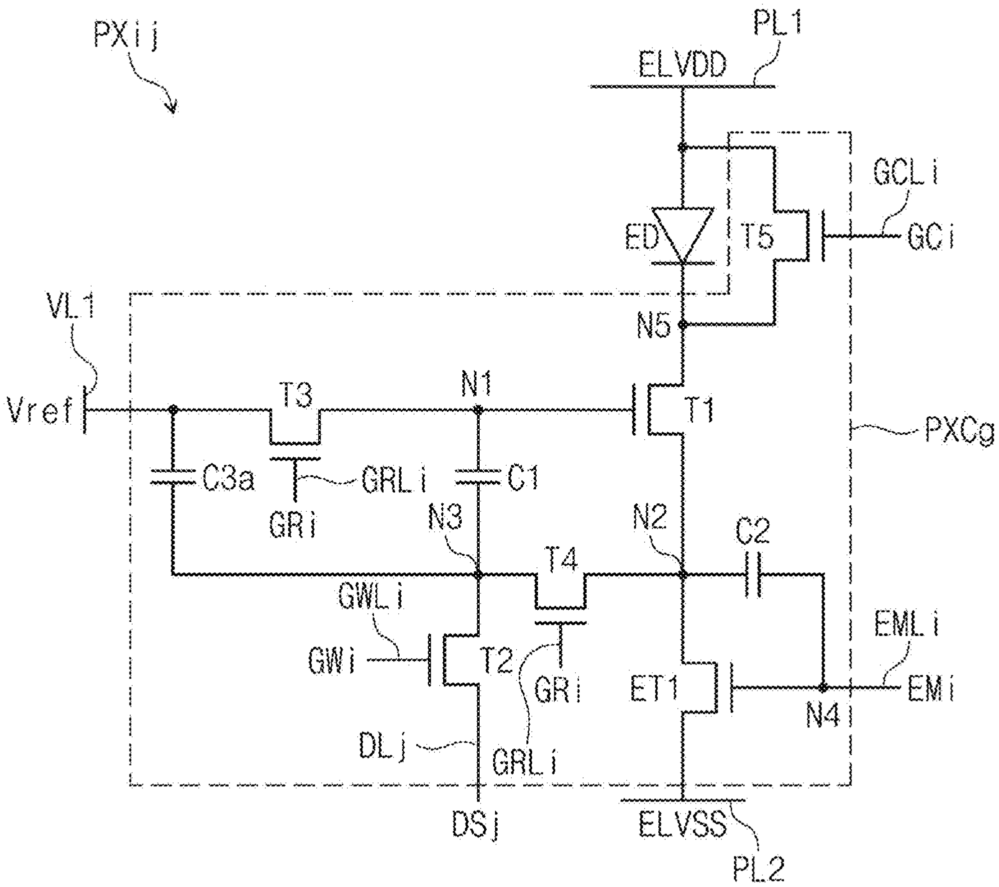
FIG. 17 is a circuit diagram of a pixel, according to one or more embodiments of the present disclosure.

FIG. 17 is a circuit diagram of a pixel PXij, according to one or more embodiments of the present disclosure. However, the same reference numerals are given to the same components as those shown in FIG. 3A among the components shown in FIG. 17, and thus a detailed description thereof will be omitted.

Referring to FIG. 17, the pixel PXij may include a pixel circuit PXCg (or a pixel-driving circuit), and the light-emitting element ED electrically connected to the pixel circuit PXCg. In one or more embodiments, the pixel circuit PXCg may include six transistors (referred to as "first to fifth transistors T1 to T5 and a first emission control transistor ET1"), and three capacitors (referred to as "a first capacitor C1, a second capacitor C2, a third capacitor C3*a*").

The third capacitor C3*a* is connected between the third node N3 and the reference voltage line VL1. The third capacitor C3*a* may include a first electrode connected to the third node N3 and a second electrode connected to the reference voltage line VL1. The third capacitor C3*a* may store a difference voltage between the third node N3 and the reference voltage line VL1. FIG. 17 illustrates a structure in which the second electrode of the third capacitor C3*a* is connected to the reference voltage line VL1, but the present disclosure is not limited thereto. A DC voltage in addition to the reference voltage Vref or the second driving voltage ELVSS may be applied to the second electrode of the third capacitor C3*a*.

As shown in FIGS. 1 to 17, the number of scan-driving circuits GWD, GRD, and GCD and the number of emission control circuits EMD, which are included in the first and second gate-driving circuits 300 and 350, may be reduced by reducing the number of the scan signals and the number of the emission control signals applied to the pixels PX to 3 scan signals and 1 emission control signal. As a result, the circuit configuration provided to the non-display area NDA of the display panel DP may be simplified, and the width of the non-display area NDA may be reduced.

Figure 18:
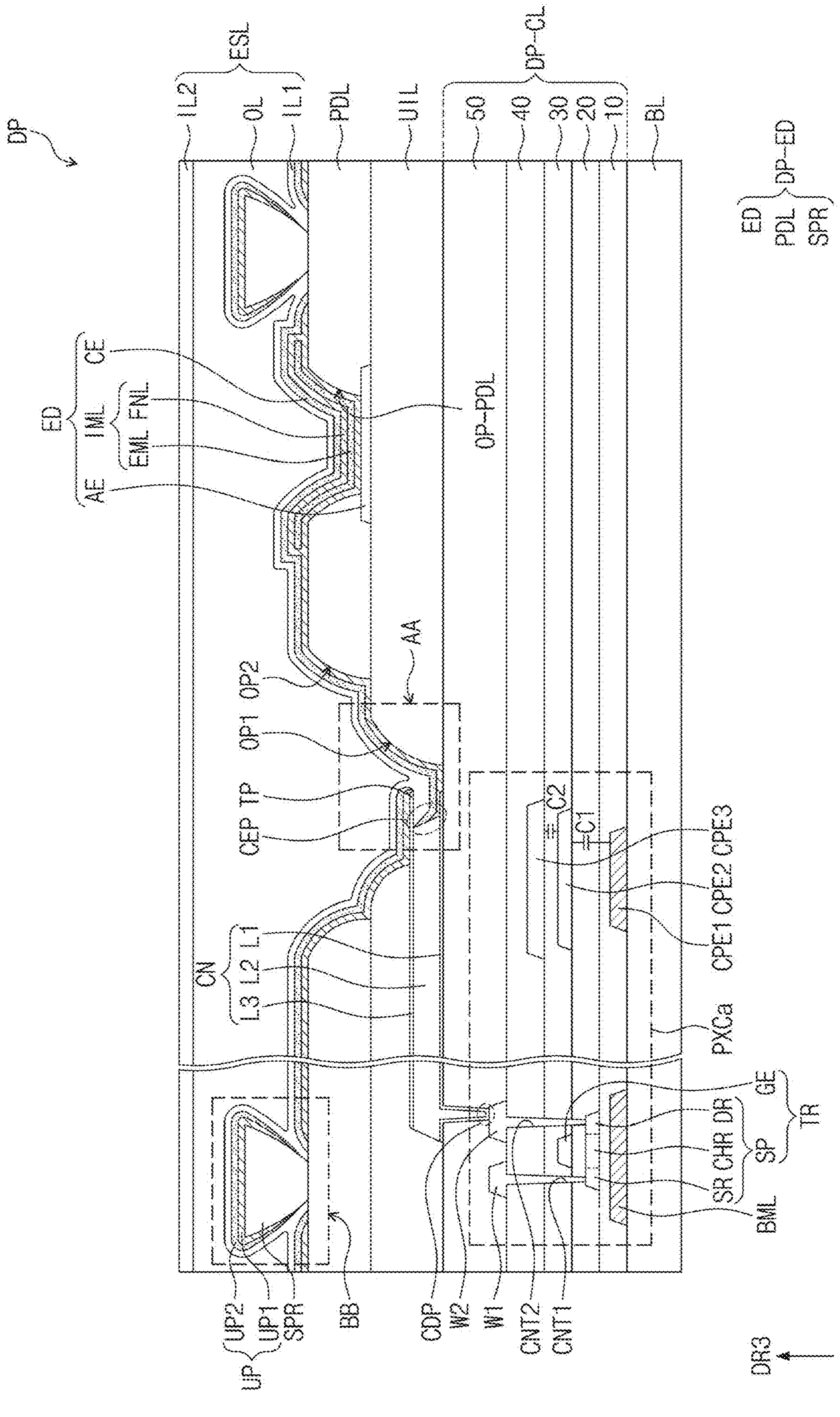
FIG. 18 is a cross-sectional view of a display panel, according to one or more embodiments of the present disclosure.
Figure 19A:
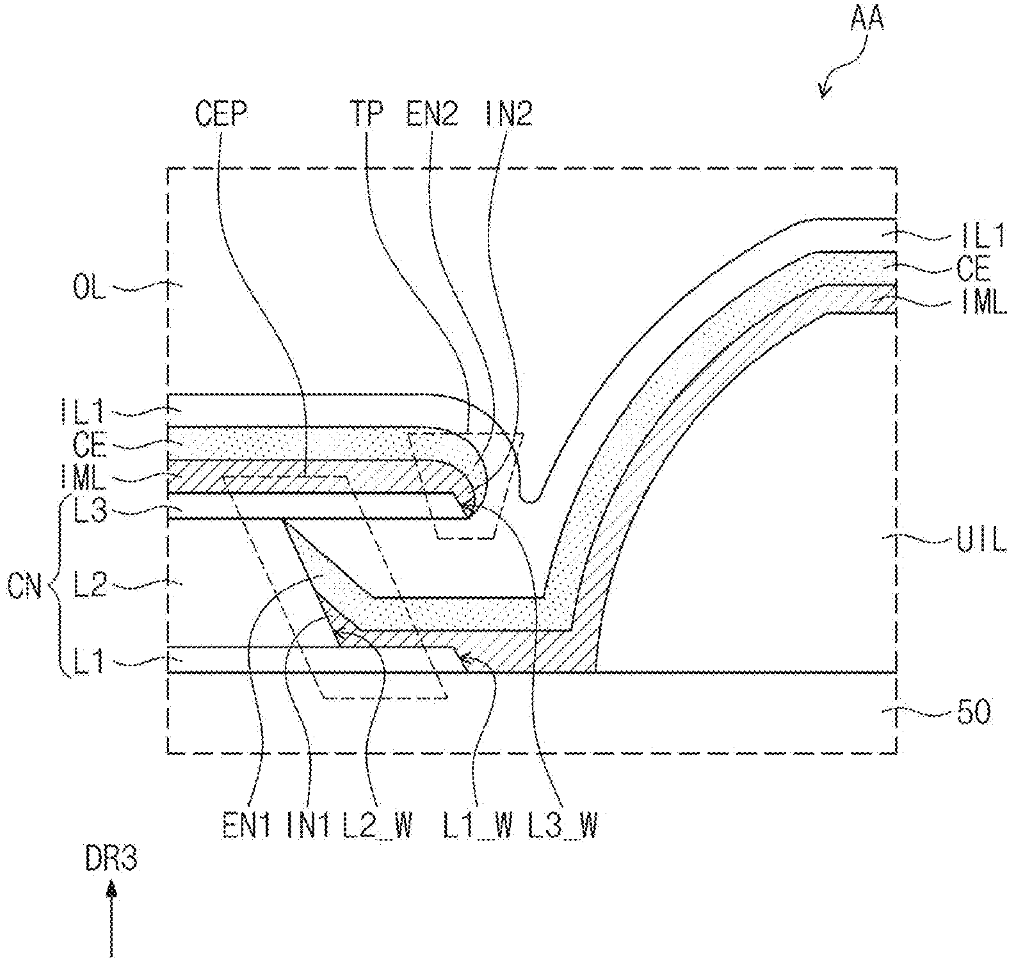
FIG. 19A is an enlarged cross-sectional view of a display panel, which is obtained by enlarging region AA of FIG. 18, according to one or more embodiments of the present disclosure.
Figure 19B:
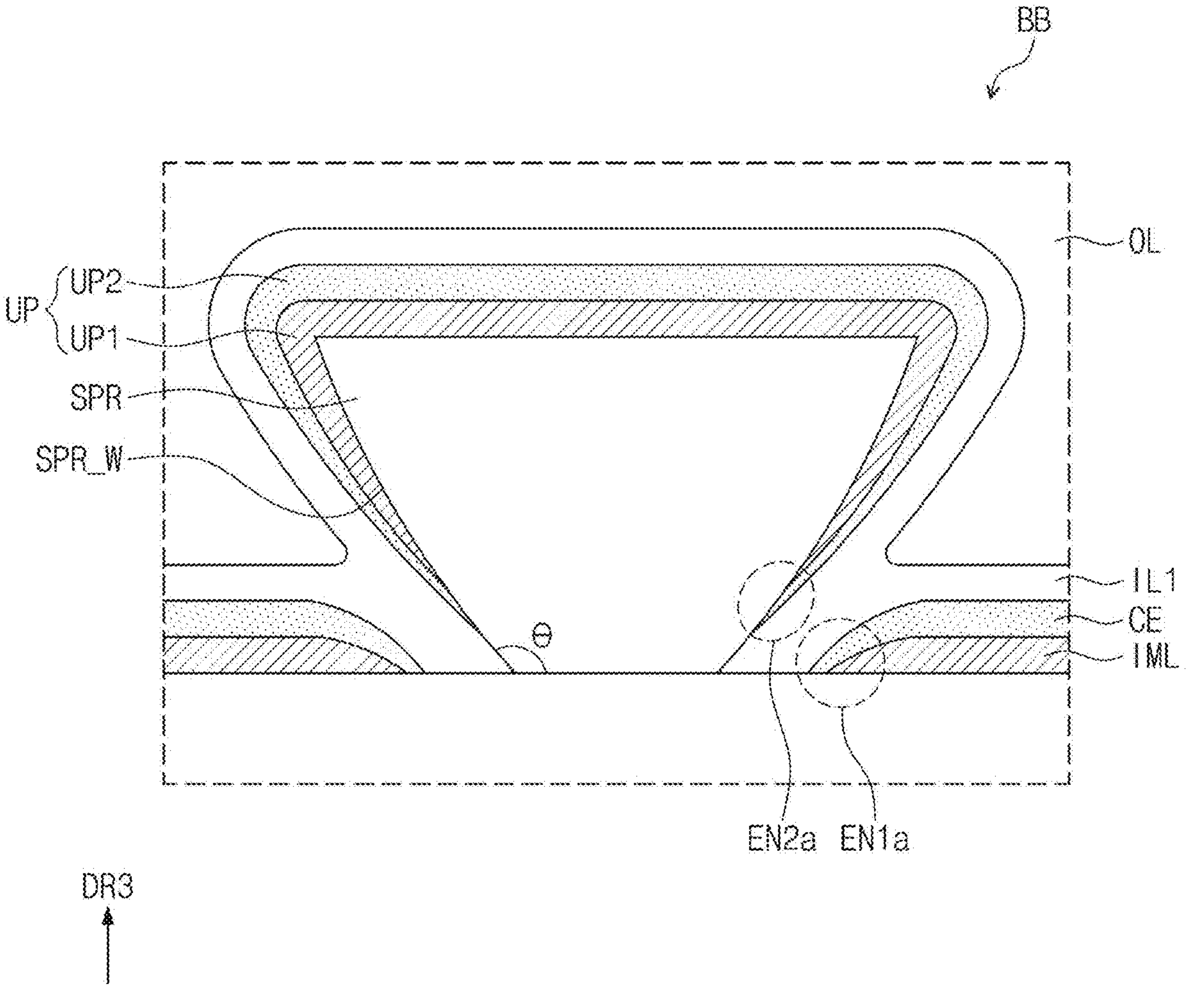
FIG. 19B is an enlarged cross-sectional view of a display panel, which is obtained by enlarging region BB of FIG. 18, according to one or more embodiments of the present disclosure.

FIG. 18 is a cross-sectional view of the display panel DP, according to one or more embodiments of the present disclosure. FIG. 19A is an enlarged cross-sectional view of a display panel, which is obtained by enlarging region AA of FIG. 18, according to one or more embodiments of the present disclosure. FIG. 19B is an enlarged cross-sectional view of a display panel, which is obtained by enlarging region BB of FIG. 18, according to one or more embodiments of the present disclosure.

Referring to FIG. 18, the display panel DP may include a base layer BL, and a circuit element layer DP-CL, an upper insulating layer UIL, a connection wire CN, a display element layer DP-ED, and an encapsulation layer ESL that are located on the base layer BL (as used herein, "located on" may mean "above").

FIG. 18 illustrates one transistor TR and two capacitors C1 and C2 of the pixel circuit PXCa. The transistor TR may correspond to a transistor. For example, the transistor TR may correspond to a transistor connected to a node (e.g., the fifth node N5 of FIG. 3A) corresponding to a cathode CE of the light-emitting element ED, which may be connected to the light-emitting element ED through the connection wire CN. For example, the transistor TR may correspond to the first transistor T1 of FIG. 3A or the third emission control transistor ET3 of FIG. 15. Although not illustrated, other transistors constituting the pixel circuit PXCa may have the same structure as the transistor TR (referred to as a "connection transistor") illustrated in FIG. 18. However, this is only an example, and the other transistors constituting the pixel circuit PXCa may have a structure different from that of the connection transistor TR and are not particularly limited.

A lower conductive layer BML may overlap the connection transistor TR and may be covered by a first insulating layer 10. At least one of an inorganic barrier layer or a buffer layer may be further located between the lower conductive layer BML and the base layer BL.

In one or more embodiments, the lower conductive layer BML may be connected to a source of the connection transistor TR through a source electrode pattern W1. In this case, the lower conductive layer BML may be synchronized with the source of the connection transistor TR. However, this is only an example, and the lower conductive layer BML may be connected to a gate of the connection transistor TR and may be synchronized with the gate. Alternatively, the lower conductive layer BML may be connected to another electrode and may independently receive a constant voltage or a pulse signal. Alternatively, the lower conductive layer BML may be provided in a form isolated from another conductive pattern. The lower conductive layer BML according to one or more embodiments of the present disclosure may be provided in various forms and is not particularly limited.

The connection transistor TR may be located on the first insulating layer 10. The connection transistor TR may include a semiconductor pattern SP and a gate electrode GE. The semiconductor pattern SP may be located on the first insulating layer 10. The semiconductor pattern SP may include a source region SR, a drain region DR, and a channel region CHR distinguished from one another depending on the degree of conductivity.

The display panel according to one or more embodiments may further include the source electrode pattern W1 and a drain electrode pattern W2 that are connected to the source region SR and the drain region DR, respectively. For example, each of the source electrode pattern W1 and the drain electrode pattern W2 may be integrally formed with one of lines constituting a pixel driver and is not particularly limited.

A second insulating layer 20 may commonly overlap a plurality of pixels and may cover the semiconductor pattern SP. The gate electrode GE may be located on the second insulating layer 20. The gate electrode GE may correspond to the gate of the connection transistor TR.

A third insulating layer 30 may be located on the gate electrode GE, and a fourth insulating layer 40 may be located on the third insulating layer 30. A first capacitor electrode CPE1, a second capacitor electrode CPE2, and a third capacitor electrode CPE3 may be included in a plurality of conductive patterns.

The first capacitor electrode CPE1 and the second capacitor electrode CPE2 constitute the first capacitor C1. The first capacitor electrode CPE1 and the second capacitor electrode CPE2 may be spaced apart from each other with the first insulating layer 10 and the second insulating layer 20 therebetween.

In one or more embodiments of the present disclosure, the first capacitor electrode CPE1 and the lower conductive layer BML may have a one-body, or unitary, shape. In addition, the second capacitor electrode CPE2 and the gate electrode GE may have a one-body/unitary shape.

The third capacitor electrode CPE3 may be located on the third insulating layer 30. The third capacitor electrode CPE3 may be spaced apart from the second capacitor electrode CPE2 with the third insulating layer 30 therebetween, and may overlap the second capacitor electrode CPE2 when viewed from above the plane/in plan view. The third capacitor electrode CPE3, together with the second capacitor electrode CPE2, may constitute the second capacitor C2.

The fourth insulating layer 40 may be located on the third insulating layer 30 and/or the third capacitor electrode CPE3. The source electrode pattern W1 and the drain electrode pattern W2 may be located on the fourth insulating layer 40. The source electrode pattern W1 may be connected to the source region SR of the connection transistor TR through a first contact hole CNT1, and the source electrode pattern W1 and the source region SR of the semiconductor pattern SP may function as the source of the connection transistor TR. The drain electrode pattern W2 may be connected to the drain region DR of the connection transistor TR through a second contact hole CNT2, and the drain electrode pattern W2 and the drain region DR of the semiconductor pattern SP may function as the drain of the connection transistor TR. A fifth insulating layer 50 may be located on the source electrode pattern W1 and the drain electrode pattern W2.

The connection wire CN may be located on the fifth insulating layer 50. The connection wire CN may electrically connect the pixel circuit PXCa and the light-emitting element ED. In other words, the connection wire CN may electrically connect the connection transistor TR and the light-emitting element ED. The connection wire CN may be a connection node that connects the pixel circuit PXCa and the light-emitting element ED. That is, the connection wire CN may correspond to the fifth node N5 of FIG. 3A or the fifth node N5*a* of FIG. 15. However, this is only an example, and as long as the connection wire CN is capable of being connected to the light-emitting element ED, the connection wire CN may be defined as a connection node with various elements among elements constituting the pixel circuit PXCa depending on the design of the pixel circuit PXCa and is not particularly limited.

The upper insulating layer UIL may be located on the connection wire CN. The upper insulating layer UIL may be located on the fifth insulating layer 50 and may cover the connection wire CN. The upper insulating layer UIL may be an organic layer. For example, the upper insulating layer UIL may include benzocyclobutene (BCB), hexamethyldisiloxane (HMDSO), a general purpose polymer (such as Polymethylmethacrylate (PMMA), or Polystyrene (PS)), a polymer derivative having a phenolic-based group, an acrylic-based polymer, an imide-based polymer (such as polyimide), an aryl ether-based polymer, an amide-based polymer, a fluorine-based polymer, a p-xylene-based polymer, a vinyl alcohol-based polymer, or a blend thereof.

The upper insulating layer UIL may include, or define, an opening for exposing at least part of the connection wire CN. The connection wire CN may be electrically connected with the light-emitting element ED through the portion exposed from the upper insulating layer UIL. That is, the connection wire CN may electrically connect the connection transistor TR and the light-emitting element ED. Detailed description thereabout will be given below. In the display panel DP according to one or more embodiments of the present disclosure, the upper insulating layer UIL may be omitted, or a plurality of upper insulating layers UIL may be provided. However, the present disclosure is not particularly limited.

The display element layer DP-ED may be located on the upper insulating layer UIL. The display element layer DP-ED may include a pixel-defining layer PDL, the light-emitting element ED, and a separator SPR. The separator SPR may have an obtuse taper angle. The light-emitting element ED may include an anode AE, an intermediate layer IML, and the cathode CE.

In one or more embodiments, the anode AE may be located on the upper insulating layer UIL. The anode AE may be a transflective electrode, a transmissive electrode, or a reflective electrode. According to one or more embodiments of the present disclosure, the anode AE may include a reflective layer formed of silver (Ag), magnesium (Mg), aluminum (Al), platinum (Pt), palladium (Pd), gold (Au), nickel (Ni), neodymium (Nd), iridium (Ir), chromium (Cr), or a compound thereof and a transparent or translucent electrode layer formed on the reflective layer. The transparent or translucent electrode layer may include at least one or more selected from the group consisting of indium tin oxide (ITO), indium zinc oxide (IZO), indium gallium zinc oxide (IGZO), zinc oxide (ZnO), or indium oxide ($In_2O_3$) and/or aluminum-doped zinc oxide (AZO). For example, the anode AE may include a stacked structure of ITO/Ag/ITO. The anode AE may be connected to the first power line PL1 (see FIG. 3A) to receive the first driving voltage ELVDD (see FIG. 3A).

A light-emitting opening OP-PDL for exposing at least part of the anode AE may be defined in the pixel-defining layer PDL. A plurality of light-emitting openings OP-PDL may be provided. The plurality of light-emitting openings OP-PDL may correspond to light-emitting elements, respectively. All components of the light-emitting element ED may be located in the light-emitting opening OP-PDL to overlap one another, and the light-emitting opening OP-PDL may be a region where light emitted by the light-emitting element ED is substantially displayed.

The intermediate layer IML may be interposed between the anode AE and the cathode CE. The intermediate layer IML may include a light-emitting layer EML and a functional layer FNL. The light-emitting element ED may include the intermediate layer IML having various structures and is not particularly limited. For example, the functional layer FNL may include a plurality of layers, or may include two or more layers spaced apart from each other with the light-emitting layer EML therebetween. Alternatively, in one or more embodiments, the functional layer FNL may be omitted. Although FIG. 18 illustrates one or more embodiments in which the light-emitting layer EML and the functional layer FNL have different shapes from each other, the present disclosure is not limited thereto, and the light-emitting layer EML and the functional layer FNL may have the same shape when viewed from above the plane/in plan view.

The functional layer FNL may be interposed between the anode AE and the cathode CE. For example, the functional layer FNL may be interposed between the anode AE and the light-emitting layer EML, or may be interposed between the cathode CE and the light-emitting layer EML. Alternatively, the functional layer FNL may be interposed between the anode AE and the light-emitting layer EML and between the cathode CE and the light-emitting layer EML. In one or more embodiments, the light-emitting layer EML is illustrated as being inserted into the functional layer FNL. However, this is only an example, and the functional layer FNL may include a layer interposed between the light-emitting layer EML and the anode AE and/or a layer interposed between the light-emitting layer EML and the cathode CE, and is not particularly limited. The functional layer FNL may include a hole control layer and an electron control layer. At least part of the hole control layer may be interposed between the anode AE and the light-emitting layer EML, and at least part of the electron control layer may be interposed between the light-emitting layer EML and the cathode CE.

The cathode CE may be located on the intermediate layer IML. As described above, the cathode CE may be connected to the connection wire CN, and may be electrically connected to the pixel circuit PXCa. That is, the cathode CE may be electrically connected to the connection transistor TR through the connection wire CN.

As described above, the connection wire CN may include a driving connection unit CDP and a light-emitting connection unit CEP. The driving connection unit CDP may be a part of the connection wire CN connected to the pixel circuit PXCa, and may be a part substantially connected to the connection transistor TR. In one or more embodiments, the driving connection unit CDP may penetrate the fifth insulating layer 50, and may be electrically connected to the drain region DR of the semiconductor pattern SP through the drain electrode pattern W2. The light-emitting connection unit CEP may be a part of the connection wire CN connected to the light-emitting element ED. The light-emitting connection unit CEP may be a part, which is defined in a region exposed from the upper insulating layer UIL, and to which the cathode CE is connected. A tip portion TP may be defined in the light-emitting connection unit CEP.

The light-emitting connection unit CEP of the connection wire CN will be described below in more detail with reference to FIGS. 18 and 19A. As illustrated in FIGS. 18 and 19A, the connection wire CN may have a three-layer structure. For example, the connection wire CN may include a first layer L1, a second layer L2, and a third layer L3 sequentially stacked in the third direction DR3. The second layer L2 may include a material that is different from that of the first layer L1. Moreover, the second layer L2 may include a material that is different from that of the third layer L3. The second layer L2 may have a greater thickness than the first layer L1. Furthermore, the second layer L2 may have a greater thickness than the third layer L3. The second layer L2 may include a highly conductive material. In one or more embodiments, the second layer L2 may include aluminum (Al).

Also, the first layer L1 may include a material having a lower etch rate than the second layer L2. In other words, the second layer L2 may be formed of materials having a high etch selectivity with respect to the first layer L1. In one or more embodiments, the first layer L1 may include titanium (Ti), and the second layer L2 may include aluminum (AI). In this case, as shown in FIG. 19A, a side surface L1_W of the first layer L1 may be defined outwardly from a side surface L2_W of the second layer L2 (e.g., in plan view). That is, the light-emitting connection unit CEP of the connection wire CN may have a shape in which the side surface L1_W of the first layer L1 protrudes outwardly from the side surface L2_W of the second layer L2. That is, the light-emitting connection unit CEP of the connection wire CN may have a shape in which the side surface L2_W of the second layer L2 is recessed inwardly from the side surface L1_W of the first layer L1 (e.g., in plan view).

The third layer L3 may include a material having a lower etch rate than the second layer L2. That is, the second layer L2 may be formed of materials having a high etch selectivity with respect to the third layer L3. In one or more embodiments, the third layer L3 may include titanium (Ti), and the second layer L2 may include aluminum (Al). In this case, a side surface L3_W of the third layer L3 may be defined outwardly from the side surface L2_W of the second layer L2 (e.g., in plan view). That is, the light-emitting connection unit CEP of the connection wire CN may have a shape in which the side surface L3_W of the third layer L3 protrudes outwardly from the side surface L2_W of the second layer L2. That is, the light-emitting connection unit CEP of the connection wire CN may have an undercut shape or an overhang structure, and the tip portion TP of the light-emitting connection unit CEP may be defined by the portion of the third layer L3 that protrudes relative to the second layer L2.

The upper insulating layer UIL and the pixel-defining layer PDL may expose at least part of the tip portion TP and at least part of the second side surface L2_W. For example, a first opening OP1 for exposing one side of the connection wire CN may be defined in the upper insulating layer UIL, and a second opening OP2 overlapping the first opening OP1 may be defined in the pixel-defining layer PDL. The planar area of the second opening OP2 may be greater than the planar area of the first opening OP1. However, the present disclosure is not limited thereto, and as long as at least part of the tip portion TP and at least part of the second side surface L2_W are capable of being exposed, the planar area of the second opening OP2 may be smaller than or equal to the planar area of the first opening OP1.

The intermediate layer IML may be located on the pixel-defining layer PDL. The intermediate layer IML may also be located on a partial region of the upper insulating layer UIL exposed by the second opening OP2 of the pixel-defining layer PDL. Moreover, the intermediate layer IML may also be located on a partial region of the connection wire CN exposed by the first opening OP1 of the upper insulating layer UIL. As illustrated in FIG. 19A, the intermediate layer IML may include one end IN1 located along the upper surface of the fifth insulating layer 50, and an opposite end IN2 located along the upper surfaces of the connection wire CN and the tip portion TP. That is, when viewed on the cross-section, the intermediate layer IML may have a shape that is partially disconnected with respect to the tip portion TP in the region where the light-emitting connection unit CEP is defined. However, when viewed from above the plane/in plan view, the intermediate layer IML may have a one-body/unitary shape that is uniformly connected within a region (see FIG. 21A) defined as a closed line by the separator SPR.

The cathode CE may be located on the intermediate layer IML. The cathode CE may also be located on a partial region of the upper insulating layer UIL exposed by the second opening OP2 of the pixel-defining layer PDL. Furthermore, the cathode CE may also be located on a partial region of the connection wire CN exposed by the first opening OP1 of the upper insulating layer UIL. As illustrated in FIG. 19A, the cathode CE may include one end EN1 located along the upper surface of the fifth insulating layer 50, and an opposite end EN2 located along the upper surfaces of the connection wire CN and the tip portion TP. That is, when viewed on the cross-section, the cathode CE may have a shape that is partially disconnected with respect to the tip portion TP in the region where the light-emitting connection unit CEP is defined. However, when viewed from above the plane/in plan view, the cathode CE may have a one-body shape that is connected as a whole within the region (see FIG. 21A) defined as a closed curve by the separator SPR.

Also, the one end EN1 of the cathode CE may be located along the side surface L2_W of the second layer L2 and may contact the side surface L2_W of the second layer L2. For example, through a difference in deposition angle between the cathode CE and the intermediate layer IML, the cathode CE may contact the side surface L2_W of the second layer L2 exposed from the intermediate layer IML by the tip portion TP. That is, the cathode CE may be connected to the connection wire CN without a separate patterning process for the intermediate layer IML, and thus the light-emitting element ED may be electrically connected to the pixel circuit PXCa through the connection wire CN.

In one or more embodiments, although the opposite end IN2 of the intermediate layer IML and the opposite end EN2 of the cathode CE are illustrated as covering the side surface L3_W of the third layer L3, this is only an example, and at least part of the side surface L3_W of the third layer L3 may be exposed from the opposite end IN2 of the intermediate layer IML and/or the opposite end EN2 of the cathode CE.

The display panel DP according to one or more embodiments may include the separator SPR. The separator SPR may be located on the pixel-defining layer PDL. In one or more embodiments, the cathode CE and the intermediate layer IML may be commonly formed for the plurality of pixels by deposition through an open mask. In this case, the cathode CE and the intermediate layer IML may be divided by the separator SPR. As described above, the separator SPR may have a closed-line shape for each of light-emitting parts, and thus the cathode CE and the intermediate layer IML may have a divided shape for each light-emitting part. That is, the cathode CE and the intermediate layer IML may be electrically independent of each adjacent pixel.

The separator SPR will be described below in more detail with reference to FIGS. 18 and 19B. As illustrated in FIG. 19B, the separator SPR may have an inverted tapered shape. That is, an angle θ (referred to as a "taper angle") formed by a side surface SPR_W of the separator SPR with respect to the upper surface of the pixel-defining layer PDL may be an obtuse angle. However, this is only an example, and the taper angle may be diversely set as long as the separator SPR is capable of electrically disconnecting the cathode CE for each pixel. In addition, the separator SPR may have the same structure as the tip portion TP, and is not particularly limited.

In one or more embodiments, the separator SPR may include an insulating material. For example, the separator SPR may include an organic insulating material. Alternatively, the separator SPR may include an inorganic insulating material. In another case, the separator SPR may be composed of multiple layers of an organic insulating material and an inorganic insulating material. In one or more embodiments, the separator SPR may include a conductive material. That is, the type of material of the separator SPR is not particularly limited as long as the cathode CE is capable of being electrically disconnected for each pixel.

A dummy layer UP may be located on the separator SPR. The dummy layer UP may include a first dummy layer UP1 located on the separator SPR, and a second dummy layer UP2 located on the first dummy layer UP1. The first dummy layer UP1 may be formed through the same process as that of the intermediate layer IML, and may include the same material as the intermediate layer IML. The second dummy layer UP2 may be formed through the same process as that of the cathode CE, and may include the same material as the cathode CE. That is, the first dummy layer UP1 and the second dummy layer UP2 may be concurrently or substantially simultaneously formed in a process of forming the intermediate layer IML and the cathode CE, respectively. In one or more embodiments, the display panel DP may omit the dummy layer UP.

As illustrated in FIG. 19B, in one or more embodiments, the cathode CE may include a first end portion EN1*a*, and the second dummy layer UP2 may include a second end portion EN2*a*. The first end portion EN1*a* may be spaced apart from the separator SPR and may be located on the pixel-defining layer PDL, and the second end portion EN2*a* may be separated from the first end portion EN1*a* and may be located on the side surface SPR_W of the separator SPR. However, although the first end portion EN1*a* is illustrated as being spaced apart from the side surface SPR_W of the separator SPR at a certain interval in FIG. 19B, the present disclosure is not limited thereto, and the first end portion EN1*a* may contact the side surface SPR_W of the separator SPR as long as the first end portion EN1*a* is electrically disconnected from the second end portion EN2*a*. Moreover, when a portion formed along the side surface SPR_W of the separator SPR is thin such that electrical resistance is high even though the first end portion EN1*a* and the second end portion EN2*a* are connected without being distinguished from each other, the cathode CE may be considered as being divided by the separator SPR when the cathode CE is electrically disconnected between adjacent pixels.

According to one or more embodiments of the present disclosure, even though there is no separate patterning process for the cathode CE or the intermediate layer IML, the cathode CE or the intermediate layer IML may be divided for each pixel by reducing or preventing the likelihood of the cathode CE or the intermediate layer IML being formed on the side surface SPR_W of the separator SPR or by making the cathode CE or the intermediate layer IML thin. In addition, as long as the cathode CE or the intermediate layer IML is capable of being electrically disconnected between adjacent pixels, the shape of the separator SPR may be modified in various ways and is not particularly limited.

Figure 20:
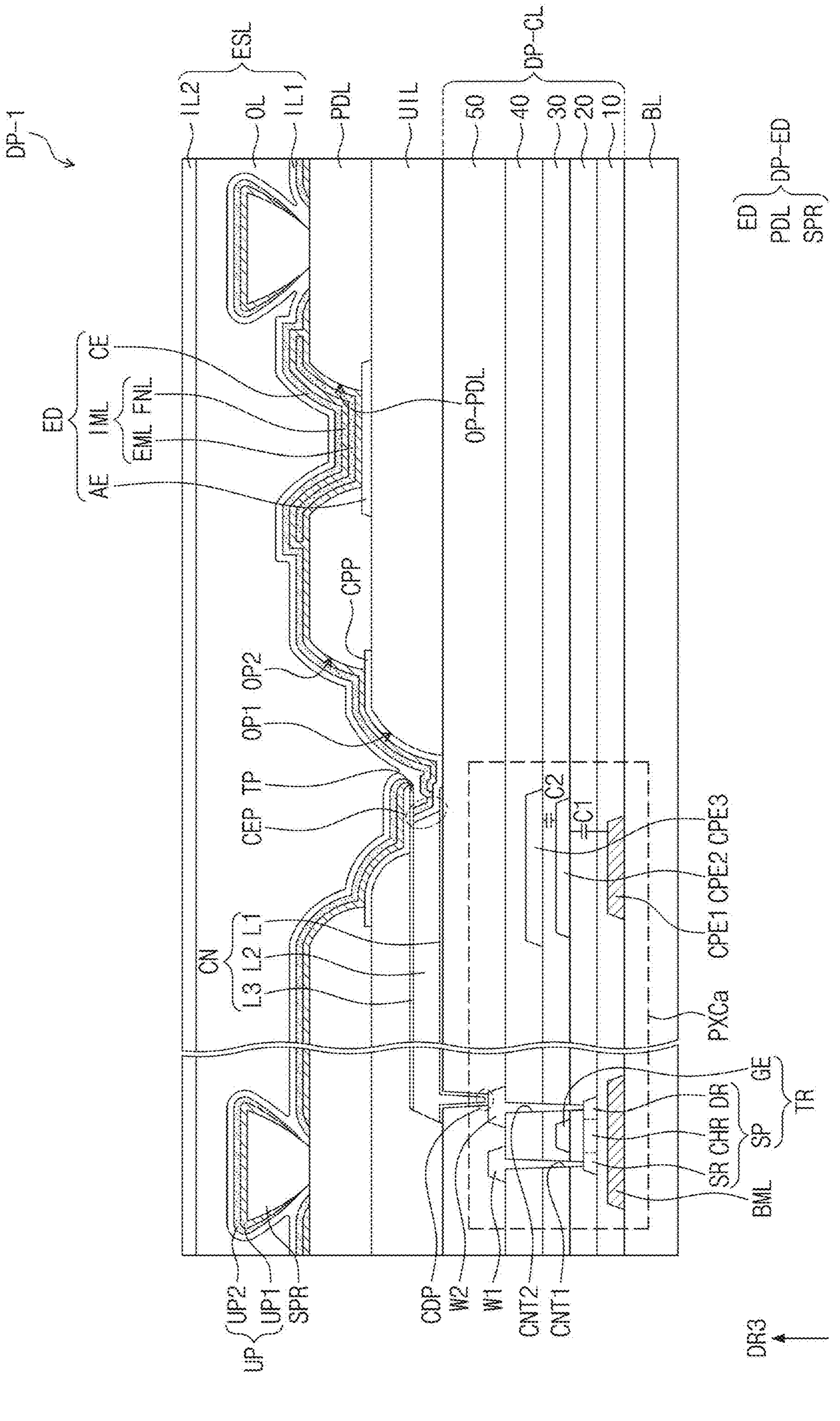
FIG. 20 is a sectional view of a display panel, according to one or more embodiments of the present disclosure.

FIG. 20 is a cross-sectional view of a display panel, according to one or more embodiments of the present disclosure. For convenience of description, a cross-sectional view of a region corresponding to FIG. 18 is illustrated in FIG. 20. Hereinafter, components identical to the components described above with reference to FIG. 18 will be assigned with identical reference numerals, and repetitive descriptions will be omitted.

When compared to the display panel DP illustrated in FIG. 18, a display panel DP-1 illustrated in FIG. 20 may further include a capping pattern CPP. The capping pattern CPP may be located on the upper insulating layer UIL. Moreover, the capping pattern CPP may also be located on a partial region of the connection wire CN exposed by the first opening OP1 of the upper insulating layer UIL. The capping pattern CPP may overlap the connection wire CN. For example, the capping pattern CPP may overlap the light-emitting connection unit CEP and/or the tip portion TP.

Furthermore, when viewed on the cross-section illustrated in FIG. 20, the capping pattern CPP may have a shape that is partially disconnected with respect to the tip portion TP in the region where the light-emitting connection unit CEP is defined. However, when viewed from above the plane/in plan view, the capping pattern CPP may have a one-body shape, or unitary form, that is connected as a whole within the region defined as a closed line by the separator SPR (see FIG. 21A). Also, one end portion of the partially disconnected capping pattern CPP may contact a side surface of the second layer L2 of the connection wire CN, and another end portion of the capping pattern CPP may be located on the third layer L3 of the connection wire CN, and may cover the tip portion TP.

The capping pattern CPP may include a conductive material. Accordingly, the cathode CE may be electrically connected to the connection wire CN through the capping pattern CPP. That is, the capping pattern CPP may contact the side surface L2_W of the second layer L2 of the connection wire CN. Afterward, the cathode CE may contact the capping pattern CPP, and may be electrically connected to the connection wire CN. The capping pattern CPP may be located outwardly from the second layer L2 of the connection wire CN, and the cathode CE may be electrically connected with the second layer L2 only by making a connection with the capping pattern CPP instead of the side surface L2_W of the second layer L2. Accordingly, the connection between the connection wire CN and the cathode CE may be suitably performed.

Also, the capping pattern CPP may include a material having a lower reactivity than the second layer L2 of the connection wire CN. For example, the capping pattern CPP may include copper (Cu), silver (Ag), or transparent conductive oxide. The side surface L2_W of the second layer L2 of the connection wire CN may be protected by the capping pattern CPP having a lower reactivity than the second layer L2 of the connection wire CN, and thus oxidation of the material included in the second layer L2 may be reduced or prevented. Moreover, a phenomenon in which a silver (Ag) component included in the anode AE is reduced during an etching process of patterning the anode AE and remains as particles, which may cause defects, may be reduced or prevented.

In one or more embodiments, the capping pattern CPP may be formed through the same process as that of the anode AE, and may include the same material as the anode AE. However, this is only an example, and the capping pattern CPP may be formed through a process that is different from that of the anode AE, and may include a material that is different from that of the anode AE. The present disclosure is not particularly limited.

Figure 21A:
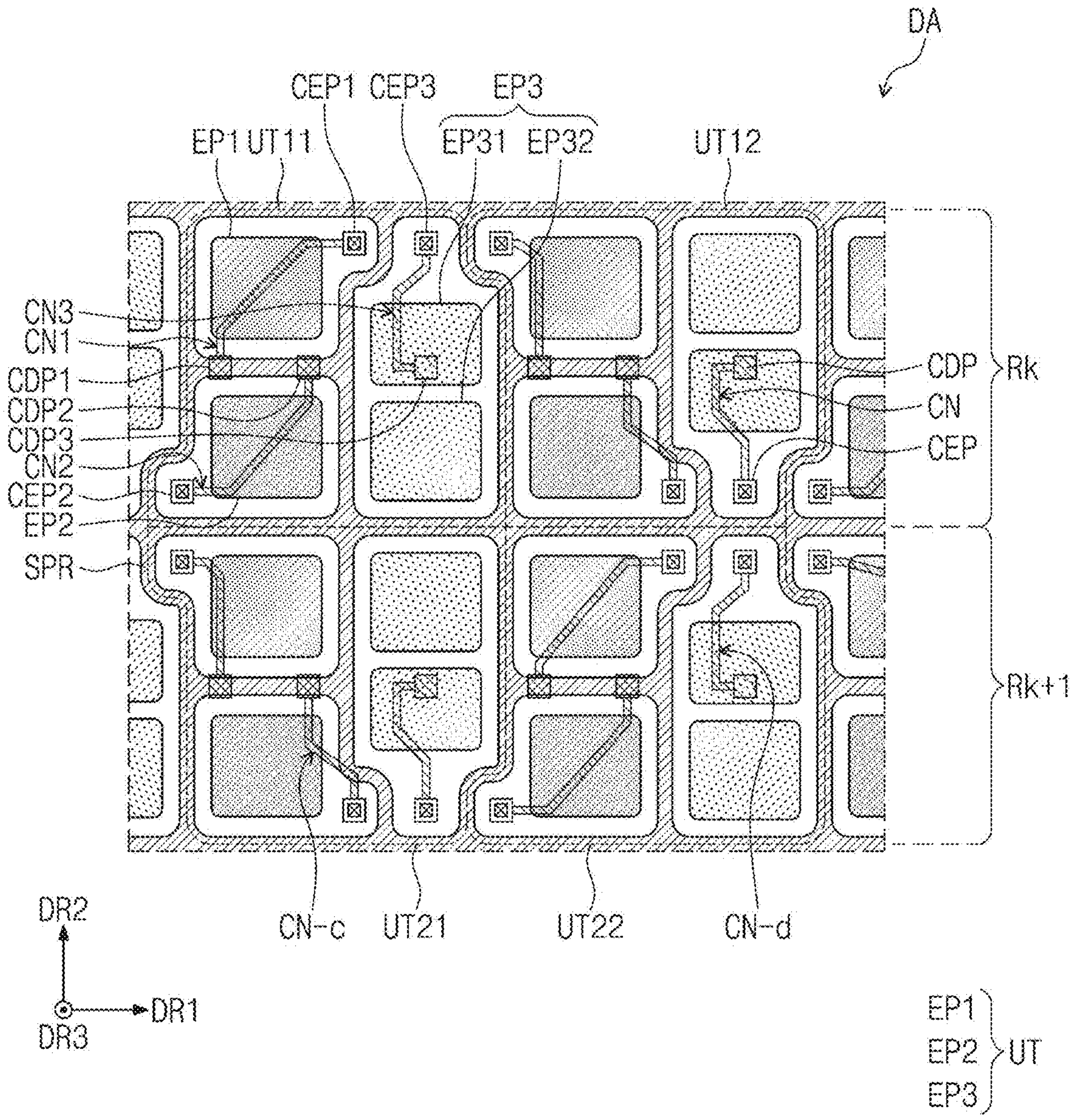
FIGS. 21A to 21C are enlarged plan views of partial regions of a display panel, according to one or more embodiments of the present disclosure.
Figure 21B:
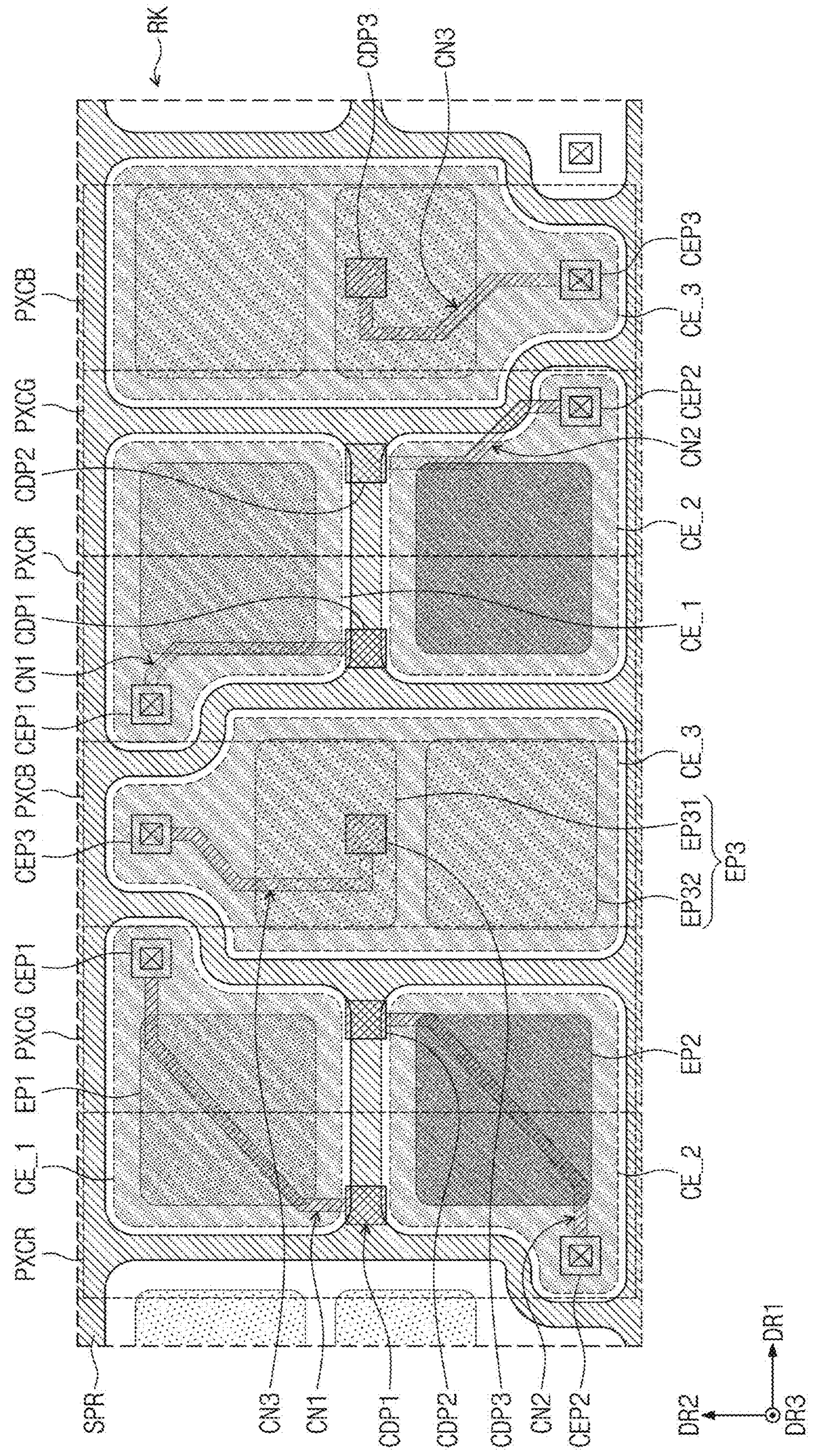
Figure 21C:
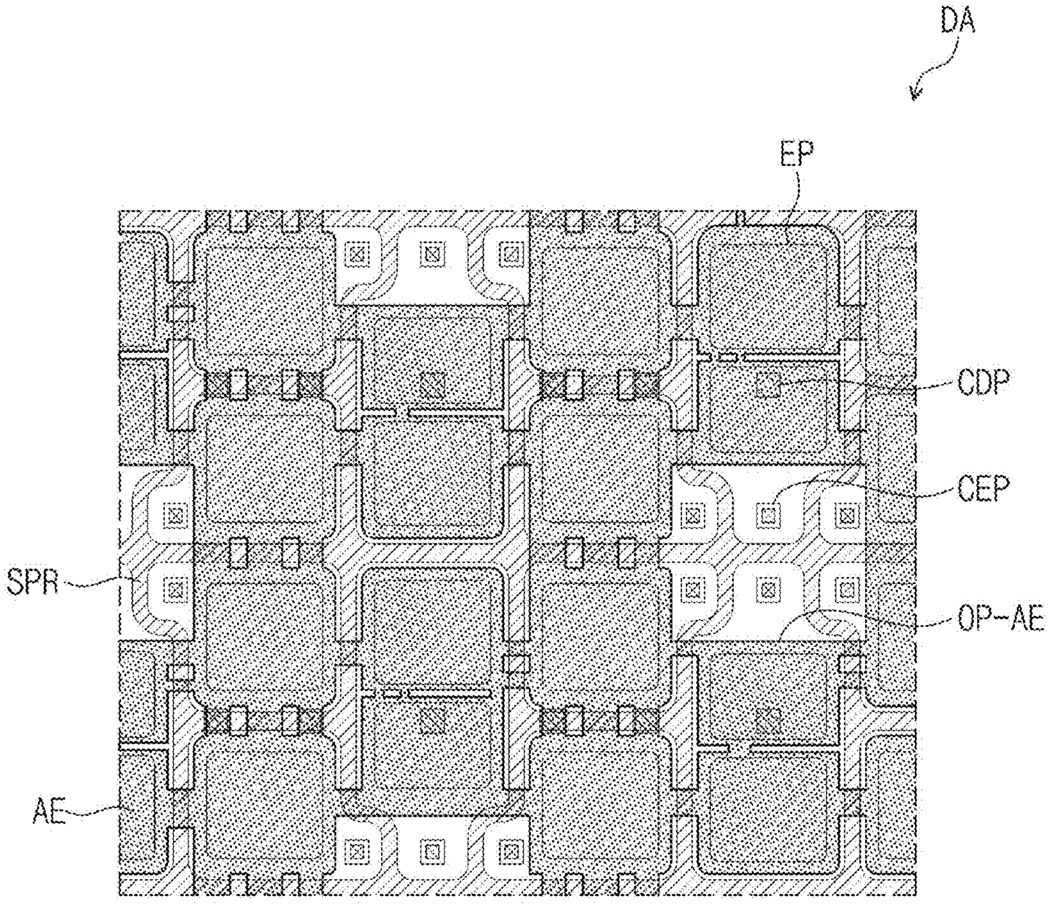

FIGS. 21A to 21C are enlarged plan views of partial regions of a display panel, according to one or more embodiments of the present disclosure. FIGS. 21A to 21C may correspond to enlarged plan views of the display panels DP and DP-1 according to one or more embodiments described above with reference to FIGS. 18 to 20. FIG. 21A illustrates a region where a total of four light-emitting units are arranged in two rows and two columns, and FIG. 21B illustrates an enlarged view of a partial region illustrated in FIG. 21A. In FIG. 21C, some of the components illustrated in FIG. 21A are omitted or emphasized. Hereinafter, the present disclosure will be described with reference to FIGS. 21A to 21C.

In FIG. 21A, light-emitting units UT11, UT12, UT21, and UT22 arranged in two rows and two columns are illustrated. Light-emitting parts in a first row Rk include light-emitting parts that constitute the light-emitting unit UT11 in the first row Rk and the first column, and the light-emitting unit UT12 in the first row Rk and the second column. Light-emitting parts in a second row Rk+1 include light-emitting parts that constitute the light-emitting unit UT21 in the second row Rk+1 and the first column, and the light-emitting unit UT22 in the second row Rk+1 and the second column. In FIG. 21B, the light-emitting parts in the first row Rk are illustrated. Among the components of the display panel, the separator SPR and a plurality of light-emitting parts EP1, EP2, and EP3, connection wires CN1, CN2, and CN3, the anode AE, and the cathode CE, which are located in regions partitioned by the separator SPR are illustrated in FIGS. 21A to 21C.

As described above, each of the light-emitting parts EP1, EP2, and EP3 may correspond to the light-emitting opening OP-PDL (see FIG. 18). That is, each of the light-emitting parts EP1, EP2, and EP3 may be a region where light is emitted by a light-emitting element, and may correspond to a unit constituting an image displayed on the display panel DP (see FIG. 18). In more detail, each of the light-emitting parts EP1, EP2, and EP3 may correspond to a region defined by the light-emitting opening OP-PDL (see FIG. 18) (e.g., a region defined by the lower surface of the light-emitting opening OP-PDL).

The light-emitting parts EP1, EP2, and EP3 may include the first light-emitting part EP1, the second light-emitting part EP2, and the third light-emitting part EP3. The first light-emitting part EP1, the second light-emitting part EP2, and the third light-emitting part EP3 may emit light of a first color, light of a second color, and light of a third color, respectively. The light of the first color, the light of the second color, and the light of the third color may be light of different respective colors. For example, the first light-emitting part EP1 may emit red light, the second light-emitting part EP2 may emit green light, and the third light-emitting part EP3 may emit blue light. However, a combination of colors is not limited thereto. Furthermore, at least two or more of the light-emitting parts EP1, EP2, and EP3 may emit light of the same color. For example, the first to third light-emitting parts EP1, EP2, and EP3 may all emit blue light or white light.

Among the light-emitting parts EP1, EP2, and EP3, the third light-emitting part EP3 for emitting the light of the third color may include two sub-light-emitting parts EP31 and EP32 spaced apart from each other in the second direction DR2. However, this is only an example. Likewise, to the other light-emitting parts EP1 and EP2, the third light-emitting part EP3 may be provided as a single pattern having a one-body shape, and at least one of the other light-emitting parts EP1 and/or EP2 may include sub-light-emitting parts spaced apart from each other. The present disclosure is not particularly limited.

The light-emitting parts in the first row Rk may include the light-emitting parts EP1, EP2, and EP3 that constitute the light-emitting unit UT11 in the first row Rk and the first column, and the light-emitting unit UT12 in the first row Rk and the second column. The light-emitting parts in the second row Rk+1 may include the light-emitting parts EP1, EP2, and EP3 that constitute the light-emitting unit UT21 in the second row Rk+1 and the first column, and the light-emitting unit UT22 in the second row Rk+1 and the second column. Some of the light-emitting parts in the first row Rk and some of the light-emitting parts in the second row Rk+1 may have symmetrical shapes. For example, the first light-emitting part EP1 and the second light-emitting part EP2 of the light-emitting unit UT21 in the second row Rk+1 and the first column, and the first light-emitting part EP1 and the second light-emitting part EP2 of the light-emitting unit UT11 in the first row Rk and the first column, may have line symmetry and arrangement with respect to an axis parallel to the second direction DR2. The third light-emitting part EP3 of the light-emitting unit UT21 in the second row Rk+1 and the first column, and the third light-emitting part EP3 of the light-emitting unit UT11 in the first row Rk and the first column, may have line symmetry and arrangement with respect to an axis parallel to the first direction DR1. However, this is only an example, and the present disclosure is not limited thereto.

Hereinafter, the light-emitting unit UT11 in the first row Rk and the first column will be described. In FIG. 21B, a plurality of cathodes CE_1, CE_2, and CE_3, a plurality of pixel drivers PXCR, PXCG, and PXCB, and a plurality of connection wires CN1, CN2, and CN3 are illustrated for ease of description. The cathodes CE_1, CE_2, and CE_3 may be separated from one another by the separator SPR, and may be electrically disconnected from one another. In one or more embodiments, one light-emitting unit UT may include the three light-emitting parts EP1, EP2, and EP3. Accordingly, the light-emitting unit UT may include the three cathodes CE_1, CE_2, and CE_3 (referred to as "first to third cathodes"), the three pixel drivers PXCR, PXCG, and PXCB, and the three connection wires CN1, CN2, and CN3. However, this is only an example, and the number and arrangement of light-emitting units UT may be designed in various ways and are not particularly limited.

The first to third pixel drivers PXCR, PXCG, and PXCB are electrically connected to light-emitting elements constituting the first to third light-emitting parts EP1, EP2, and EP3, respectively. The expression "connected" used herein includes not only physical direct contact, but also electrical connection.

Also, the regions where the pixel drivers PXCR, PXCG, and PXCB are defined on the plane as illustrated in FIG. 21B may correspond to a unit in which transistors and capacitors constituting the pixel circuit PXCa (see FIG. 3A) for driving a light-emitting element of a pixel are repeatedly arranged.

The first to third pixel drivers PXCR, PXCG, and PXCB may be sequentially arranged in the first direction DR1. Also, the placement positions of the first to third pixel drivers PXCR, PXCG, and PXCB may be independently designed irrespective of the positions or shapes of the first to third light-emitting parts EP1, EP2, and EP3.

For example, the first to third pixel drivers PXCR, PXCG, and PXCB may be located at positions that are different from the positions at which the regions partitioned and defined by the separator SPR (e.g., different from positions of the first to third cathodes CE_1, CE_2, and CE_3), or may be designed to have shapes and areas different from those of the first to third cathodes CE_1, CE_2, and CE_3. Alternatively, in one or more embodiments, the first to third pixel drivers PXCR, PXCG, and PXCB may overlap positions, at which the first to third light-emitting parts EP1, EP2, and EP3 are present, and may be designed in shapes similar to the shapes of the regions (e.g., the first to third cathodes CE_1, CE_2, and CE_3) partitioned and defined by the separator SPR.

In one or more embodiments, the first to third pixel drivers PXCR, PXCG, and PXCB are illustrated in a rectangular shape, the first to third light-emitting parts EP1, EP2, and EP3 have smaller areas than the first to third pixel drivers PXCR, PXCG, and PXCB, and are arranged in a form that is different from that of the first to third pixel drivers PXCR, PXCG, and PXCB. The first to third cathodes CE_1, CE_2, and CE_3 are located at positions overlapping the first to third light-emitting parts EP1, EP2, and EP3 and illustrated in an irregular shape.

Accordingly, as illustrated in FIG. 21B, the first pixel driver PXCR may be located at a position that partially overlaps the first light-emitting part EP1, the second light-emitting part EP2, and another adjacent light-emitting unit. The second pixel driver PXCG may be located at a position that overlaps the first light-emitting part EP1, the second light-emitting part EP2, and the third light-emitting part EP3. The third pixel driver PXCB may be located at a position that overlaps the third light-emitting part EP3. However, this is only an example, and the positions of the first to third pixel drivers PXCR, PXCG, and PXCB may be designed in various forms and arrangements independently of the light-emitting parts EP1, EP2, and EP3, and are not particularly limited.

The plurality of connection wires CN may be provided. The connection wires CN may be spaced apart from each other. The one connection wire CN may electrically connect one pixel driver of the pixel drivers PXCR, PXCG, and PXCB and a light-emitting element corresponding to the one pixel driver. For example, the connection wire CN may correspond to a node (refer to the fifth node N5 in FIG. 3A) where the light-emitting element ED (see FIG. 18) is connected to the pixel circuit PXCa (see FIG. 3A).

The connection wire CN may include a first connection unit (or the light-emitting connection unit CEP) and a second connection unit (or the driving connection unit CDP). The light-emitting connection unit CEP may be provided on one side of the connection wire CN, and the driving connection unit CDP may be provided on an opposite side of the connection wire CN.

The driving connection unit CDP may be a part of the connection wire CN connected to the pixel circuit PXCa. In one or more embodiments, the driving connection unit CDP may be connected to one electrode of a transistor constituting the pixel circuit PXCa. For example, the driving connection unit CDP may be connected to the first electrode of the first transistor T1 illustrated in FIG. 3A. Accordingly, the position of the driving connection unit CDP may correspond to the position of a transistor (refer to the connection transistor TR of FIG. 18) of the pixel circuit PXCa that is physically connected to the connection wire CN. The light-emitting connection unit CEP may be a part of the connection wire CN connected to the light-emitting element. In one or more embodiments, the light-emitting connection unit CEP may be connected to the cathode CE (see FIG. 18) of the light-emitting element.

The light-emitting unit UT may include the first to third connection wires CN1, CN2, and CN3. The first connection wire CN1 may connect the light-emitting element that forms the first light-emitting part EP1 and the first pixel driver PXCR. The second connection wire CN2 may connect the light-emitting element that forms the second light-emitting part EP2 and the second pixel driver PXCG. The third connection wire CN3 may connect the light-emitting element that forms the third light-emitting part EP3 and the third pixel driver PXCB.

For example, the first to third connection wires CN1, CN2, and CN3 may connect the first to third cathodes CE_1, CE_2, and CE_3 and the first to third pixel drivers PXCR, PXCG, and PXCB, respectively. The first connection wire CN1 may include a first driving connection unit CDP1 connected to the first pixel driver PXCR and a first light-emitting connection unit CEP1 connected to the first cathode CE_1. The second connection wire CN2 may include a second driving connection unit CDP2 connected to the second pixel driver PXCG and a second light-emitting connection unit CEP2 connected to the second cathode CE_2. The third connection wire CN3 may include a third driving connection unit CDP3 connected to the third pixel driver PXCB and a third light-emitting connection unit CEP3 connected to the third cathode CE_3.

The first to third driving connection units CDP1, CDP2, and CDP3 may be aligned in the first direction DR1. As described above, the first to third driving connection units CDP1, CDP2, and CDP3 may correspond to the positions of connection transistors constituting the first to third pixel drivers PXCR, PXCG, and PXCB, respectively. In one pixel, the connection transistor TR may be a transistor that includes, as one electrode, a connection node to which the pixel circuit PXCa and the light-emitting element ED are connected and may correspond to, for example, the first transistor T1 of FIG. 3A. According to one or more embodiments of the present disclosure, the shapes, positions, or arrangements of pixel drivers of all pixels may be simply configured and designed irrespective of the shapes, sizes, or emission colors of light-emitting parts.

In one or more embodiments, the first to third light-emitting connection units CEP1, CEP2, and CEP3 may be located at positions not overlapping the light-emitting parts EP1, EP2, and EP3 when viewed from above the plane/in plan view. As will be described below, each of the light-emitting connection units CEP1, CEP2, and CEP3 of the connection wire CN may be a part to which the light-emitting element ED (see FIG. 18) is connected and in which the tip portion TP (see FIG. 18) is defined, and therefore may be provided at a position not overlapping the light-emitting opening OP-PDL (see FIG. 18). That is, the light-emitting connection units CEP1, CEP2, and CEP3 may be located at positions spaced apart from the light-emitting parts EP1, EP2, and EP3 in the cathodes CE_1, CE_2, and CE_3. The cathodes CE_1, CE_2, and CE_3 may include partial regions protruding from the light-emitting parts EP1, EP2, and EP3 when viewed from above the plane/in plan view to connect to the connection wires CN1, CN2, and CN3 at the positions where the light-emitting connection units CEP1, CEP2, and CEP3 are located.

For example, the first cathode CE_1 may include, at a position not overlapping the first light-emitting part EP1, a protrusion protruding from the first light-emitting part EP1 to connect with the first connection wire CN1 at the position where the first light-emitting connection unit CEP1 is located, and the first light-emitting connection unit CEP1 may be provided on the protrusion.

The first driving connection unit CDP1 where the first pixel driver PXCR (e.g., the first connection wire CN1) is connected to the connection transistor TR (see FIG. 18) may be defined at a position not overlapping the first light-emitting part EP1 when viewed from above the plane/in plan view. According to one or more embodiments, the first connection wire CN1 may be located on the first light-emitting part EP1, and thus the first cathode CE_1 and the first pixel driver PXCR spaced apart from each other may be suitably connected.

Also, the third driving connection unit CDP3 where the third pixel driver PXCB (e.g., the third connection wire CN3) is connected to the connection transistor TR may be defined at a position not overlapping the third light-emitting connection unit CEP3, and may be located at a position overlapping the third light-emitting part EP3 when viewed from above the plane/in plan view. According to one or more embodiments, the third cathode CE_3 and the third pixel driver PXCB may be connected through the third connection wire CN3. Accordingly, in the design of the third pixel driver PXCB, restrictions according to the position or shape of the third light-emitting part EP3 may be reduced, and thus the degree of freedom in design may be improved.

Returning to FIG. 21A, the light-emitting parts in the second row Rk+1 may include light-emitting parts having line symmetry and arrangement with the light-emitting units UT11 and UT12 in the first row Rk with respect to an axis parallel to the first direction DR1 or the second direction DR2. In this case, due to the shapes and arrangement of the light-emitting units UT11 and UT12 in the first row Rk, the light-emitting units UT21 and UT22 in the second row Rk+1 may be substantially composed of light-emitting parts having a form in which the light-emitting units UT11 and UT12 in the first row Rk are shifted in the first direction DR1 or the second direction DR2. That is, the light-emitting unit UT21 in the second row Rk+1 and the first column may be composed of light-emitting parts having the same shape as the light-emitting unit UT12 in the first row Rk and the second column. The light-emitting unit UT22 at the second row Rk+1 and the second column may be composed of light-emitting parts having the same shape as the light-emitting unit UT11 in the first row Rk and the first column.

Accordingly, connection wires CN-c located in the light-emitting unit UT21 in the second row Rk+1 and the first column may have the same shape and arrangement as the connection wires CN1, CN2, and CN3 located in the light-emitting unit UT12 in the first row Rk and the second column. Likewise, connection wires CN-d located in the light-emitting unit UT22 in the second row Rk+1 and the second column may have the same shape and arrangement as the connection wires CN1, CN2, and CN3 located in the light-emitting unit UT11 in the first row Rk and the first column.

Referring to FIG. 21C, the anode AE of the light-emitting element according to one or more embodiments of the present disclosure may be commonly provided for the plurality of light-emitting parts EP1, EP2, and EP3. That is, the anode AE may be formed as one integrated layer in the entire display area DA. Accordingly, the layer of the anode AE may overlap the separator SPR. Alternatively, the anodes AE of the light-emitting elements may be formed as independent conductive patterns spaced apart from one another, and may be electrically connected to one another through other conductive layers. Accordingly, the independent conductive patterns of the anodes AE may not to overlap the separator SPR.

As described above, the first driving voltage ELVDD (see FIG. 3A) may be applied to the anode AE, and a common voltage may be provided to all of the light-emitting parts. The anode AE may be connected to the first power line PL1 (see FIG. 3A), which provides the first driving voltage ELVDD (see FIG. 3A), in the non-display area NDA or may be connected to the first power line PL1 (see FIG. 3A) in the display area DA and is not particularly limited. In the latter case, the first power line PL1 (see FIG. 3A) may be located in the non-display area NDA (see FIG. 1), and the anode AE may have a shape that extends to the non-display area NDA (see FIG. 1).

In the cross-sectional views of FIGS. 18 and 20, the anode AE is illustrated as overlapping the light-emitting opening OP-PDL and not overlapping the separator SPR. However, as illustrated in FIG. 21C, the anodes AE of the light-emitting elements may have a one-body shape, and may have a mesh or grid shape in which openings are defined in a partial region. That is, as long as the same first driving voltage ELVDD (see FIG. 3A) is capable of being applied to the anode AE of each of the plurality of light-emitting elements, the shape of the anode AE may be provided in various ways, and is not particularly limited.

Also, a plurality of openings OP-AE may be defined in the anode AE according to one or more embodiments. The openings OP-AE may penetrate the layer of the anode AE. The openings OP-AE in the layer of the anode AE may be located at positions not overlapping the light-emitting parts EP, and may be defined at positions overlapping the separator SPR generally. The openings may facilitate releasing gas generated from an organic layer located under the anode AE, for example, the upper insulating layer UIL (see FIG. 18) that will be described below. Accordingly, the gas of the organic layer located under the light-emitting element ED may be sufficiently discharged in a process of manufacturing the display panel DP, and gas discharged from the organic layer after the manufacture of the display panel DP may be reduced. Thus, the speed at which the light-emitting element ED is degraded may be decreased.

According to one or more embodiments, the connection wire may be included between the light-emitting element ED and the pixel driver. Accordingly, the light-emitting element ED may be suitably connected to the pixel driver even though only the shape of the cathode CE is changed without a change in the arrangement or shapes of the light-emitting parts. Thus, the degree of freedom in design regarding the arrangement of the pixel driver may be improved, and the area or resolution of the light-emitting part of the display panel DP may be suitably increased.

Figure 22:
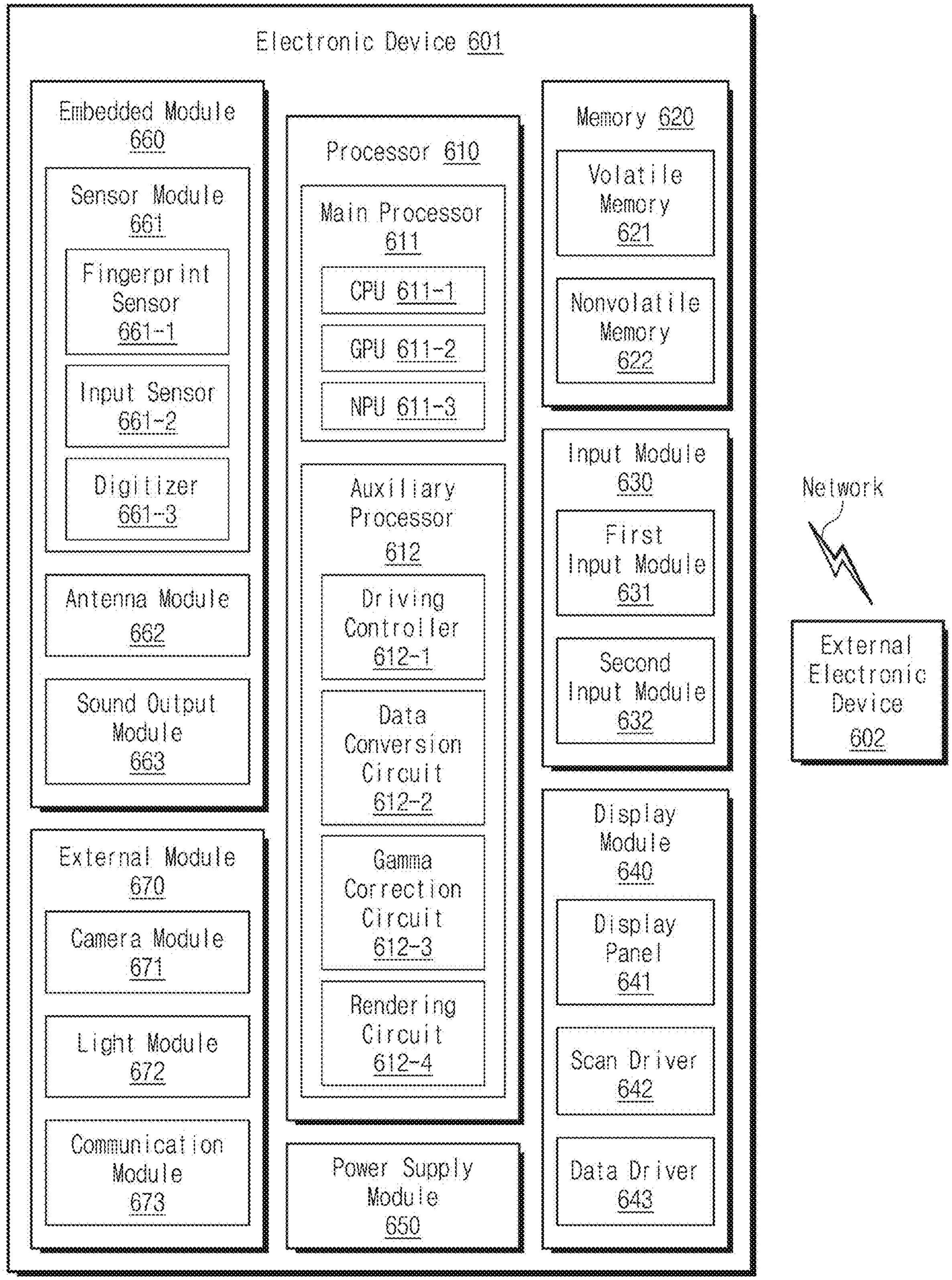
FIG. 22 is a block diagram of an electronic device, according to one or more embodiments of the present disclosure.

FIG. 22 is a block diagram of an electronic device, according to one or more embodiments of the present disclosure.

Referring to FIG. 22, an electronic device 601 outputs various pieces of information through a display module 640 within an operating system. When a processor 610 executes an application stored in a memory 620, a display module 640 provides application information to a user through a display panel 641.

The processor 610 obtains an external input through an input module 630 or a sensor module 661 and executes an application corresponding to the external input. For example, when the user selects a camera icon displayed on the display panel 641, the processor 610 obtains a user input through an input sensor 661-2 and activates a camera module 671. The processor 610 delivers image data corresponding to a captured image obtained through the camera module 671 to the display module 640. The display module 640 may display an image corresponding to the captured image through the display panel 641.

For another example, when personal information is authenticated on the display module 640, a fingerprint sensor 661-1 obtains entered fingerprint information as input data. The processor 610 compares input data obtained through the fingerprint sensor 661-1 with authentication data stored in the memory 620 and executes an application based on the comparison result. The display module 640 may display information, which is executed depending on the logic of the application, through the display panel 641.

For another example, when a music streaming icon displayed on the display module 640 is selected, the processor 610 obtains a user input through the input sensor 661-2 and activates the music streaming application stored in the memory 620. When a music play command is input by the music streaming application, the processor 610 provides sound information corresponding to the music play command to the user by activating a sound output module 663.

The operation of the electronic device 601 has been briefly described above. Hereinafter, a configuration of the electronic device 601 will be described in detail. Some of components of the electronic device 601, which will be described below, may be integrated and provided as one configuration, or the one configuration may be provided to be separated into two or more configurations.

Referring to FIG. 22, the electronic device 601 may communicate with an external electronic device 602 through a network (e.g., a short-range wireless communication network or a long-range wireless communication network). According to one or more embodiments, the electronic device 601 may include the processor 610, the memory 620, the input module 630, the display module 640, a power supply module 650, an embedded module 660, and an external module 670. According to one or more embodiments, in the electronic device 601, at least one of the above-described components may be omitted, or one or more other components may be added. According to one or more embodiments, some (e.g., the sensor module 661, an antenna module 662, or the sound output module 663) of the components described above may be integrated into another component (e.g., the display module 640).

The processor 610 may execute software to control at least another component (e.g., hardware or software component) of the electronic device 601 connected to the processor 610, and may process and calculate various types of data. According to one or more embodiments, as at least part of data processing or calculation, the processor 610 may store instructions or data received from other components (e.g., the input module 630, the sensor module 661 or a communication module 673) into a volatile memory 621, may process instructions or data stored in the volatile memory 621. The result data may be stored in a nonvolatile memory 622.

The processor 610 may include a main processor 611 and an auxiliary processor 612. The main processor 611 may include one or more of a central processing unit (CPU) 611-1 or an application processor (AP). The main processor 611 may further include one or more of a graphic processing unit (GPU) 611-2, a communication processor (CP), and an image signal processor (ISP). The main processor 611 may further include a neural processing unit (NPU) 611-3. The NPU 611-3 may be a processor that is specialized in processing an artificial intelligence model. The artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted Boltzmann machine (RBM), a deep belief network (DBN), a bidirectional recurrent deep neural network (BRDNN), a deep Q-network, or a combination of two or more of the networks, but may not be limited to the above-described example. In addition to a hardware structure, additionally or alternatively, the artificial intelligence model may include a software structure. At least two of the processing units and the processors that are described above may be implemented as one integrated component (e.g., a single chip) or may be implemented as independent components (e.g., a plurality of chips).

The auxiliary processor 612 may include a driving controller 612-1. The driving controller 612-1 may include an interface converting circuit and a timing control circuit. The driving controller 612-1 receives an image signal from the main processor 611, converts the data format of the image signal so as to be suitable for the interface specifications with the display module 640, and outputs image data. The driving controller 612-1 may output various control signals suitable to drive the display module 640. The configuration of the driving controller 612-1 is substantially similar to the driving controller 100 shown in FIG. 1, and thus detailed descriptions are omitted to avoid redundancy.

The auxiliary processor 612 may further include a data converting circuit 612-2, a gamma correcting circuit 612-3, and a rendering circuit 612-4. The data converting circuit 612-2 may receive the image data from the driving controller 612-1 and may compensates for the image data such that an image is displayed at a desired luminance according to characteristics of the electronic device 601 or setting of the user or may convert the image data to reduce power consumption or compensate for afterimages. The gamma correcting circuit 612-3 may convert the image data, a gamma reference voltage, or the like such that the image displayed on the electronic device 601 has desired gamma characteristics. The rendering circuit 612-4 may receive the image data from the driving controller 612-1 and may render the image data in consideration of a pixel arrangement of the display panel 641 applied to the electronic device 601. At least one of the data converting circuit 612-2, the gamma correcting circuit 612-3, and the rendering circuit 612-4 may be integrated into another component (e.g., the main processor 611 or the driving controller 612-1). At least one of the data converting circuit 612-2, the gamma correcting circuit 612-3, and the rendering circuit 612-4 may be integrated into a data driver 643.

The memory 620 may store various pieces of data, which are used by at least one component (e.g., the processor 610 or the sensor module 661) of the electronic device 601 and input data or output data for commands related thereto. The memory 620 may include at least one or more of the volatile memory 621 and/or the nonvolatile memory 622.

The input module 630 may receive, from the outside (e.g., the user or an external electronic device 602) of the electronic device 601, commands or data to be used in a components (e.g., the processor 610, the sensor module 661, or the sound output module 663) of the electronic device 601.

The input module 630 may include a first input module 631, through which the commands or data are input from the user, and a second input module 632 through which the commands or data are input from the external electronic device 602. The first input module 631 may include a microphone, a mouse, a keyboard, a key (e.g., a button), or a pen (e.g., a passive pen or an active pen). The second input module 632 may support a designated protocol capable of being connected to the external electronic device 602 by wire or wirelessly. According to one or more embodiments, the second input module 632 may include a high definition multimedia interface (HDMI), a universal serial bus (USB) interface, a secure digital (SD) card interface, or an audio interface. The second input module 632 may include a connector that may be physically connected to the external electronic device 602, for example, an HDMI connector, a USB connector, an SD card connector, or an audio connector (e.g., a headphone connector).

The display module 640 provides visual information to the user. The display module 640 may include the display panel 641, a scan driver 642, and the data driver 643. The display module 640 may further include a window, a chassis, a bracket, or the like for protecting the display panel 641. The display module 640 may further include a light-emitting driver, a voltage generator, and the like. The voltage generator may output various voltages (e.g., the first and second driving voltages ELVDD and ELVSS shown in FIG. 1) suitable to drive the display panel 641. The configuration of the display panel 641, the scan driver 642, the data driver 643, and the voltage generator is substantially similar to the configuration of the display panel DP, the first and second gate-driving circuits 300 and 350, the data-driving circuit 200, and the voltage generator 400 shown in FIG. 1, and thus detailed descriptions are omitted to avoid redundancy.

The power supply module 650 supplies power to the components of the electronic device 601. The power supply module 650 may include a battery that charges a power voltage. The battery may include a non-rechargeable primary cell, a rechargeable secondary cell, a fuel cell, or the like. The power supply module 650 may include a power management integrated circuit (PMIC). The PMIC supplies optimized power to the above-described modules and modules which will be described below. The power supply module 650 may include a wireless power transmission/reception member electrically connected to the battery. The wireless power transmission/reception member may include a plurality of coil-shaped antenna radiators.

The electronic device 601 may further include the embedded module 660 and the external module 670. The embedded module 660 may include the sensor module 661, the antenna module 662, and the sound output module 663. The external module 670 may include the camera module 671, a light module 672, and the communication module 673.

The sensor module 661 may detect an input from the user's body or an input from a pen among the first input module 631, and may generate an electrical signal or data value corresponding to the input. The sensor module 661 may include at least one of the fingerprint sensor 661-1, the input sensor 661-2, and/or a digitizer 661-3.

The fingerprint sensor 661-1 may generate a data value corresponding to a fingerprint of the user. The fingerprint sensor 661-1 may include one of an optical-type fingerprint sensor, or a capacitance-type fingerprint sensor.

The input sensor 661-2 may generate a data value corresponding to coordinate information of an input by a body of the user or an input by a pen. The input sensor 661-2 generates the change in capacitance due to the input as the data value. The input sensor 661-2 may sense an input by a passive pen or may transmit or receive data to or from an active pen.

The input sensor 661-2 may also measure a biometric signal such as blood pressure, moisture, or body fat. For example, when the user touches a part of the body to a sensor layer or sensing panel and does not move during a specific period, the input sensor 661-2 may detect the biometric signal and may output information desired by the user to the display module 640 based on a changes in electric fields caused by the part of the body.

The digitizer 661-3 may generate the data value corresponding to coordinate information of an input by the pen. The digitizer 661-3 generates an electromagnetic change amount due to the input as the data value. The digitizer 661-3 may sense input by the passive pen or transmit or receive data to or from the active pen.

At least one of the fingerprint sensor 661-1, the input sensor 661-2, and the digitizer 661-3 may be implemented as a sensor layer formed on the display panel 641 through a subsequent process. The fingerprint sensor 661-1, the input sensor 661-2, and the digitizer 661-3 may be placed on the upper side of the display panel 641, and one (e.g., the digitizer 661-3) of the fingerprint sensor 661-1, the input sensor 661-2, and the digitizer 661-3 may be placed on the lower side of the display panel 641.

At least two or more of the fingerprint sensor 661-1, the input sensor 661-2, and the digitizer 661-3 may be integrated into one sensing panel through the same process. When being integrated into one sensing panel, the sensing panel may be placed between the display panel 641 and a window placed on the upper side of the display panel 641. According to one or more embodiments, the sensing panel may be placed on a window, and the location of the sensing panel is not particularly limited thereto.

At least one of the fingerprint sensor 661-1, the input sensor 661-2, and the digitizer 661-3 may be built into the display panel 641. That is, at least one of the fingerprint sensor 661-1, the input sensor 661-2, and/or the digitizer 661-3 may be concurrently or substantially simultaneously formed through a process of forming elements (e.g., a light-emitting element, a transistor, or the like) included in the display panel 641.

The sensor module 661 may generate an electrical signal or a data value corresponding to the internal state or external state of the electronic device 601. For example, the sensor module 661 may further include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, a humidity sensor, or an illumination sensor.

The antenna module 662 may include one or more antennas to transmit or receive the signal or power to or from an external source. According to one or more embodiments, the communication module 673 may transmit or receive the signal to or from the external electronic device through the antenna suitable for a communication method. An antenna pattern of the antenna module 662 may be integrated into the input sensor 661-2 or one component (e.g., the display panel 641) of the display module 640.

The sound output module 663 may be a device for outputting an audio signal to the outside of the electronic device 601 and, for example, may include a speaker used for general purposes, such as multimedia playback or recording playback, and a receiver used only for receiving a call. According to one or more embodiments, the receiver may be implemented separately from the speaker or may be integrated with the speaker. A sound output pattern of the sound output module 663 may be integrated into the display module 640.

The camera module 671 may shoot a still image or a video image. According to one or more embodiments, the camera module 671 may include one or more lenses, an image sensor, or an image signal processor. The camera module 671 may further include an infrared camera capable of measuring the presence or absence of the user, a position of the user, a gaze of the user, or the like.

The light module 672 may provide light. The light module 672 may include a light-emitting diode or a xenon lamp. The light module 672 may operate in conjunction with the camera module 671 or may operate independently from the camera module 671.

The communication module 673 may support establishing a wired or wireless communication channel between the electronic device 601 and the external electronic device 602 and performing communication through the established communication channel. The communication module 673 may include one or all of wireless communication modules such as a cellular communication module, a short-range wireless communication module, or a global navigation satellite system (GNSS) communication module, or wired communication modules such as a local area network (LAN) communication module or a power line communication module. The communication module 673 may communicate with the external electronic device 602 through a short-range communication network such as Bluetooth, WiFi direct, or infrared data association (IrDA) or a long-range communication network such as a cellular network, Internet, or a computer network (e.g., the LAN or a wide area network (WAN)). The above-mentioned various communication modules 673 may be implemented into one chip or may be respectively implemented into separate chips.

The input module 630, the sensor module 661, the camera module 671, and the like may be utilized to control an operation of the display module 640 in conjunction with the processor 610.

The processor 610 outputs commands or data to the display module 640, the sound output module 663, the camera module 671, or the light module 672 based on input data received from the input module 630. For example, the processor 610 may generate image data in response to input data applied through a mouse, an active pen, or the like to output the generated image data to the display module 640 or may generate command data in response to the input data to output the generated command data to the camera module 671 or the light module 672. When no input data is received from the input module 630 during a specific period, the processor 610 may switch an operation mode of the electronic device 601 to a low-power mode or a sleep mode to reduce power consumed in the electronic device 601.

The processor 610 outputs commands or data to the display module 640, the sound output module 663, the camera module 671, or the light module 672 based on sensing data received from the sensor module 661. For example, the processor 610 may compare authentication data authorized by the fingerprint sensor 661-1 with the authentication data stored in the memory 620, and then may execute an application depending on the comparison result. The processor 610 may execute commands or may output corresponding image data to the display module 640 based on sensing data sensed by the input sensor 661-2 or the digitizer 661-3. When the sensor module 661 includes a temperature sensor, the processor 610 receives temperature data regarding the measured temperature from the sensor module 661 and may further perform luminance correction on image data based on the temperature data.

The processor 610 may receive measurement data regarding the presence or absence of the user, the user's location, and the user's gaze from the camera module 671. The processor 610 may further perform luminance correction on the image data based on the measurement data. For example, the processor 610 that determines the presence or absence of the user through an input from the camera module 671 may output image data, of which the luminance is corrected, to the display module 640 through the data converting circuit 612-2 or the gamma correcting circuit 612-3.

Some of the components may be connected to each other through communication methods between peripheral devices, for example, a bus, a general purpose input/output (GPIO), a serial peripheral interface (SPI), a mobile industry processor interface (MIPI), or an ultra-path interconnect (UPI) link and may exchange a signal (e.g., commands or data) between each other. The processor 610 may communicate with the display module 640 through a mutually promised interface, and for example, may use any one of the above-described communication methods, and the present disclosure is not limited to the above-described communication methods.

The electronic device 601 according to various embodiments disclosed in the specification may be implemented with various types of devices. The electronic device 601 may include, for example, at least one of a portable communication device (e.g., a smart phone), a computer device, a portable multimedia device, a portable medical device, a camera, a wearable device, or a home appliance. The electronic device 601 according to one or more embodiments of this specification may not be limited to the above-described devices.

Although one or more embodiments of the present disclosure has been described for illustrative purposes, those skilled in the art will appreciate that various modifications, and substitutions are possible, without departing from the scope and spirit of the present disclosure as disclosed in the accompanying claims. Accordingly, the technical scope of the present disclosure is not limited to the detailed description of this specification, but should be defined by the claims.

According to one or more embodiments of the present disclosure, the number of scan-driving circuits and the number of emission control circuits, which are included in a gate-driving circuit, may be reduced by reducing the number of scan signals and the number of emission control signals, which are applied to a pixel. As a result, the width of the non-display area of a display panel may be reduced.

Moreover, it is possible to provide a pixel circuit capable of stably performing a compensation operation in a compensation period by using a coupling operation of first and second capacitors and delivering a data voltage to a gate electrode of a first transistor without loss even when the number of scan signals decreases.

While the present disclosure has been described with reference to embodiments thereof, it will be apparent to those of ordinary skill in the art that various changes and modifications may be made thereto without departing from the spirit and scope of the present disclosure as set forth in the following claims, with functional equivalents thereof to be included therein.

What is claimed is:

1. A display device comprising:

a display panel comprising a pixel, the pixel comprising:

a light-emitting element comprising an anode connected to a first power line, and a cathode;

a first transistor connected between the cathode and a second node, and configured to operate according to a potential of a first node;

a first capacitor connected between the first node and a third node;

a second transistor connected between the third node and a data line, and configured to receive a first scan signal;

a third transistor connected between the first node and a reference voltage line, and configured to receive a second scan signal;

a fourth transistor connected between the second node and the third node, and configured to receive a third scan signal;

a first emission control transistor connected between the second node and a second power line, and configured to receive a first emission control signal through a fourth node; and a second capacitor connected between the second node and the fourth node.

2. The display device of claim 1, further comprising a third capacitor connected between the third node and the second power line.

3. The display device of claim 1, further comprising a third capacitor connected between the third node and the reference voltage line.

4. The display device of claim 1, wherein the pixel further comprises a fifth transistor connected between the first transistor and the first power line, or between the first transistor and an initialization voltage line, and configured to receive a fourth scan signal, wherein, during an initialization period, the second scan signal, the third scan signal, the fourth scan signal, and the first emission control signal have active levels, and the first scan signal has an inactive level, wherein, during a compensation period following the initialization period, the second scan signal, the third scan signal, and the fourth scan signal have active levels, and the first scan signal and the first emission control signal have inactive levels, wherein, during a data write period following the compensation period, the first scan signal and the fourth scan signal have active levels, and the second scan signal, the third scan signal, and the first emission control signal have inactive levels, and wherein, during an interval period between the compensation period and the data write period, the first scan signal, the second scan signal, the third scan signal and the first emission control signal have inactive levels, and the fourth scan signal has an active level.

5. The display device of claim 1, wherein the pixel further comprises:

a fifth transistor connected between the first transistor and the first power line, or between the first transistor and an initialization voltage line, and configured to receive a fourth scan signal; and a third emission control transistor connected between the first transistor and the cathode, connected to the fourth node, and is configured to receive the first emission control signal, wherein, during an initialization period, the second scan signal, the third scan signal, the fourth scan signal, and the first emission control signal have active levels, and the first scan signal has an inactive level, wherein, during a compensation period following the initialization period, the second scan signal, the third scan signal and the fourth scan signal have active levels, and the first scan signal and the first emission control signal have inactive levels, wherein, during a data write period following the compensation period, the first scan signal and the fourth scan signal have active levels, and the second scan signal, the third scan signal, and the first emission control signal have inactive levels.

6. The display device of claim 1, wherein the pixel further comprises a second emission control transistor connected between the first emission control transistor and the second power line, and configured to receive a second emission control signal, wherein, during an initialization period, the second scan signal, the third scan signal, the first emission control signal, and the second emission control signal have active levels, and the first scan signal has an inactive level, wherein, during a compensation period following the initialization period, the second scan signal and the third scan signal have active levels, and the first scan signal, the first emission control signal, and the second emission control signal have inactive levels, wherein, during a data write period following the compensation period, the first scan signal has an active level, and the second scan signal, the third scan signal, the first emission control signal and the second emission control signal have inactive levels, wherein a start time point of an inactive period of the second emission control signal precedes a start time point of an inactive period of the first emission control signal, and wherein an end time point of the inactive period of the second emission control signal precedes an end time point of the inactive period of the first emission control signal.

7. The display device of claim 1, wherein the pixel further comprises a second emission control transistor connected between the first transistor and the first emission control transistor and configured to receive a second emission control signal, wherein, during an initialization period, the second scan signal, the third scan signal, the first emission control signal, and the second emission control signal have active levels, and the first scan signal has an inactive level, wherein, during a compensation period following the initialization period, the second scan signal and the third scan signal have active levels, and the first scan signal, the first emission control signal, and the second emission control signal have inactive levels, wherein, during a data write period following the compensation period, the first scan signal has an active level, and the second scan signal, the third scan signal, the first emission control signal and the second emission control signal have inactive levels, wherein a start time point of an inactive period of the second emission control signal precedes a start time point of an inactive period of the first emission control signal, wherein an end time point of the inactive period of the second emission control signal precedes an end time point of the inactive period of the first emission control signal.

8. The display device of claim 1, wherein the first transistor, the second transistor, the third transistor, and the first emission control transistor comprise N-type transistors.

9. The display device of claim 1, wherein a first driving voltage received by the first power line is higher than a second driving voltage received by the second power line, and wherein a reference voltage received by the reference voltage line is lower than the second driving voltage.

10. The display device of claim 1, wherein the light-emitting element further comprises:

an intermediate layer above the anode, below the cathode, and comprising at least one light-emitting layer.

11. The display device of claim 10, wherein the display panel further comprises a separator having an obtuse taper angle, wherein the pixel is provided in plurality, the pixels comprising a first light-emitting element configured to emit light of a first color, and a second light-emitting element configured to emit light of a second color that is different from the first color, and wherein the separator separates the cathode of the first light-emitting element and the cathode of the second light-emitting element from each other.

12. The display device of claim 11, wherein the display panel further comprises a connection wire between the first transistor and the cathode of the light-emitting element.

13. The display device of claim 12, wherein the connection wire comprises a first layer, a second layer above the first layer, and a third layer above the second layer, wherein a side surface of the third layer protrudes further outwardly from a side surface of the second layer in plan view, and wherein the cathode of the light-emitting element is in contact with the side surface of the second layer.

14. A display device comprising:

a display panel comprising a pixel, a first scan line, a second scan line, an emission control line, a first power line, a second power line, a reference voltage line, and a data line;

a first scan-driving circuit connected to the first scan line;

a second scan-driving circuit connected to the second scan line; and an emission control circuit connected to the emission control line, wherein the pixel comprises:

a light-emitting element comprising an anode connected to the first power line, and a cathode;

a first transistor connected between the cathode and a second node, and configured to operate according to a potential of a first node;

a first capacitor connected between the first node and a third node;

a second transistor connected to the third node, the data line, and the first scan line;

a third transistor connected to the first node, the reference voltage line, and the second scan line;

a fourth transistor connected to the second node, the third node, and the second scan line;

a first emission control transistor connected to the second node, the second power line, and the emission control line; and a second capacitor connected between the second node and the emission control line.

15. The display device of claim 14, wherein the display panel further comprises a third scan line, and wherein the pixel further comprises a fifth transistor connected between the first transistor and the first power line, or between the first transistor and an initialization voltage line, and connected to the third scan line.

16. The display device of claim 15, further comprising a third scan-driving circuit connected to the third scan line.

17. The display device of claim 14, further comprising a third capacitor connected between the third node and the second power line.

18. The display device of claim 14, further comprising a third capacitor connected between the third node and the reference voltage line.

19. An electronic device comprising:

a display panel comprising a pixel;

a panel driver for driving the display panel;

a driving controller for controlling a driving of the panel driver; and a main processor for providing an image signal to the driving controller, wherein the pixel comprises:

a light-emitting element comprising an anode connected to a first power line, and a cathode;

a first transistor connected between the cathode and a second node, and configured to operate according to a potential of a first node;

a first capacitor connected between the first node and a third node;

a second transistor connected between the third node and a data line, and configured to receive a first scan signal;

a third transistor connected between the first node and a reference voltage line, and configured to receive a second scan signal;

a fourth transistor connected between the second node and the third node, and configured to receive a third scan signal;

a first emission control transistor connected between the second node and a second power line, and configured to receive a first emission control signal through a fourth node; and a second capacitor connected between the second node and the fourth node.

20. The electronic device of claim 19, wherein the electronic device comprises a smartphone, a television, a monitor, a tablet, an electric vehicle, a mobile phone, a tablet personal computer (PC), a mobile communication terminal, an electronic notebook, an electronic book, a portable multimedia player (PMP), a navigation device, an ultra-mobile PC (UMPC), a laptop computer, a billboard, an Internet of Things (IoT) device, a smartwatch, a watch phone, a head-mounted display (HMD), a virtual reality (VR) device, an augmented reality (AR) device, a dashboard of a vehicle, a center information display (CID), or a mirror display.

* * * * *